United States Patent
Jang et al.

(10) Patent No.: US 12,368,537 B2
(45) Date of Patent: Jul. 22, 2025

(54) METHOD AND APPARATUS FOR TRANSMITTING/RECEIVING HARQ-ACK FEEDBACK FOR NETWORK COOPERATIVE COMMUNICATION

(71) Applicant: Samsung Electronics Co., Ltd., Suwon-si (KR)

(72) Inventors: Youngrok Jang, Suwon-si (KR); Euichang Jung, Suwon-si (KR); Hyoungju Ji, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 396 days.

(21) Appl. No.: 17/574,008

(22) Filed: Jan. 12, 2022

(65) Prior Publication Data

US 2022/0239418 A1 Jul. 28, 2022

(30) Foreign Application Priority Data

Jan. 15, 2021 (KR) .................. 10-2021-0006021
Jan. 29, 2021 (KR) .................. 10-2021-0013594

(51) Int. Cl.
*H04L 1/18* (2023.01)
*H04L 1/1812* (2023.01)
(Continued)

(52) U.S. Cl.
CPC .......... *H04L 1/1861* (2013.01); *H04L 1/1812* (2013.01); *H04L 5/0055* (2013.01)

(58) Field of Classification Search
CPC ... H04L 5/0053; H04L 5/0055; H04L 5/0057; H04W 72/02; H04W 72/04;
(Continued)

(56) References Cited

U.S. PATENT DOCUMENTS

2019/0124647 A1  4/2019  Li
2019/0313400 A1  10/2019 Farag et al.
(Continued)

FOREIGN PATENT DOCUMENTS

KR  10-2019-0017675 A  2/2019

OTHER PUBLICATIONS

Extended European Search Report dated Jun. 19, 2023, issued in a European Patent Application No. 22739653.8.
(Continued)

*Primary Examiner* — Bo Hui A Zhu
(74) *Attorney, Agent, or Firm* — Jefferson IP Law, LLP

(57) ABSTRACT

The disclosure relates to a communication technique that converges a 5th generation (5G) communication system for supporting a higher data rate after a 4th generation (4G) system with Internet of things (IoT) technology, and a system thereof. The disclosure can be applied to intelligent services (e.g., smart home, smart building, smart city, smart or connected car, healthcare, digital education, retail, security and safety related services, etc.) based on 5G communication technology and IoT-related technology. The disclosure relates to a wireless communication system and, more particularly, to a method and an apparatus wherein a User Equipment (UE) transmits Hybrid Automatic Repeat request Acknowledgement (HARQ-ACK) information to multiple transmission points, panels, or beams through an uplink for cooperative communication between multiple transmission points, panels, or beams.

20 Claims, 24 Drawing Sheets

(51) Int. Cl.
*H04L 1/1829* (2023.01)
*H04L 5/00* (2006.01)

(58) Field of Classification Search
CPC .......... H04W 72/0446; H04W 72/121; H04W 72/23; H04W 72/50; H04W 72/51; H04W 72/52; H04W 72/53; H04W 72/54; H04W 72/541; H04W 72/542; H04W 72/543; H04W 72/56
See application file for complete search history.

(56) References Cited

U.S. PATENT DOCUMENTS

| | | | |
|---|---|---|---|
| 2020/0221428 | A1 | 7/2020 | Moon et al. |
| 2020/0245314 | A1 | 7/2020 | Hwang et al. |
| 2020/0351129 | A1 | 11/2020 | Kwak et al. |
| 2021/0195600 | A1* | 6/2021 | Khoshnevisan ...... H04W 72/53 |

OTHER PUBLICATIONS

Vivo: Enhancements on Multi-TRP for PDCCH, PUCCH and PUSCH, In: Enhancements on Multi-TRP for PDCCH, PUCCH and PUSCH, Apr. 12, 2020, XP055927890, vol. R1-2102507.

Samsung, Introduction of MIMO enhancements, R1-1913202, 3GPP TSG-RAN WG1 Meeting #99, Reno, USA, Nov. 12, 2019, pp. 497-514.

NTT DOCOMO, Inc., Maintenance for carrier aggregation and bandwidth parts, R1-1809144, 3GPP TSG RAN WG1 Meeting #94, Gothenburg, Sweden, Aug. 11, 2018, pp. 6-8.

International Search Report and Written Opinion dated Apr. 21, 2022, issued in International Patent Application No. PCT/KR2022/000533.

Qualcomm Incorporated, Enhancements on Multi-TRP for PDCCH, PUCCH and PUSCH, 3GPP Draft; R1-2009251, Oct. 24, 2020, XP051946914.

European Office Action dated Nov. 22, 2024, issued in European Patent Application No. 22739653.8.

* cited by examiner

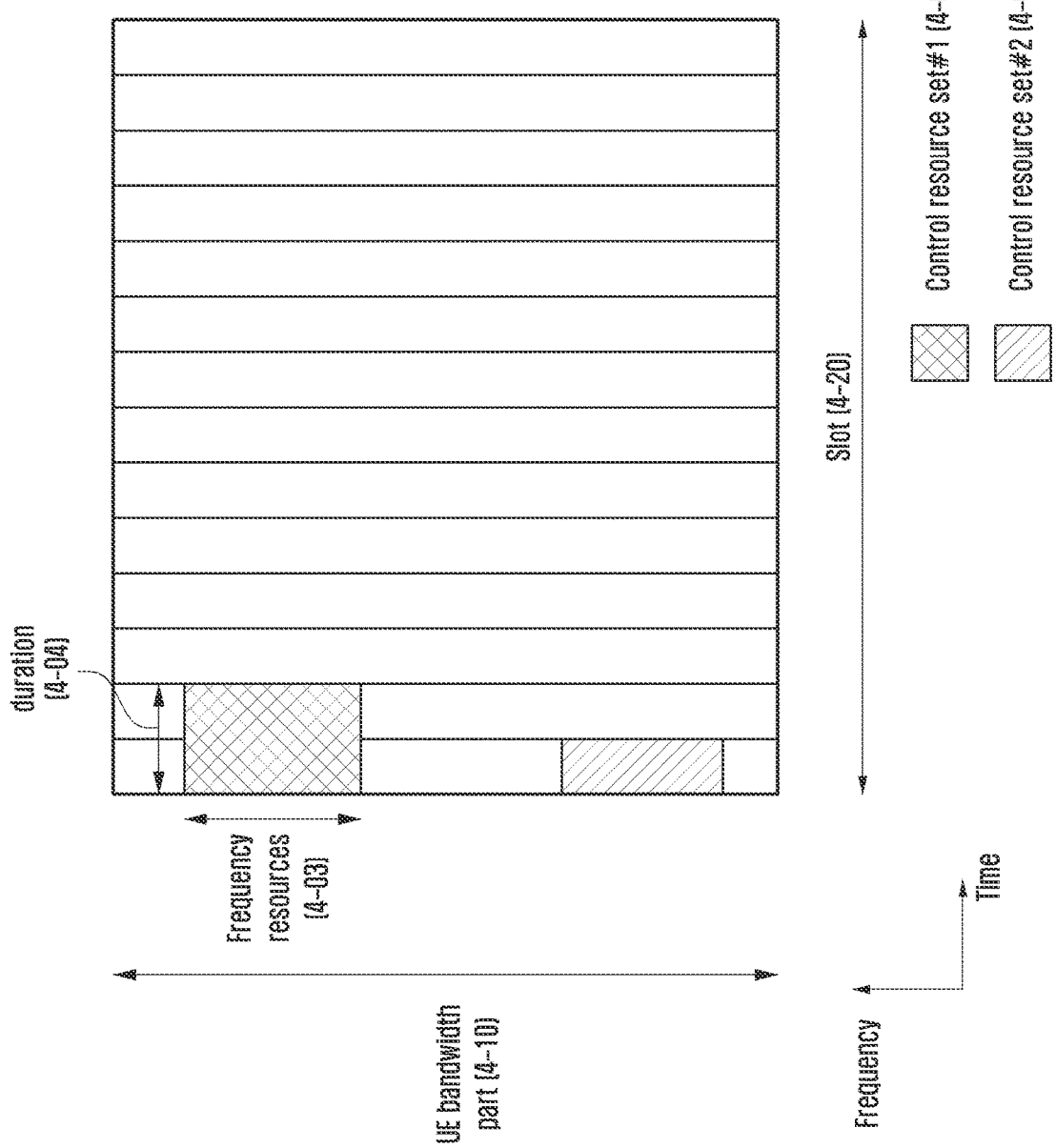

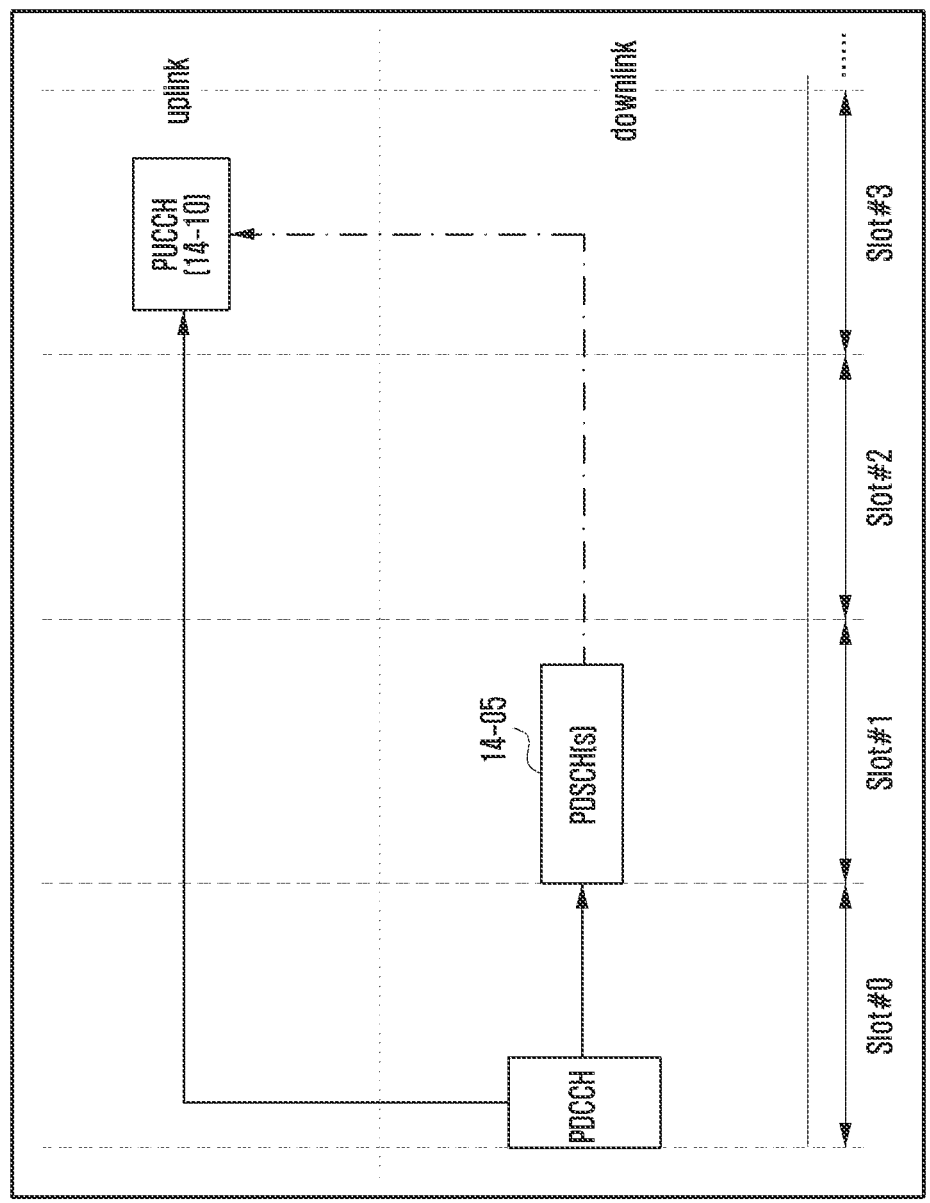

METHOD AND APPARATUS FOR TRANSMITTING/RECEIVING HARQ-ACK FEEDBACK FOR NETWORK COOPERATIVE COMMUNICATION

CROSS-REFERENCE TO RELATED APPLICATION(S)

This application is based on and claims priority under 35 U.S.C. § 119 (a) of a Korean patent application number 10-2021-0006021, filed on Jan. 15, 2021, in the Korean Intellectual Property Office, and of a Korean patent application number 10-2021-0013594, filed on Jan. 29, 2021, in the Korean Intellectual Property Office, the disclosure of each of which is incorporated by reference herein in its entirety.

BACKGROUND

1. Field

The disclosure relates to a wireless communication system. More particularly, the disclosure relates to a method and an apparatus wherein a User Equipment (UE) transmits Hybrid Automatic Repeat request Acknowledgement (HARQ-ACK) information to multiple transmission points, panels, or beams through an uplink for cooperative communication between multiple transmission points, panels, or beams.

2. Description of Related Art

To meet the demand for wireless data traffic having explosively increased since deployment of 4th generation (4G) communication systems and increases of multimedia services, efforts have been made to develop an improved 5th generation (5G) or pre-5G communication system. Therefore, the 5G or pre-5G communication system is also called a "Beyond 4G Network" communication system or a "Post long-term evolution (LTE)" system.

The 5G communication system is considered to be implemented in ultra-higher frequency (mmWave) bands (e.g., 60 GHz bands) so as to increase data rates. To decrease propagation loss of the radio waves and increase the transmission distance in the ultra-higher frequency bands, beamforming, massive multiple-input multiple-output (MIMO), full dimensional MIMO (FD-MIMO), array antenna, analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

With the advance of wireless communication systems as described above, there is a need for schemes to smoothly support services related to uplink data repeated transmission of a terminal.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method for transmitting/receiving HARQ-ACK feedback information by a User Equipment (UE) in a wireless communication system.

Another aspect of the disclosure is to provide a method for transmitting HARQ-ACK feedback information to multiple transmission points, panels, or beams by a UE for network coordination.

Additional aspects will be set forth in part in the description which follows and, in part, will be apparent from the description, or may be learned by practice of the presented embodiments.

In accordance with an aspect of the disclosure, a method performed by a terminal in a communication system is provided. The method includes receiving, from a base station, a physical downlink control channel (PDCCH) based on PDCCH candidates associated with respective search space sets, receiving, from the base station a physical downlink shared channel (PDSCH) based on the PDCCH, identifying a physical uplink control channel (PUCCH) resource based on a control resource set (CORESET) associated with a search space set having the lowest index, transmitting, to the base station, hybrid automatic repeat request acknowledgement (HARQ-ACK) information for the PDSCH based on the PUCCH resource.

In accordance with another aspect of the disclosure, a method performed by a base station in a communication system is provided. The method includes transmitting, to a terminal, a physical downlink control channel (PDCCH) based on PDCCH candidates associated with respective search space sets, transmitting, to the terminal, a physical downlink shared channel (PDSCH) based on the PDCCH, receiving, from the terminal, hybrid automatic repeat request acknowledgement (HARQ-ACK) information for the PDSCH based on a physical uplink control channel (PUCCH) resource identified based on a control resource set (CORESET) associated with a search space set having the lowest index.

In accordance with another aspect of the disclosure, a terminal in a communication system is provided. The terminal includes a transceiver, and a controller configured to receive, from a base station, a physical downlink control channel (PDCCH) based on PDCCH candidates associated with respective search space sets, receive, from the base station a physical downlink shared channel (PDSCH) based on the PDCCH, identify a physical uplink control channel (PUCCH) resource based on a control resource set (CORESET) associated with a search space set having the lowest index, transmit, to the base station, hybrid automatic repeat request acknowledgement (HARQ-ACK) information for the PDSCH based on the PUCCH resource.

In accordance with another aspect of the disclosure, a base station in a communication system in provided. The base station includes a transceiver, and a controller configured to transmit, to a terminal, a physical downlink control channel (PDCCH) based on PDCCH candidates associated with respective search space sets, transmit, to the terminal, a physical downlink shared channel (PDSCH) based on the PDCCH, receive, from the terminal, hybrid automatic repeat request acknowledgement (HARQ-ACK) information for the PDSCH based on a physical uplink control channel (PUCCH) resource identified based on a control resource set (CORESET) associated with a search space set having the lowest index.

According to the disclosure, when network cooperative communication is used in a wireless communication system, a UE may efficiently generate and transmit HARQ-ACK feedback information to each transmission point, panel, or beam.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 4 is a diagram illustrating an example of configuring a control area of a downlink control channel in a wireless communication system according to an embodiment of the disclosure;

FIG. 14A is a diagram illustrating a HARQ-ACK information delivery method according to various downlink control information (DCI) configurations and PUCCH configurations for non-coherent joint transmission (NC-JT) transmission according to an embodiment of the disclosure;

The same reference numerals are used to represent the same elements throughout the drawings.

DETAILED DESCRIPTION

Figure 1:
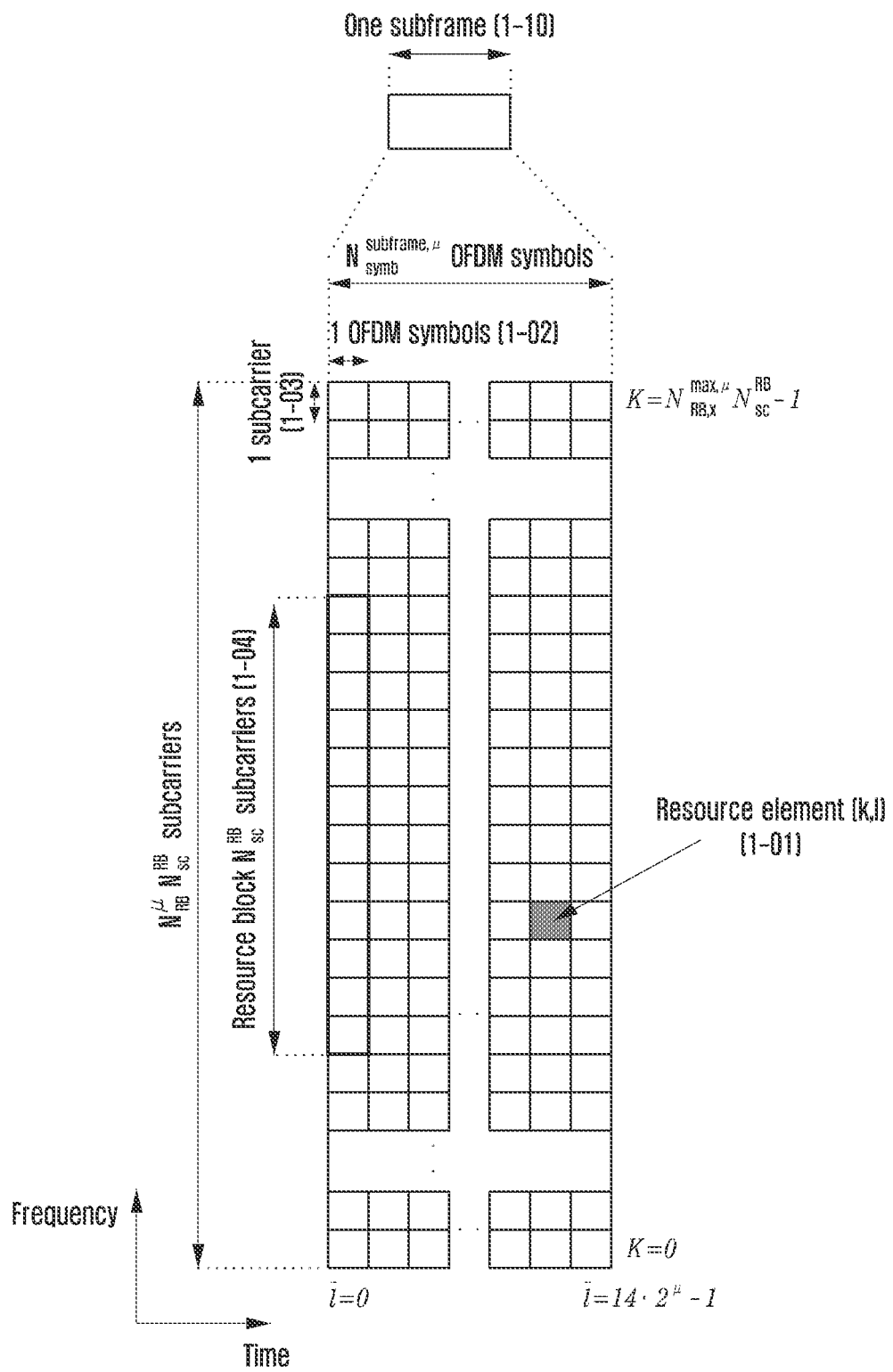
FIG. 1 is a diagram illustrating a structure of a time-frequency domain of a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Herein, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that execute on the computer or other programmable apparatus provide operations for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more central processing units (CPUs) within a device or a security multimedia card. Further, the "unit" in the embodiments may include one or more processors.

Hereinafter, the operation principle of the disclosure will be described in detail with reference to the accompanying drawings. In the following description of the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In the following description, a base station is an entity that allocates resources to terminals, and may be at least one of a gNode B, an eNode B, a Node B, a base station (BS), a wireless access unit, a base station controller, and a node on a network. A terminal may include a user equipment (UE), a mobile station (MS), a cellular phone, a smartphone, a computer, or a multimedia system capable of performing communication functions. Of course, examples of the base station and the terminal are not limited thereto. The following description of the disclosure is directed to technology for receiving broadcast information from a base station by a terminal in a wireless communication system. The disclosure relates to a communication technique for converging IoT technology with a 5th generation (5G) communication system designed to support a higher data transfer rate beyond the 4th generation (4G) system, and a system therefor. The disclosure may be applied to intelligent services (e.g., smart homes, smart buildings, smart cities, smart cars or connected cars, healthcare, digital education, retail business, security and safety-related services, etc.) on the basis of 5G communication technology and IoT-related technology.

In the following description, terms referring to broadcast information, terms referring to control information, terms related to communication coverage, terms referring to state changes (e.g., events), terms referring to network entities, terms referring to messages, terms referring to device elements, and the like are illustratively used for the sake of convenience. Therefore, the disclosure is not limited by the terms as used below, and other terms referring to subjects having equivalent technical meanings may be used.

In the following description, some of terms and names defined in the 3rd generation partnership project long term evolution (3GPP LTE) standards may be used for the convenience of description. However, the disclosure is not limited by these terms and names, and may be applied in the same way to systems that conform other standards.

A wireless communication system has evolved from providing an initial voice-oriented service to a broadband wireless communication system that provides high-speed and high-quality packet data services, such as high speed packet access (HSPA) in 3GPP, long-term evolution (LTE) or evolved universal terrestrial radio access (E-UTRA), LTE-advanced (LTE-A), LTE-pro, high rate packet data (HRPD) in 3GPP2, ultra-mobile broadband (UMB), and communication standards such as IEEE's 802.16e.

In the LTE system, which is a representative example of a broadband wireless communication system, in downlink (DL), orthogonal frequency division multiplexing (OFDM) scheme is adopted, and in uplink (UL), single carrier frequency division multiple access (SC-FDMA) scheme is adopted. Uplink refers to a radio link through which a user equipment (UE) or mobile station (MS) transmits data or control signals to a base station (BS) (eNode B or base station), and downlink refers to a radio link through which a base station transmits data or control signals to the UE. The above-described multiple access method allows the data or control information of each user to be distinguished by allocating and operating the time-frequency resources to which the data or control information for each user are to be transmitted do not overlap each other, that is, to establish orthogonality.

The 5G communication system, which is a communication system after LTE, must support services that simultaneously satisfy various requirements so that various requirements from users and service providers can be freely reflected. Services considered for the 5G communication system include enhanced Mobile Broadband (eMBB), massive Machine Type Communication, (mMTC), and Ultra Reliability Low Latency Communication (URLLC).

According to some embodiments, eMBB aims to provide more improved data transfer rates than those supported by existing LTE, LTE-A or LTE-Pro. For example, in the 5G communication system, the eMBB should be able to provide a peak data rate of 20 Gbps in the downlink and a peak data rate of 10 Gbps in the uplink from the viewpoint of one base station. At the same time, the 5G communication system must provide the increased user perceived data rate of the UE. In order to satisfy such a requirement, it may be required to improve various transmission/reception technologies, including a more advanced multiple-input and multiple-output (MIMO) transmission technology. In addition, by using a frequency bandwidth wider than 20 MHz in a frequency band of 3 to 6 GHz or 6 GHz or higher instead of the 2 GHz band currently used by LTE, the data transmission rate required by the 5G communication system may be satisfied.

At the same time, mMTC is being considered to support application services such as the Internet of Things (IoT) in the 5G communication system. In order to efficiently provide the Internet of Things, mMTC may be required to support a large-scale UE access in a cell, improve coverage of the UE, improve battery time, reduce the cost of the UE, etc. Because the Internet of Things is attached to various sensors and various devices to provide communication functions, it must be able to support a large number of UEs (e.g., 1,000,000 UEs/km2) within a cell. In addition, because a UE supporting mMTC is highly likely to be located in a shaded area such as the basement of a building that a cell cannot cover due to the nature of the service, it may be required wider coverage compared to other services provided by the 5G communication system. A UE supporting mMTC must be composed of a low-cost UE, and because it is difficult to frequently exchange the battery of the UE, a very long battery life time may be required.

Lastly, the URLLC is a cellular-based wireless communication service used for a specific purpose (mission-critical) and a service, for example, used for remote control of a robot or machinery, industrial automation, an Unmanned Aerial vehicle, Remote health care, an emergency alert, etc., and must provide very low latency and very high reliability. For example, a service supporting URLLC must satisfy the air interface latency of less than 0.5 milliseconds (ms) and, at the same time, must satisfy the requirement of a packet error rate of 10-5 or less. Therefore, for a service supporting URLLC, the 5G system must provide a transmit time interval (TTI) that is smaller than that of other services, and, at the same time, must allocate a wide resource in a frequency band as the design requirements. However, the aforementioned mMTC, URLLC, and eMBB are only examples of different service types, and the service types to which the disclosure is applied are not limited to the above-described examples.

The services considered in the above-mentioned 5G communication system should be provided by convergence with each other based on one framework. That is, for efficient resource management and control, it is preferable that each service is integrated and controlled and transmitted as a single system rather than being operated independently.

In addition, although the embodiment of the disclosure will be described below using LTE, LTE-A, LTE Pro, or new radio (NR) system as an example, the embodiment of the disclosure may be applied to other communication systems having a similar technical background or channel type. In addition, the embodiments of the disclosure may be applied to other communication systems through some modifications within the scope of the disclosure as judged by a person having skilled technical knowledge.

Hereinafter, a frame structure of the 5G system will be described in more detail with reference to the drawings.

FIG. 1 is a diagram illustrating a structure of a time-frequency domain in a wireless communication system, according to an embodiment of the disclosure.

Referring to FIG. 1, the horizontal and vertical axes represent the time domain and the frequency domain, respectively. The basic unit of resource in the time domain and frequency domain is a resource element (RE) 1-01, which may be defined as one orthogonal frequency division multiplexing (OFDM) symbol 1-02 in the time axis and may be defined as one subcarrier 1-03 in the frequency axis. One resource block (RB) 1-04 in the frequency domain may consist of $N_{SC}^{RB}$ consecutive REs (e.g., 12). In one embodiment, a plurality of OFDM symbols may consist of one subframe 1-10.

Figure 2:
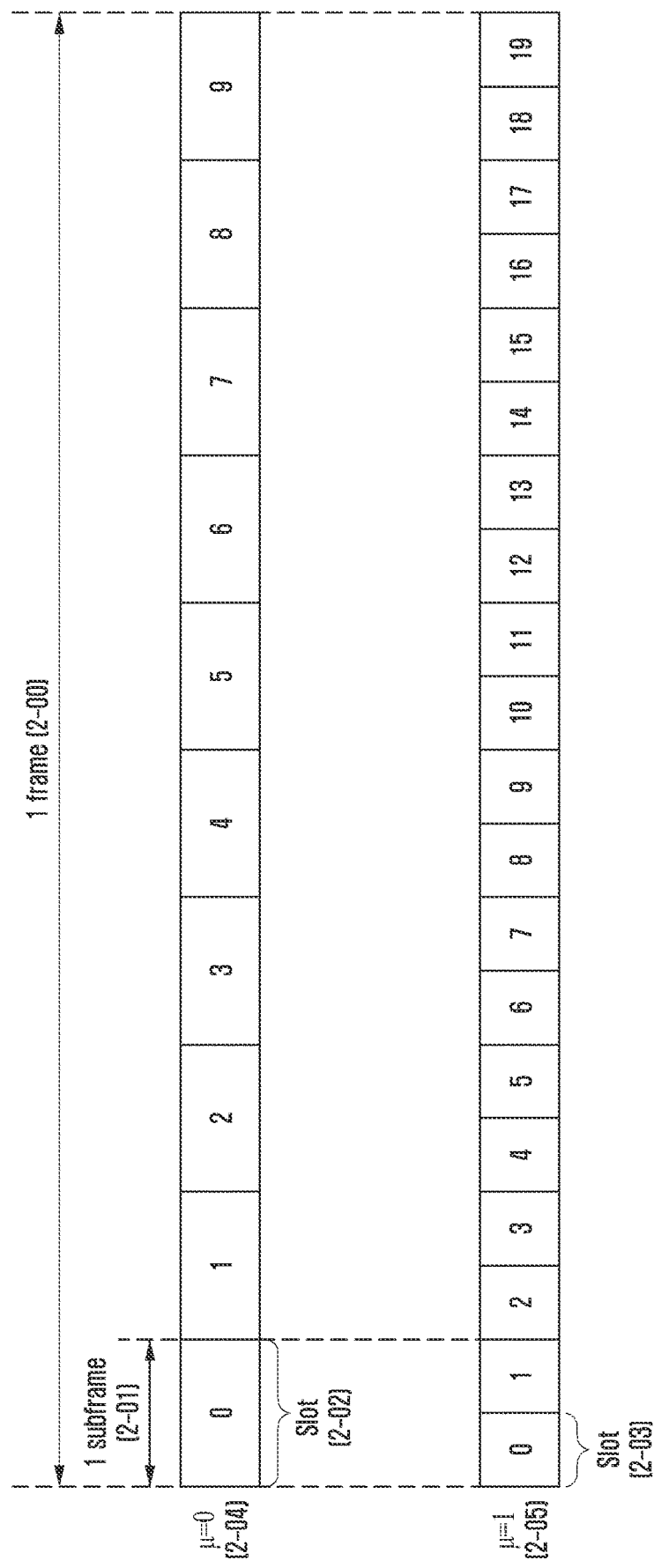
FIG. 2 is a diagram illustrating a frame, a subframe, and a slot structure of a wireless communication system according to an embodiment of the disclosure.

FIG. 2 is a diagram illustrating a frame, a subframe, and a slot structure of a next-generation wireless communication system according to an embodiment of the disclosure.

Referring to FIG. 2, an example of a frame 2-00, a subframe 2-01, and a slot 2-02 is illustrated. In an embodiment, one frame 2-00 may be defined as 10 ms. One subframe 2-01 may be defined as 1 ms, and accordingly, one frame 2-00 may consist of a total of 10 subframes 2-01. One slot 2-02 and 2-03 may be defined as 14 OFDM symbols (that is, the number of symbols per slot ($N_{symb}^{slot}$)=14). One subframe 2-01 may consist of one or more slots 2-02 and 2-03, and the number of slots 2-02 and 2-03 per one subframe 2-01 may vary according to a set value (μ) 2-04 and 2-05 for the subcarrier spacing. In an example of FIG. 2, the case where μ=0 (2-04) and μ=1 (2-05) is illustrated as the subcarrier spacing set value. When μ=0 (2-04), one subframe 2-01 may consist of one slot 2-02, and when μ=1 (2-05), one subframe 2-01 may consist of two slots 2-03. That is, depending on the set value μ for the subcarrier spacing, the number of slots per one subframe ($N_{slot}^{subframe,\mu}$) may vary, and accordingly, the number of slots per one frame ($N_{slot}^{frame,\mu}$) may vary. The $N_{slot}^{subframe,\mu}$ and $N_{slot}^{frame,\mu}$ depending on each subcarrier spacing set value μ may be defined in Table 1 below.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In the NR system, it is possible for one component carrier (CC) or a serving cell to consist of up to 250 or more RBs. Therefore, when the UE always receives the entire serving cell bandwidth like LTE, power consumption of the UE may be extreme, and to solve this problem, the base station may configure one or more bandwidth parts (BWP) to the UE to support the UE to change the reception area within the cell. In the NR system, the base station may configure the 'initial BWP', which is the bandwidth of the CORESET #0 (or common search space (CSS)), to the UE through a master information block (MIB). Thereafter, the base station may configure the first BWP of the UE through radio resource control (RRC) signaling and notify at least one BWP configuration information that may be indicated through the downlink control information (DCI) in the future. Thereafter, the base station may indicate to the UE which band the UE will use by notifying the BWP ID through DCI. If the UE does not receive DCI in the currently allocated BWP for a specific time or longer, the UE may attempt to receive DCI by returning to the 'default BWP'.

Figure 3:
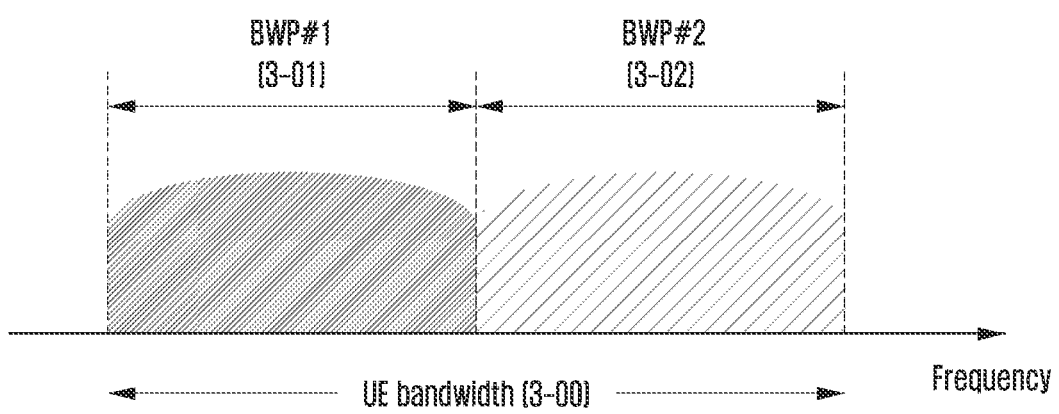
FIG. 3 illustrates an example of a configuration of a bandwidth part (BWP) in a wireless communication system according to an embodiment of the disclosure.

FIG. 3 illustrates an example of a configuration of a bandwidth part (BWP) in a wireless communication system according to an embodiment of the disclosure.

Referring to FIG. 3, FIG. 3 illustrates an example in which UE bandwidth 3-00 is configured to two bandwidth parts, namely, BWP #1 3-01 and BWP #2 3-02. The base station may configure one or more bandwidth parts to the UE, and may configure information as illustrated in Table 2 below for each bandwidth part.

TABLE 2

| BWP ::= | SEQUENCE { |
|---|---|
| bwp-Id | BWP-Id, |
| locationAndBandwidth | INTEGER (1..65536), |
| subcarrierSpacing | ENUMERATED {n0, n1, n2, n3, n4, n5}, |
| cyclicPrefix | ENUMERATED { extended } |
| } | |

Not limited to the above-described example, and various parameters related to bandwidth part may be configured to the UE in addition to the information in Table 2. The above-described information may be transmitted by the base station to the Table 2 through higher layer signaling (e.g., RRC signaling). At least one bandwidth part among one or more configured bandwidth parts may be activated. Information on whether the configured bandwidth part is activated may be semi-statically transmitted from the base station to the UE through RRC signaling, or may be dynamically transmitted through medium access control (MAC) control element (CE) or DCI.

According to an embodiment, the UE before radio resource control (RRC) connection may receive an initial BWP for initial access configured from the base station through a master information block (MIB). More specifically, in order to receive the system information (remaining system information; RMSI or system information block 1; may correspond to SIB1) required for initial access through the MIB in the initial access operation, the UE may receive a configuration information for control resource set (CORESET) through which a physical downlink control channel (PDCCH) may be transmitted and a configuration information for a search space. The control area and the search space configured by the MIB may be regarded as Identity (ID) 0, respectively.

The base station may notify the UE of configuration information such as frequency allocation information, time allocation information, and numerology for the control area #0 through the MIB. In addition, the base station may notify the UE of configuration information on the monitoring period and occasion for the control area #0, that is, configuration information on the search space #0 through the MIB. The UE may regard the frequency domain configured as the control area #0 obtained through the MIB as an initial bandwidth part for initial access. In this case, the identity (ID) of the initial bandwidth part may be regarded as 0.

The configuration for the bandwidth part supported by the above-described next-generation mobile communication system (5G or NR system) may be used for various purposes.

In an embodiment, when the bandwidth supported by the UE is smaller than the system bandwidth, the bandwidth supported by the UE may be supported through the configuration for the bandwidth part. For example, in Table 2, the frequency location of the bandwidth part (configuration information 2) is configured to the UE, so that the UE may transmit and receive data at a specific frequency location within the system bandwidth.

In another embodiment, for the purpose of supporting different numerologies, the base station may configure a plurality of bandwidth parts to the UE. For example, in order to support both data transmission and reception using a subcarrier spacing of 15 kHz and a subcarrier spacing of 30 kHz to an arbitrary UE, two bandwidth parts may be configured to use a subcarrier spacing of 15 kHz and 30 kHz, respectively. Different bandwidth parts may be frequency division multiplexed (FDM), and when data is transmitted/received at a specific subcarrier space, the bandwidth part configured for the corresponding subcarrier space may be activated.

In another embodiment, for the purpose of reducing power consumption of the UE, the base station may configure bandwidth parts having different sizes of bandwidth to the UE. For example, when the UE supports a very large bandwidth, for example, a bandwidth of 100 MHz and always transmits and receives data using the corresponding bandwidth, very large power consumption may be caused. In particular, it is very inefficient in terms of power consumption for the UE to monitor the downlink control channel for an unnecessarily large bandwidth of 100 MHz in a situation in which there is no traffic. Therefore, for the purpose of reducing power consumption of the UE, the base station may configure a bandwidth part of a relatively narrow bandwidth to the UE, for example, a bandwidth part of 20 MHz. In the absence of traffic, the UE may monitor in a bandwidth part of 20 MHz, and when data are generated, the UE may transmit/receive data using the bandwidth part of 100 MHz according to the instruction of the base station.

In the method of configuring the bandwidth part described above, the UEs before the RRC connection may receive the configuration information for the initial bandwidth part through the master information block (MIB) in the initial access operation. More specifically, the UE may receive, from the MIB of the physical broadcast channel (PBCH), a control area (control resource set, CORESET) configured for a downlink control channel through which downlink control information (DCI) scheduling system information block (SIB) can be transmitted. The bandwidth of the control area configured by the MIB may be regarded as an initial bandwidth part, and through the configured initial bandwidth part, the UE may receive a physical downlink shared channel (PDSCH) through which the SIB is transmitted. In addition to the purpose of receiving the SIB, the initial bandwidth part may be utilized for other system information (OSI), paging, and random access.

Hereinafter, a synchronization signal (SS)/PBCH block of a next-generation wireless communication system (5G or NR system) will be described.

The SS/PBCH block may refer to a physical layer channel block composed of a primary SS (PSS), a secondary SS (SSS), and a PBCH. More specifically, the SS/PBCH block may be defined as follows.

PSS: A reference signal serving for downlink time/frequency synchronization may provide some information on cell ID.

SSS: Serves as a reference for downlink time/frequency synchronization, and may provide the remaining cell ID information not provided by PSS. Additionally, it may serve as a reference signal for demodulation of the PBCH.

PBCH: It is possible to provide essential system information necessary for transmitting and receiving the data channel and control channel of the UE. The essential system information may include search space related control information indicating radio resource mapping information of a control channel, scheduling control information on a separate data channel for transmitting system information, and the like.

SS/PBCH block: It may consist of a combination of PSS, SSS, and PBCH. One or a plurality of SS/PBCH blocks may be transmitted within 5 ms, and each transmitted SS/PBCH block may be distinguished by an index.

The UE may detect the PSS and SSS in the initial access operation and may decode the PBCH. The UE may obtain the MIB from the PBCH, and may receive the control area #0 configured through the MIB. The UE may perform monitoring on the control area #0, assuming that the selected SS/PBCH block and the demodulation reference signal (DMRS) transmitted from the control area #0 are quasi co located (QCL). The UE may receive system information based on the downlink control information transmitted from the control area #0. The UE may obtain configuration information related to random access channel (RACH) necessary for initial access from the received system information. The UE may transmit a physical RACH (PRACH) to the base station in consideration of the selected SS/PBCH index, and the base station receiving the PRACH may obtain information on the SS/PBCH block index selected by the UE. The base station may figure out which block the UE has selected from each of the SS/PBCH blocks and the UE monitors the control area #0 corresponding to the SS/PBCH block selected.

Hereinafter, downlink control information (hereinafter referred to as DCI) in a next-generation wireless communication system (5G or NR system) will be described in detail.

Scheduling information for uplink data (or physical uplink shared channel, PUSCH) or downlink data (or physical downlink shared channel, PDSCH) in a next-generation mobile communication system (5G or NR system) may be transmitted from the base station to the UE through DCI. The UE may monitor the DCI format for fallback and the DCI format for non-fallback for PUSCH or PDSCH. The DCI format for fallback may include a fixed field predetermined between the base station and the UE, and the DCI format for non-fallback may include a configurable field.

DCI may be transmitted through a PDCCH, which is a physical downlink control channel, after channel coding and modulation processes. A cyclic redundancy check (CRC) may be attached to the DCI message payload, and the CRC may be scrambled by a radio network temporary identifier (RNTI) corresponding to the identity of the UE. Depending on the purpose, for example, UE-specific data transmission, a power control command, or a random access response, of the DCI message, different RNTIs may be used for scrambling of the CRC attached to the payload of the DCI message. That is, the RNTI may not be explicitly transmitted, but may be transmitted while being included in the CRC calculation process. When the DCI message transmitted on the PDCCH is received, the UE may check the CRC using the allocated RNTI. Based on the CRC check result, the UE may determine that the corresponding message has been transmitted to the UE.

For example, DCI scheduling PDSCH for system information (SI) may be scrambled by SI-RNTI. DCI scheduling a PDSCH for a random access response (RAR) message may be scrambled by a random access (RA)-RNTI. DCI scheduling a PDSCH for a paging message may be scrambled by a P (paging)-RNTI. DCI notifying slot format indicator (SFI) may be scrambled by SFI-RNTI. DCI notifying transmit power control (TPC) may be scrambled by TPC-RNTI. DCI for scheduling UE-specific PDSCH or PUSCH may be scrambled by C-RNTI (Cell RNTI).

DCI format 0_0 may be used as fallback DCI scheduling PUSCH, and in this case, CRC may be scrambled by C-RNTI. In an embodiment, DCI format 0_0 in which CRC is scrambled by C-RNTI may include information as illustrated in Table 3 below.

TABLE 3

Identifier for DCI formats - 1 bit
Frequency domain resource assignment -$\lceil \log_2(N_{RB}^{UL, BWP}(N_{RB}^{UL, BWP} + 1)/2) \rceil$ bits
Time domain resource assignment - 4 bits
Frequency hopping flag - 1 bit.
Modulation and coding scheme - 5 bits
New data indicator - 1 bit
Redundancy version - 2 bits
HARQ process number - 4 bits
TPC command for scheduled PUSCH - 2 bits
UL/SUL indicator - 0 or 1 bit DCI format 0_1 may be used as non-fallback DCI scheduling PUSCH, in this case, CRC may be scrambled by C-RNTI. In an embodiment, DCI format 0_1 in which CRC is scrambled by C-RNTI may include information as illustrated in Table 4 below.

TABLE 4

- Carrier indicator—0 or 3 bits
- UL/SUL indicator—0 or 1 bit
- Identifier for DCI formats—[1] bits
- Bandwidth part indicator—0, 1 or 2 bits
- Frequency domain resource assignment
  - For resource allocation type 0, $\lceil N_{RB}^{UL,BWP}/P \rceil$ bits
  - For resource allocation type 1, $\lceil \log_2(N_{RB}^{UL,BWP}(N_{RB}^{UL,BWP}+1)/2) \rceil$ bits
- Time domain resource assignment—1, 2, 3, or 4 bits
- VRB-to-PRB mapping—0 or 1 bit, only for resource allocation type 1.
  - 0 bit if only resource allocation type 0 is configured;
  - 1 bit otherwise.
- Frequency hopping flag—0 or 1 bit, only for resource allocation type 1.
  - 0 bit if only resource allocation type 0 is configured;
  - 1 bit otherwise.
- Modulation and coding scheme—5 bits
- New data indicator—1 bit
- Redundancy version—2 bits
- HARQ process number—4 bits
- 1st downlink assignment index—1 or 2 bits
  - 1 bit for semi-static HARQ-ACK codebook;
  - 2 bits for dynamic HARQ-ACK codebook with single HARQ-ACK codebook.
- 2nd downlink assignment index—0 or 2 bits
  - 2 bits for dynamic HARQ-ACK codebook with two HARQ-ACK sub-codebooks;
  - 0 bit otherwise.
- TPC command for scheduled PUSCH—2 bits SRS resource indicator $-\left\lceil \log_2\left(\sum_{k=1}^{L_{max}}\binom{N_{SRS}}{k}\right)\right\rceil$ or $\lceil \log_2(N_{SRS}) \rceil$ bits

- $\left\lceil \log_2\left(\sum_{k=1}^{L_{max}}\binom{N_{SRS}}{k}\right)\right\rceil$ bits for non-codebook based PUSCH transmission;

- $\lceil \log_2(N_{SRS}) \rceil$ bits for codebook based PUSCH transmission.
- Precoding information and number of layers—up to 6 bits
- Antenna ports—up to 5 bits
- SRS request—2 bits
- CSI request—0, 1, 2, 3, 4, 5, or 6 bits
- CBG transmission information—0, 2, 4, 6, or 8 bits
- PTRS-DMRS association—0 or 2 bits.
- beta_offset indicator—0 or 2 bits
- DMRS sequence initialization—0 or 1 bit DCI format 1_0 may be used as fallback DCI scheduling PDSCH, and in this case, CRC may be scrambled by C-RNTI. In an embodiment, DCI format 1_0 in which CRC is scrambled by C-RNTI may include information as illustrated in Table 5 below.

TABLE 5

Identifier for DCI formats - [1] bit
Frequency domain resource assignment - $\lceil \log_2(N_{RB}^{DL, BWP}(N_{RB}^{DL, BWP}+1)/2) \rceil$ bits
Time domain resource assignment - X bits
VRB-to-PRB mapping - 1 bit.
Modulation and coding scheme - 5 bits
New data indicator - 1 bit
Redundancy version - 2 bits
HARQ process number - 4 bits
Downlink assignment index - 2 bits
TPC command for scheduled PUCCH - [2] bits
PUCCH resource indicator - 3 bits
PDSCH-to-HARQ feedback timing indicator - [3] bits DCI format 1_1 may be used as non-fallback DCI scheduling PDSCH, and in this case, CRC may be scrambled by C-RNTI. In an embodiment, DCI format 1_1 in which CRC is scrambled by C-RNTI may include information as illustrated in Table 6 below.

TABLE 6

Carrier indicator - 0 or 3 bits
Identifier for DCI formats - [1] bits
Bandwidth part indicator - 0, 1 or 2 bits
Frequency domain resource assignment
  For resource allocation type 0, $\lceil N_{RB}^{DL, BWP}/P \rceil$ bits
  For resource allocation type 1, $\lceil \log_2(N_{RB}^{DL, BWP}(N_{RB}^{DL, BWP}+1)/2) \rceil$ bits
Time domain resource assignment -1, 2, 3, or 4 bits
VRB-to-PRB mapping - 0 or 1 bit, only for resource allocation type 1.
  0 bit if only resource allocation type 0 is configured;
  1 bit otherwise.
PRB bundling size indicator - 0 or 1 bit
Rate matching indicator - 0, 1, or 2 bits
ZP CSI-RS trigger - 0, 1, or 2 bits
For transport block 1:
  Modulation and coding scheme - 5 bits
  New data indicator - 1 bit
  Redundancy version - 2 bits
For transport block 2:
  Modulation and coding scheme - 5 bits
  New data indicator - 1 bit
  Redundancy version - 2 bits
HARQ process number - 4 bits
Downlink assignment index - 0 or 2 or 4 bits
TPC command for scheduled PUCCH - 2 bits
PUCCH resource indicator - 3 bits
PDSCH-to-HARQ_feedback timing indicator - 3 bits
Antenna ports - 4, 5 or 6 bits
Transmission configuration indication - 0 or 3 bits TABLE 6-continued SRS request - 2 bits
CBG transmission information - 0, 2, 4, 6, or 8 bits
CBG flushing out information - 0 or 1 bit
DMRS sequence initialization - 1 bit FIG. 4 is a diagram illustrating an example of configuring a control area of a downlink control channel in a next-generation wireless communication system according to an embodiment of the disclosure. Specifically, FIG. 4 is a diagram illustrating an embodiment of a control area (control resource set, CORESET) through which a downlink control channel is transmitted in a 5G wireless communication system according to an embodiment of the disclosure.

Referring to FIG. 4, two control areas (control area #1 4-01 and control area #2 4-02) may be configured within a UE bandwidth part 4-10 on a frequency axis, and within one slot 4-20 on a time axis. The control areas 4-01 and 4-02 may be configured in a specific frequency resource 4-03 within the entire UE bandwidth part 4-10 on the frequency axis. The control areas 4-01 and 4-02 may be configured with one or a plurality of OFDM symbols on the time axis, which may be defined as a control area length (control resource set duration, 4-04). Referring to FIG. 4, the length of the control area #1 4-01 may be configured as a control area of 2 symbols, and the length of the control area #2 4-02 may be configured as a control area of 1 symbol.

The control area in the above-described next-generation wireless communication system (5G or NR system) may be configured through higher layer signaling (e.g., system information, master information block (MIB), and radio resource control (RRC) signaling) between the base station and the UE. Configuring the control area to the UE refers to that information such as the control area identity, the frequency position of the control area, and the symbol length of the control area are provided. For example, the configuration of the control area may include information as illustrated in Table 7 below.

TABLE 7

```
ControlResourceSet ::=              SEQUENCE {
-- Corresponds to L1 parameter 'CORESET-ID'
    controlResourceSetId            ControlResourceSetId,
    frequencyDomainResources        BIT STRING (SIZE (45)),
    duration                        INTEGER
        (1..maxCoReSetDuration),
    cce-REG-MappingType             CHOICE {
        interleaved                 SEQUENCE {
            reg-BundleSize          ENUMERATED {n2, n3,
n6},
            precoderGranularity     ENUMERATED
{sameAsREG-bundle, allContiguousRBs},
            interleaverSize         ENUMERATED {n2, n3,
n6}
            shiftIndex
            INTEGER(0..maxNrofPhysicalResourceBlocks-
1)                                  OPTIONAL
        },
        nonInterleaved              NULL
    },
    tci-StatesPDCCH                 SEQUENCE(SIZE
        (1..maxNrofTCI-StatesPDCCH)) OF TCI-StateId
                                    OPTIONAL,
    tci-PresentInDCI                ENUMERATED
    {enabled}
        OPTIONAL, -- NeedS
}
```

In Table 7, tci-StatesPDCCH (hereinafter referred to as 'TCI state') configuration information may include information on one or more synchronization signal (SS)/physical broadcast channel (PBCH) block indexes or channel state information reference signal (CSI-RS) indexes in a quasi co located (QCL) relationship with the demodulation reference signal (DMRS) transmitted in the corresponding control area. In addition, the TCI state configuration information may include information on what kind of relationship the QCL relationship is. For example, the configuration of the TCI state may include information as illustrated in Table 8 below.

TABLE 8

```
TCI-State ::=        SEQUENCE {
    tci-StateId      TCI-StateId,
    qcl-Type1        QCL-Info,
    qcl-Type2        QCL-Info           OPTIONAL, --
Need R
    ...
}
QCL-Info ::=         SEQUENCE {
    cell             ServCellIndex      OPTIONAL, --
Need R
    bwp-Id           BWP-Id             OPTIONAL,
    -- Cond CSI-RS-Indicated
    referenceSignal  CHOICE {
        csi-rs       NZP-CSI-RS-ResourceId,
        ssb          SSB-Index
    },
    qcl-Type         ENUMERATED {typeA, typeB, typeC,
typeD},
    ...
}
```

Referring to the TCI state configuration, the index of the reference RS in the QCL relationship, that is, the cell index and/or the BWP index and the QCL type of the reference RS together with the SS/PBCH block index or the CSI-RS index may be configured. The QCL type indicates a channel characteristic that is assumed to be shared between the reference RS and the control domain DMRS, and examples of possible QCL types are as follows.
QCL typeA: Doppler shift, Doppler spread, average delay, delay spread.
QCL typeB: Doppler shift, Doppler spread.
QCL typeC: Doppler shift, average delay.
QCL typeD: Spatial Rx parameter.

The TCI state may be configured similarly not only for the control area DMRS but also for other target RSs, such as PDSCH DMRS and CSI-RS, but a detailed description will be omitted so as not to obscure the gist of the description.

Figure 5A:
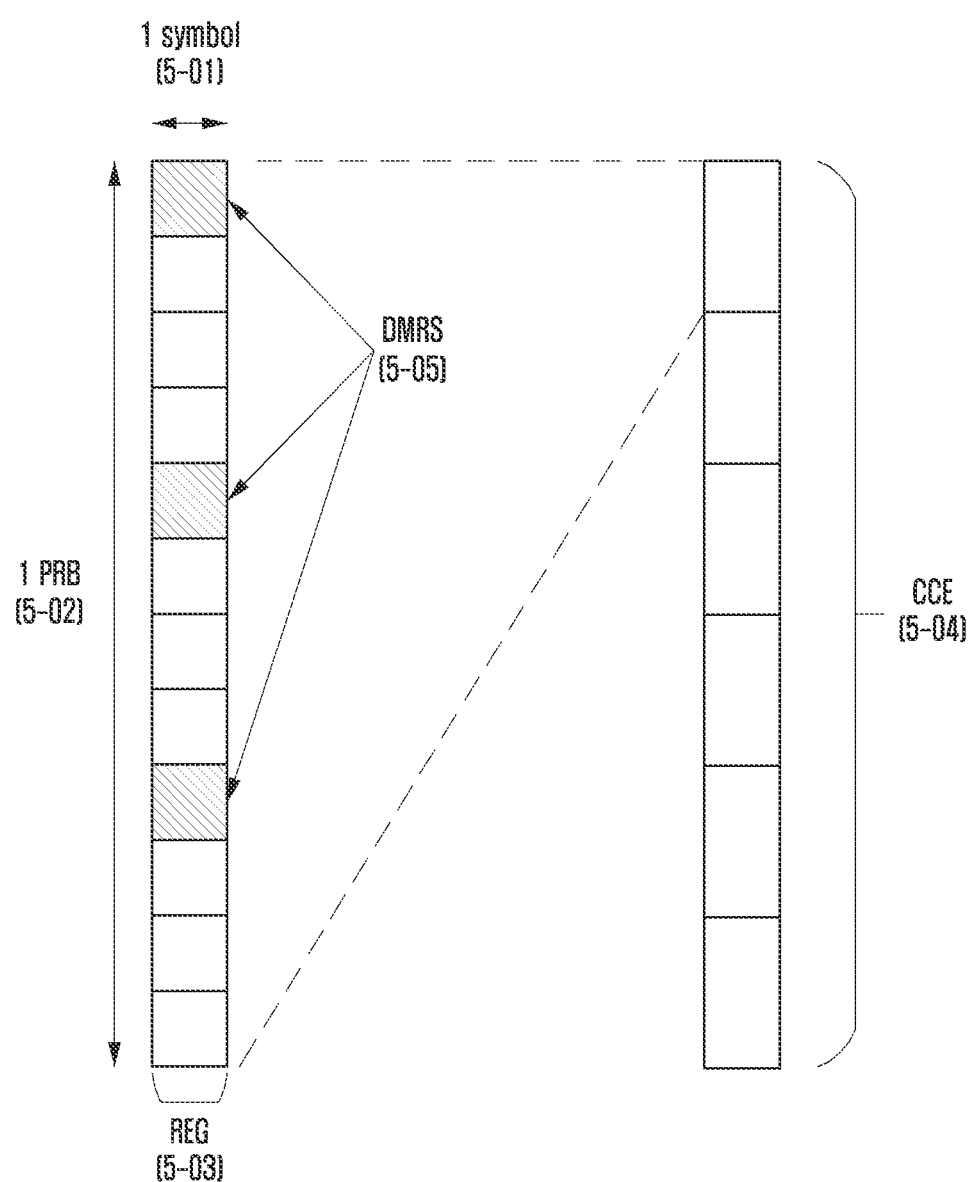
FIG. 5A is a diagram illustrating a structure of a downlink control channel in a wireless communication system according to an embodiment of the disclosure.

FIG. 5A is a diagram illustrating a structure of a downlink control channel of a next-generation wireless communication system according to an embodiment of the disclosure. Specifically, FIG. 5A is a diagram illustrating an example of a basic unit of time and frequency resources constituting a downlink control channel that can be used in a 5G system according to an embodiment of the disclosure.

According to FIG. 5A, the basic unit of time and frequency resources constituting the control channel may be referred to as a resource element group (REG) 5-03. The REG 5-03 may be defined as 1 OFDM symbol 5-01 on the time axis and 1 physical resource block (PRB) 5-02 on the frequency axis, that is, 12 subcarriers. The base station may configure a downlink control channel allocation unit by concatenating the REG 5-03.

Referring to FIG. 5A, when the basic unit to which a downlink control channel is allocated in a 5G communication system is referred to as a control channel element (CCE) 5-04, one CCE 5-04 may be composed of a plurality of REGs 5-03. For example, the REG 5-03 illustrated in FIG. 5A may be composed of 12 REs, and if 1 CCE 5-04 is composed of 6 REGs 5-03, 1 CCE 5-04 may be composed of 72 REs. When the downlink control area is configured, the corresponding area may be composed of a plurality of CCEs 5-04, and a specific downlink control channel is mapped to one or more CCEs 5-04 according to the aggregation level (AL) in the control area and transmitted. The CCEs 5-04 in the control area are divided by numbers, and in this case, numbers of the CCEs 5-04 may be assigned according to a logical mapping method.

The basic unit of the downlink control channel, that is, REG 5-03 illustrated in FIG. 5A, may include both REs to which DCI is mapped and areas to which a demodulation reference signal, DMRS 5-05, which is a reference signal for decoding the REs, is mapped. As in FIG. 5A, 3 DMRSs 5-05 may be transmitted within one REG 5-03. The number of CCEs required to transmit the PDCCH may be 1, 2, 4, 8, or 16 depending on the aggregation level (AL), and different numbers of CCEs may be used to implement link adaptation of the downlink control channel. For example, when AL=L, one downlink control channel may be transmitted through L CCEs.

The UE needs to detect a signal without figuring out information on the downlink control channel, for blind decoding, a search space indicating a set of CCEs may be defined. The search space is a set of downlink control channel candidates consisting of CCEs that the UE should attempt to decode on a given aggregation level. Because there are several aggregation levels that make one bundle with 1, 2, 4, 8 or 16 CCEs, the UE may have a plurality of search spaces. The search space set may be defined as a set of search spaces in all configured aggregation levels.

The search space may be classified into a common search space and a UE-specific search space. According to an embodiment of the disclosure, a certain group of UEs or all UEs may examine the common search space of the PDCCH to receive cell-common control information such as dynamic scheduling for system information or a paging message.

For example, the UEs may receive the PDSCH scheduling allocation information for transmission of the SIB including the operator information of the cell by examining the common search space of the PDCCH. In the case of the common search space, because a certain group of UEs or all UEs must receive the PDCCH, the common search space may be defined as a set of promised CCEs. The UE may receive the scheduling allocation information for the UE-specific PDSCH or PUSCH by examining the UE-specific search space of the PDCCH. The UE-specific search space may be UE-specifically defined as a function of the UE's identity and various system parameters.

In the 5G system, the parameter for the search space for the PDCCH may be configured from the base station to the UE through higher layer signaling (e.g., SIB, MIB, and RRC signaling). For example, the base station may configure the number of PDCCH candidates in each aggregation level L, a monitoring period for the search space, a monitoring occasion in symbol units in a slot for a search space, a search space type (common search space or UE-specific search space), a combination of a DCI format and RNTI to be monitored in the corresponding search space, a control resource set index for monitoring the search space, and the like to the UE. For example, the above-described configuration may include information such as Table 9 below.

TABLE 9

```
SearchSpace ::=                              SEQUENCE {
    -- Identity of the search space. SearchSpaceId = 0 identifies the
       SearchSpace configured via PBCH (MIB) or
       ServingCellConfigCommon.
    searchSpaceId                            SearchSpaceId,
    controlResourceSetId                     ControlResourceSetId,
    monitoringSlotPeriodicityAndOffset             CHOICE {
        sl1                                      NULL,
        sl2                                      INTEGER (0..1),
        sl4                                      INTEGER (0..3),
        sl5                                      INTEGER (0..4),
        sl8                                      INTEGER (0..7),
        sl10                                     INTEGER (0..9),
        sl16                                     INTEGER (0..15),
        sl20                                     INTEGER (0..19)
    }
        OPTIONAL,
    duration                                 INTEGER (2..2559)
    monitoringSymbolsWithinSlot                     BIT STRING (SIZE
        (14))                                       OPTIONAL,
    nrofCandidates                           SEQUENCE {
        aggregationLevel1                    ENUMERATED {n0, n1, n2,
        n3, n4, n5, n6, n8},
        aggregationLevel2                    ENUMERATED {n0, n1, n2,
        n3, n4, n5, n6, n8},
        aggregationLevel4                    ENUMERATED {n0, n1, n2,
        n3, n4, n5, n6, n8},
        aggregationLevel8                    ENUMERATED {n0, n1, n2,
        n3, n4, n5, n6, n8},
        aggregationLevel16                   ENUMERATED {n0, n1, n2,
        n3, n4, n5, n6, n8},
    },
    searchSpaceType                          CHOICE {
        -- Configures this search space as common search space (CSS) and
        DCI formats to monitor.
        common                               SEQUENCE {
    }
        ue-Specific                          SEQUENCE {
        -- Indicates whether the UE monitors in this USS for DCI formats 0-
        0 and 1-0 or for formats 0-1 and 1-1.
            formats                          ENUMERATED
            {formats0-0-And-1-0, formats0-1-And-1-1},
            ...
        }
```

According to the configuration information, the base station may configure one or a plurality of search space sets to the UE. According to an embodiment of the disclosure, the base station may configure the search space set 1 and the search space set 2 to the UE, and in search space set 1, may configure to monitor DCI format A scrambled by X-RNTI in a common search space, and in search space set 2, may configure to monitor DCI format B scrambled by Y-RNTI in the UE-specific search space.

According to the configuration information, one or a plurality of search space sets may exist in the common search space or the UE-specific search space. For example, the search space set #1 and the search space set #2 may be configured as the common search space, and the search space set #3 and the search space set #4 may be configured as the UE-specific search space.

In the common search space, a combination of the following DCI format and RNTI may be monitored. Of course, not limited to the following examples.

DCI format 0_0/1_0 with CRC scrambled by C-RNTI, CS-RNTI, SP-CSI-RNTI, RA-RNTI, TC-RNTI, P-RNTI, SI-RNTI
DCI format 2_0 with CRC scrambled by SFI-RNTI
DCI format 2_1 with CRC scrambled by INT-RNTI
DCI format 2_2 with CRC scrambled by TPC-PUSCH-RNTI, TPC-PUCCH-RNTI
DCI format 2_3 with CRC scrambled by TPC-SRS-RNTI In the UE-specific search space, a combination of the following DCI format and RNTI may be monitored. Of course, not limited to the following examples.

DCI format 0_0/1_0 with CRC scrambled by C-RNTI, CS-RNTI, TC-RNTI
DCI format 1_0/1_1 with CRC scrambled by C-RNTI, CS-RNTI, TC-RNTI The specified RNTIs may follow the definitions and uses below.

C-RNTI (Cell RNTI): UE-specific PDSCH scheduling purpose

TC-RNTI (Temporary Cell RNTI): UE-specific PDSCH scheduling purpose

CS-RNTI (Configured Scheduling RNTI): Semi-statically configured UE-specific PDSCH scheduling purpose RA-RNTI (Random Access RNTI): PDSCH scheduling purpose in the random access phase P-RNTI (Paging RNTI): PDSCH scheduling purpose for which paging is transmitted SI-RNTI (System Information RNTI): PDSCH scheduling purpose in which system information is transmitted INT-RNTI (Interruption RNTI): Used to indicate whether PDSCH is puncturing TPC-PUSCH-RNTI (Transmit Power Control for PUSCH RNTI): Used to indicate power control command for PUSCH TPC-PUCCH-RNTI (Transmit Power Control for PUCCH RNTI): Used to indicate power control command for PUCCH TPC-SRS-RNTI (Transmit Power Control for SRS RNTI): Used to indicate power control command for SRS According to an embodiment, the above specified DCI formats may follow the definition below.

TABLE 10

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

According to an embodiment of the disclosure, in a 5G system, a plurality of search space sets may be configured with different parameters (e.g., parameters of Table 9). Accordingly, the set of search space sets monitored by the UE at every time point may be different. For example, if search space set #1 is configured with X-slot period and search space set #2 is configured with Y-slot period and X and Y are different, the UE may monitor both the search space set #1 and the search space set #2 in a specific slot, and may monitor one of the search space set #1 and the search space set #2 in another specific slot.

If a plurality of search space sets are configured to the UE, the following conditions may be considered in a method for determining the search space set to be monitored by the UE.

Condition 1: Limit the Maximum Number of PDCCH Candidates

The number of PDCCH candidates that can be monitored per slot may not exceed $M^\mu$. The $M^\mu$ may be defined as the maximum number of PDCCH candidates per slot in a cell configured to a subcarrier spacing of 15.24 kHz, and may be defined in the table below.

TABLE 11

| μ | Maximum number of PDCCH candidate per slot and per serving cell ($M^\mu$) |
| --- | --- |
| 0 | 44 |
| 1 | 36 |
| 2 | 22 |
| 3 | 20 |

Condition 2: Limit the Maximum Number of CCEs

The number of CCEs constituting the entire search space per slot (the total search space refers to the entire set of CCEs corresponding to the union region of a plurality of search space sets) may not exceed CH. CH may be defined as the maximum number of CCEs per slot in a cell configured to a subcarrier spacing of 15.24 kHz, and may be defined in the Table 12 below.

TABLE 12

| | Maximum number $M^\mu$ of monitored PDCCH candidates per span for combination (X, Y) and per serving cell | | |
| --- | --- | --- | --- |
| μ | (2, 2) | (4, 3) | (7, 4) |
| 0 | 14 | 28 | 44 |
| 1 | 12 | 24 | 36 |

For convenience of explanation, a situation that satisfies both conditions 1 and 2 at a specific time point may be defined as "condition A". Accordingly, not satisfying condition A may refer to not satisfying at least one of conditions 1 and 2 above.

Based on the configuration of the search space sets by the base station, the condition A may not be satisfied at a specific time point. If condition A is not satisfied at a specific time point, the UE may select and monitor only some of the search space sets configured to satisfy condition A at the corresponding time point, and the base station may transmit the PDCCH to the selected search space set.

According to an embodiment of the disclosure, the following method may be followed as a method of selecting a partial search space from among all configured search space sets.

Method 1

When the condition A for PDCCH is not satisfied at a specific time point (slot), the UE (or the base station) may preferentially select a search space set in which a search space type is configured as a common search space from among search space sets existing at a corresponding time, over a search space set configured as a UE-specific search space.

When all search space sets configured as the common search space are selected (that is, when the condition A is satisfied even after selecting all search spaces set as common search spaces), the UE (or the base station) may select search space sets configured as the UE-specific search space. In this case, when there are a plurality of search space sets configured as the UE-specific search space, a search space set having a low search space set index may have a higher priority. The UE (or the base station) may select the UE-specific search space sets within a range in which condition A is satisfied in consideration of priority.

In the 5G, the search space of the aggregation level L in the control area (control resource set, CORSET) p and the search space set s may be expressed as the following Equation 1.

$$L \cdot \left\{ \left( y_{p,n_{s,f}^{\mu}} + \left\lfloor \frac{m_{s,n_{cI}} \cdot N_{CCE,p}}{L \cdot M_{p,s,max}^{(L)}} \right\rfloor + n_{CI} \right) \mod \lfloor N_{CCE,p}/L \rfloor \right\} + i \quad \text{Equation 1}$$

L: aggregation level $n_{CI}$: Carrier index $N_{CCE,p}$: The total number of CCEs exist in the control area p $n_{s,f}^{\mu}$: Slot index $M_{s,max}^{(L)}$: The number of PDCCH candidates of aggregation level L $m_{s,n_{CI}} = 0, \ldots, M_{p,s,max}^{(L)} - 1$: The index of PDCCH candidate of aggregation level L $i = 0, \ldots, L-1$ $Y_{p,n_{s,f}^{\mu}} = (A_p \cdot Y_{p,n_{s,f}^{\mu}-1}) \mod D$, $Y_{p,-1} = n_{RNTI} \neq 0$, $A_0 = 39827$, $A_1 = 39829$, $A_2 = 39839$, $D = 65537$ $n_{RNTI}$: UE identifier The Y_(p,nμs,f) value may correspond to 0 in the case of a common search space.

The Y_(p,nμs,f) value may correspond to a value that changes depending on the UE's identity (C-RNTI or ID configured for the UE by the base station) and the time index in the case of a UE-specific search space.

In 5G, as a plurality of search space sets may be configured with different parameters (e.g., parameters in Table 9), the set of search space sets monitored by the UE at every time point may vary. For example, if search space set #1 is configured with X-slot period and search space set #2 is configured with Y-slot period and X and Y are different, the UE may monitor both the search space set #1 and the search space set #2 in a specific slot, and may monitor one of the search space set #1 and the search space set #2 in another specific slot.

The UE may perform UE capability reporting for each subcarrier spacing in the case of having a plurality of PDCCH monitoring positions within a slot, and in this case, the concept of span may be used. The span refers to continuous symbols for the UE to monitor the PDCCH in the slot, and each PDCCH monitoring position is within one span. The span may be expressed as (X,Y), where X refers to the minimum number of symbols that must be separated between the first symbols of two consecutive spans, and Y refers to the number of consecutive symbols capable of monitoring the PDCCH within one span. In this case, the UE may monitor the PDCCH in the interval within the Y symbol from the first symbol of the span in the span.

Figure 5B:
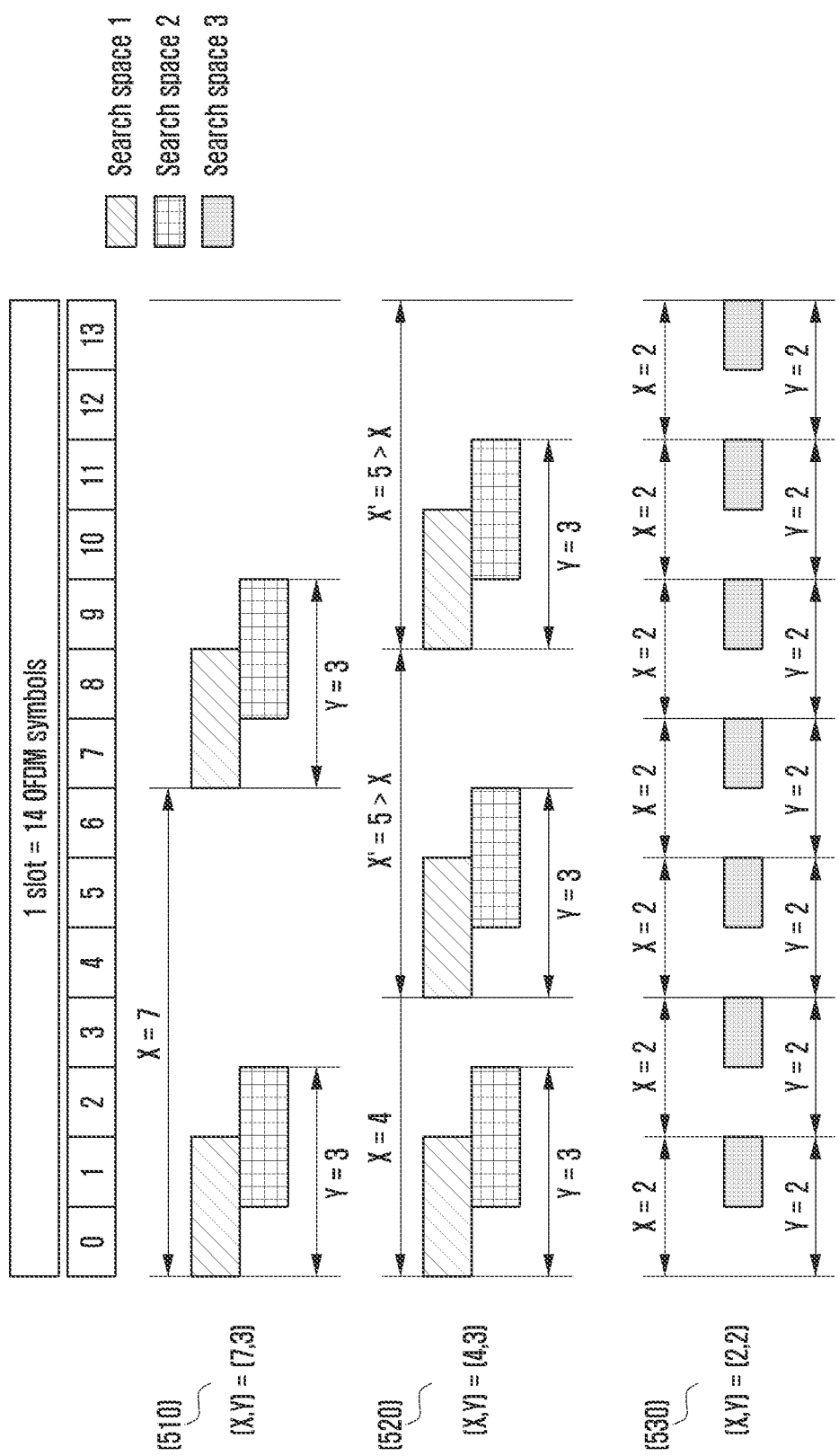
FIG. 5B is a diagram illustrating a case in which a UE may have a plurality of PDCCH monitoring positions within a slot through a span in a wireless communication system according to an embodiment of the disclosure.

FIG. 5B is a diagram illustrating a case in which a UE may have a plurality of PDCCH monitoring positions within a slot through a span in a wireless communication system according to an embodiment of the disclosure.

Referring to FIG. 5B, for example, span is possible in the case of (X,Y)=(7,4), (4,3), (2,2), and the three cases are illustrated by reference numerals 510, 520, and 530 in FIG. 5B, respectively. As an example, 510 represents a case in which two spans that can be expressed as (7,3) exist in the slot. The interval between the first symbols of two spans is expressed as X=7, and PDCCH monitoring positions may exist within a total of Y=3 symbols from the first symbol of each span, and it is indicated that search spaces 1 and 2 exist within Y=3 symbols, respectively. As another example, in 520, the case where there are a total of three spans, which can be expressed as (4,3), in the slot is expressed, and the interval between the second and third spans was illustrated to be separated by X'=5 symbols greater than X=4. In 530, a case in which a total of 7 spans that can be expressed by (2,2) exist within a slot, and from the first symbol of each span, PDCCH monitoring positions may exist within a total of Y=2 symbols, indicating that search space 3 exists within Y=2 symbols.

Hereinafter, methods for allocating time and frequency resources for data transmission in an NR system are described.

In the NR system, the following detailed frequency domain resource allocation (FD-RA) methods may be provided in addition to frequency domain resource candidate allocation through BWP indication.

Figure 6:
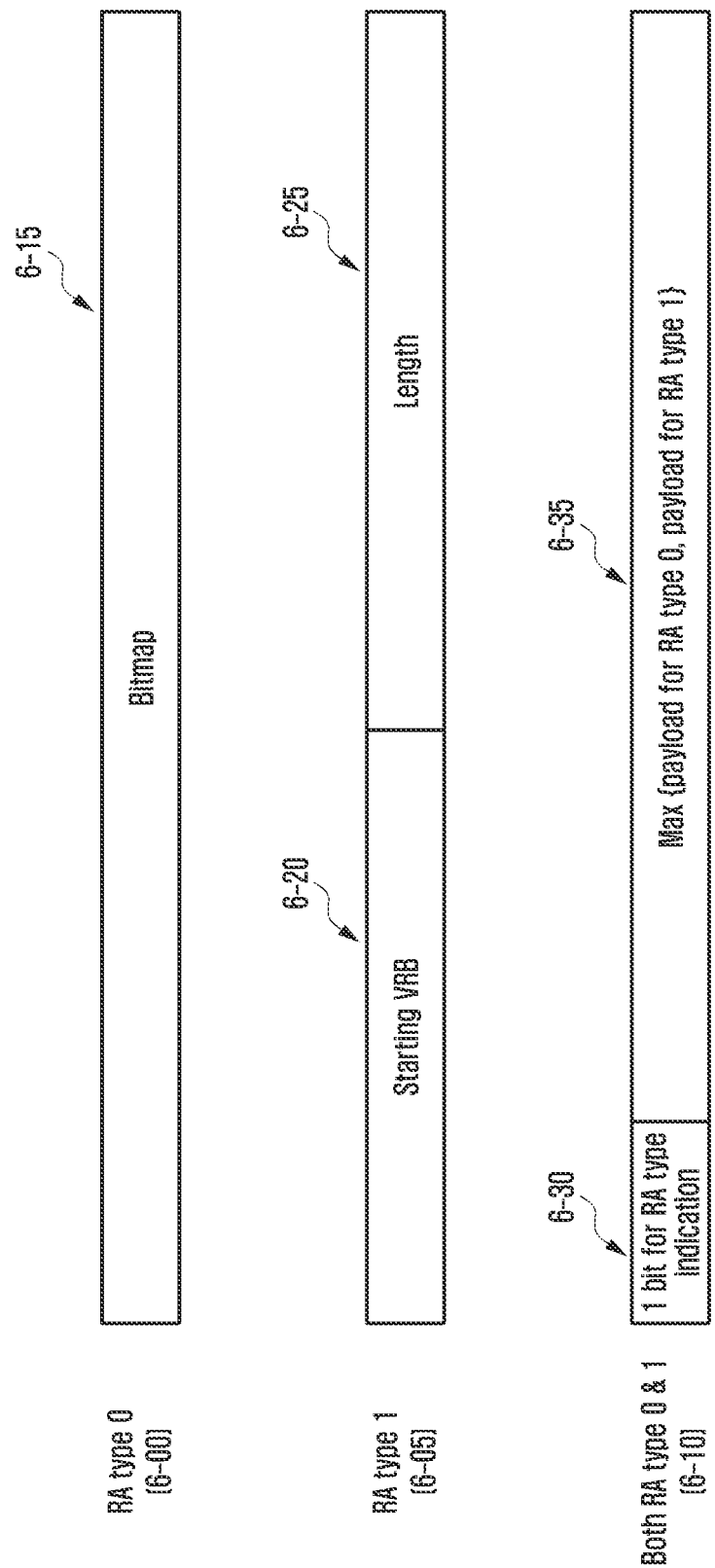
FIG. 6 is a diagram illustrating an example of frequency domain resource allocation of a physical downlink shared channel (PDSCH) in a wireless communication system according to an embodiment of the disclosure.

FIG. 6 is a diagram illustrating an example of frequency domain resource allocation of a PDSCH in a wireless communication system according to an embodiment of the disclosure.

Specifically, FIG. 6 illustrates three frequency domain resource allocation methods such as type 0 6-00, type 1 6-05, and dynamic switch 6-10 configurable through a higher layer in the NR system.

Referring to FIG. 6, if the UE is configured to use only resource type 0 through higher layer signaling (6-00), some downlink control information (DCI) for allocating a PDSCH to a corresponding UE have a bitmap composed of $N_{RBG}$ bits. The conditions for this will be described again later. At this time, $N_{RBG}$ refers to the number of resource block groups (RBGs) determined as illustrated in Table 13 below according to the BWP size allocated by the BWP indicator and the higher layer parameter rbg-Size, and the data are transmitted in the RBG represented as 1 by the bitmap.

TABLE 13

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

If the UE is configured to use only resource type 1 (6-05) through higher layer signaling, some DCI for allocating PDSCH to the UE has frequency domain resource allocation information composed of $$\left\lceil \log_2\left(\frac{N_{RB}^{DL,BWP}(N_{RB}^{DL,BWP}+1)}{2}\right) \right\rceil$$

bits. Conditions for this will be described again later. The base station may configure the starting virtual resource block (VRB) (e.g., payload 6-20) and the length 6-25 of frequency-domain resources continuously allocated therefrom.

If the UE is configured to use both resource type 0 and resource type 1 through higher layer signaling (e.g., dynamic switch 6-10), some DCI for allocating the PDSCH to the UE has frequency domain resource allocation information composed of bits of a larger value 6-35 among a payload 6-15 for configuring resource type 0 and a payload 6-20 and length 6-25 for configuring resource type 1. Conditions for this will be described again later. At this time, one bit (e.g., bit 6-30) may be added to the first part (most significant byte, MSB) of the frequency domain resource allocation information in DCI, and when the bit is 0, it may indicate that resource type 0 is used, and when the bit is 1, it may indicate that resource type 1 is used.

Hereinafter, a method of allocating time domain resources for a data channel in a next-generation wireless communication system (5G or NR system) will be described.

The base station may configure the table for time domain resource allocation information for the downlink shared channel (PDSCH) and the uplink shared channel (PUSCH) through higher layer signaling (e.g., RRC signaling) to the UE. For PDSCH, a table consisting of maxNrofDL-Allocations=16 entries may be configured, and for PUSCH, a table consisting of maxNrofUL-Allocations=16 entries may be configured. In one embodiment, PDCCH-to-PDSCH slot timing (corresponds to the time interval in slot units between the time when the PDCCH is received and the time when the PDSCH scheduled by the received PDCCH is transmitted, denoted by K0), PDCCH-to-PUSCH slot timing (corresponds to the time interval in slot units between the time when the PDCCH is received and the time when the PUSCH scheduled by the received PDCCH is transmitted, denoted by K2), information on the position and length of a start symbol in which a PDSCH or PUSCH is scheduled in the slot, mapping type of PDSCH or PUSCH, etc. may be included in the time domain resource allocation information. For example, information such as Table 14 or Table 15 below may be notified from the base station to the UE.

TABLE 14

| PDSCH-TimeDomainResourceAllocationList information element |
|---|
| PDSCH-TimeDomainResourceAllocationList ::= SEQUENCE (SIZE(1..maxNrofDL-Allocations)) OF PDSCH-TimeDomainResourceAllocation |

TABLE 14-continued

| PDSCH-TimeDomainResourceAllocationList information element | |
|---|---|
| PDSCH-TimeDomainResourceAllocation ::=   k0 INTEGER(0..32) OPTIONAL, -- Need S | SEQUENCE { |
|   mappingType | ENUMERATED {typeA, typeB}, |
|   startSymbolAndLength | INTEGER (0..127) |
| } | |

TABLE 15

| PUSCH-TimeDomainResourceAllocation information element | |
|---|---|
| PUSCH-TimeDomainResourceAllocationList ::= (SIZE(1..maxNrofUL-Allocations)) OF PUSCH-TimeDomainResourceAllocation | SEQUENCE |
| PUSCH-TimeDomainResourceAllocation ::=   k2                           INTEGER(0..32) | SEQUENCE { OPTIONAL, -- Need S |
|   mappingType | ENUMERATED {typeA, typeB}, |
|   startSymbolAndLength | INTEGER (0..127) |
| } | |

The base station may notify the UE of one of the entries in the table for the time domain resource allocation information through L1 signaling (e.g., DCI) (for example, the base station indicates with the 'time domain resource allocation' field in DCI). The UE may obtain time domain resource allocation information for the PDSCH or PUSCH based on the DCI received from the base station.

Figure 7:
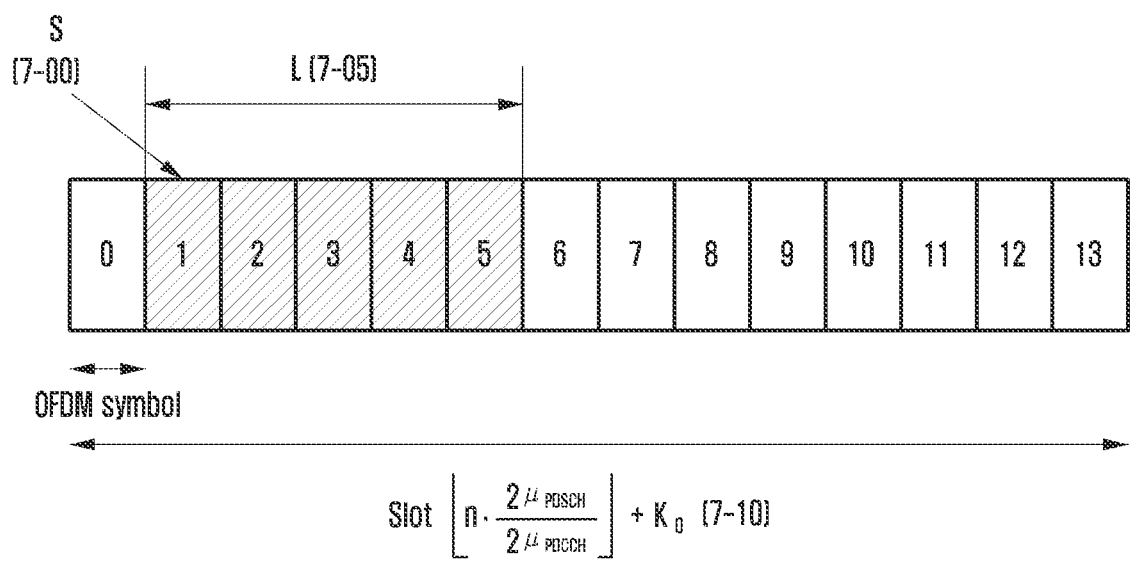
FIG. 7 is a diagram illustrating an example of time domain resource allocation of a PDSCH in a wireless communication system according to an embodiment of the disclosure.

FIG. 7 is a diagram illustrating an example of time domain resource allocation of a physical downlink shared channel (PDSCH) in a wireless communication system according to an embodiment of the disclosure.

Referring to FIG. 7, a base station may indicate the time domain position of the PDSCH resource according to the subcarrier spacing (SCS) ($\mu_{PDSCH}$, $\mu_{PDCCH}$) of the data channel and the control channel configured using the higher layer, the scheduling offset value (K0), and the OFDM symbol start position 7-00 and the length 7-05 within one slot 7-10 that is dynamically indicated through DCI.

Figure 8:
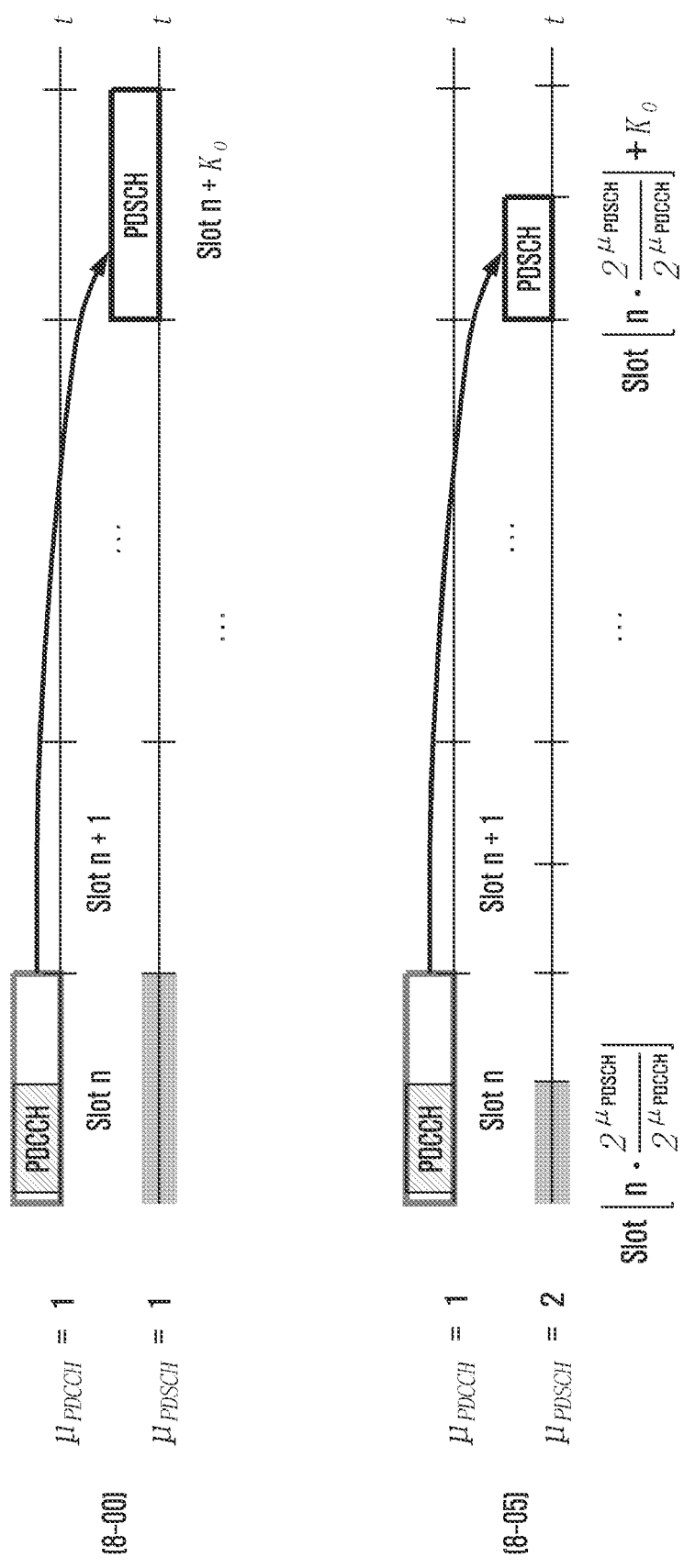
FIG. 8 is a diagram illustrating an example of time domain resource allocation according to subcarrier spacing of a data channel and a control channel in a wireless communication system according to an embodiment of the disclosure.

FIG. 8 is a diagram illustrating an example of time domain resource allocation according to subcarrier spacing of a data channel and a control channel in a wireless communication system according to an embodiment of the disclosure.

Referring to FIG. 8, when the subcarrier spacing of the data channel and the control channel are the same (8-00, $\mu_{PDSCH}=\mu_{PDCCH}$), because the slot numbers for the data channel and the control channel are the same, the base station and the UE may know that a scheduling offset occurs in accordance with a predetermined slot offset $K_0$. On the other hand, when the subcarrier spacing of the data channel and the control channel are different (8-05, $\mu_{PDSCH}\neq\mu_{PDCCH}$), because the slot numbers for the data channel and the control channel are different, the base station and the UE may know that a scheduling offset occurs in accordance with a predetermined slot offset $K_0$ based on the subcarrier interval of the PDCCH.

In the LTE and NR systems, the UE may perform a procedure of reporting the capability supported by the UE to the corresponding base station while connected to the serving base station. Hereinafter, this is referred to as UE capability (reporting).

The base station may transmit a UE capability enquiry message for requesting UE capability report to the UE in the connected state. The UE capability enquiry message may include a UE capability request for each radio access technology (RAT) type of the base station. The request for each RAT type may include frequency band information required. In addition, in case of the UE capability enquiry message, one RRC message container may request a plurality of RAT types, or may include and transmit a UE capability enquiry message including a request for each RAT type a plurality of times to the UE. That is, the UE capability enquiry is repeated a plurality of times, and the UE may configure a corresponding UE capability information message and report it a plurality of times. In the next-generation wireless communication system, a UE capability request for MR-DC including NR, LTE, and EN-DC may be performed. In addition, the UE capability enquiry message is generally transmitted initially after the UE is connected with the base station, but may be requested by the base station when necessary, at any condition.

Upon receiving the UE capability report request from the base station, the UE may configure UE capability according to the RAT type and band information requested from the base station. Hereinafter, a method for the UE to configure UE capability in the NR system will be described.

1. If the UE is provided with a list for the LTE and/or the NR band through the UE capability request from the base station, the UE may configure a band combination (BC) for EN-DC and NR stand-alone (SA). That is, based on the requested bands through the FreqBandList from the base station, the UE configures a BC candidate list for EN-DC and NR SA. In addition, the priorities of the bands may have priorities in the order described in the FreqBandList.

2. If the base station requests UE capability report by setting the "eutra-nr-only" flag or "eutra" flag, the UE completely removes things about NR SA BCs from the candidate list of BCs configured. This operation may occur only when an LTE base station (eNB) requests "eutra" capability.

3. Thereafter, the UE removes fallback BCs from the candidate list of BCs configured. The fallback BC corresponds to a case in which a band corresponding to at least one SCell is removed from a certain super set BC, and because the super set BC can already cover the fallback BC, the fallback BC may be omitted. This operation may also be applied to MR-DC, and LTE bands may also be applied. BCs remaining after this operation are the final "candidate BC list".

4. The UE may select BCs to be reported by selecting BCs corresponding to the requested RAT type from the "final candidate BC list". In this operation, the UE configures a supportedBandCombinationList in a fixed order. That is, the UE configures BC and UE capability to be reported according to the preset RAT-Type order (nr→eutra-nr→eutra). In addition, the UE configures a featureSetCombination for the configured supportedBandCombinationList, and configures a list of "candidate feature set combinations" from the candidate BC list from which the list for fallback BC (including the same or lower level capability) has been removed. The "candidate feature set combination" may include both feature set combinations for NR and EUTRA-NR BC, and may be obtained from the feature set combination of UE-NR-Capabilities and UE-MRDC-Capabilities containers.

5. In addition, if the RAT Type requested is eutra-nr and affects, the featureSetCombinations may be included in two containers of UE-MRDC-Capabilities and UE-NR-Capabilities. However, the NR feature set may be included only in UE-NR-Capabilities.

After the UE capability is configured, the UE may transmit a UE capability information message including the UE capability to the base station. The base station may perform scheduling and transmission/reception management to the UE, based on the UE capability information received from the UE.

In the NR system, the UE may transmit uplink control information (UCI) to the base station through a physical uplink control channel (PUCCH). The uplink control information may include at least one of HARQ-ACK indicating whether or not demodulation/decoding is successful for the transport block (TB) received by the UE through the PDSCH, scheduling request (SR) in which the UE requests resource allocation to the PUSCH base station for uplink data transmission, and channel state information (CSI), which is information for reporting the channel state of the UE.

PUCCH resources may be largely divided into long PUCCH and short PUCCH according to the length of the allocated symbol. In the NR system, a long PUCCH has a length of 4 symbols or more in a slot, and a short PUCCH has a length of 2 symbols or less in a slot.

To describe the Long PUCCH in more detail, the long PUCCH may be used for the purpose of improving uplink cell coverage, and thus may be transmitted in a single-carrier DFT-S-OFDM scheme rather than OFDM transmission. Long PUCCH supports transport formats such as PUCCH format 1, PUCCH format 3, and PUCCH format 4 according to the number of supportable control information bits and whether UE multiplexing is supported through Pre-DFT OCC support in the front end of the IFFT.

First, PUCCH format 1 is a DFT-S-OFDM-based long PUCCH format capable of supporting up to 2 bits of control information, and uses a frequency resource of 1 RB. Control information may be composed of a combination or each of HARQ-ACK and SR. In PUCCH format 1, an OFDM symbol including a demodulation reference signal (DMRS), which is a demodulation reference signal, and an OFDM symbol including UCI are repeatedly configured.

For example, when the number of transmission symbols of PUCCH format 1 is 8 symbols, it may consist of a DMRS symbol, a UCI symbol, a DMRS symbol, a UCI symbol, a DMRS symbol, a UCI symbol, a DMRS symbol, and a UCI symbol in order from the first start symbol of the 8 symbols. The DMRS symbol is spread using an orthogonal code (or orthogonal sequence or spreading code, $w_i(m)$) on the time axis in a sequence corresponding to a length of 1 RB on the frequency axis within one OFDM symbol, and may be transmitted after performing IFFT.

The UCI symbol may be transmitted after the UE BPSK-modulates 1-bit control information and QPSK-modulates 2-bit control information to generate d(0), scrambles by multiplying the generated d(0) by a sequence corresponding to the length of 1 RB on the frequency axis, and spreads the scrambled sequence using an orthogonal code (or orthogonal sequence or spreading code, $w_i(m)$) on the time axis and performs IFFT.

The UE generates a sequence based on the group hopping or sequence hopping configuration and the set ID set by the higher layer signaling from the base station, and generates a sequence corresponding to a length of 1 RB by cyclic shifting a sequence generated with an initial cyclic shift (CS) value set as an upper signal.

$w_i(m)$ is determined as $$w_1(m) = e^{\frac{j2\pi\phi(m)}{N_{SF}}}$$

when the length ($N_{SF}$) of the spreading code is given, and is specifically given as Table 16 below. i refers to the index of the spreading code itself, and m refers to the index of elements of the spreading code. The numbers in [ ] in Table 16 refers to ϕ(m) and for example, when the length of the spreading code is 2 and the index of the configured spreading code i=0, the spreading code w_i(m) becomes $w_i(0)=e^{j2\pi \cdot 0/N_{SF}}=1$, $w_i(1)=e^{j2\pi \cdot 0/N_{SF}}=1$ and $w_i(m)=[1\ 1]$.

TABLE 16

| | ϕ(m) | | | | | | |
|---|---|---|---|---|---|---|---|
| $N_{SF}$ | i = 0 | i = 1 | i = 2 | i = 3 | i = 4 | i = 5 | i = 6 |
| 1 | [0] | — | — | — | — | — | — |
| 2 | [0 0] | [0 1] | — | — | — | — | — |
| 3 | [0 0 0] | [0 1 2] | [0 2 1] | — | — | — | — |
| 4 | [0 0 0 0] | [0 2 0 2] | [0 0 2 2] | [0 2 2 0] | — | — | — |
| 5 | [0 0 0 0 0] | [0 1 2 3 4] | [0 2 4 1 3] | [0 3 1 4 2] | [0 4 3 2 1] | — | — |
| 6 | [0 0 0 0 0 0] | [0 1 2 3 4 5] | [0 2 4 0 2 4] | [0 3 0 3 0 3] | [0 4 2 0 4 2] | [0 5 4 3 2 1] | — |
| 7 | [0 0 0 0 0 0 0] | [0 1 2 3 4 5 6] | [0 2 4 6 1 3 5] | [0 3 6 2 5 1 4] | [0 4 1 5 2 6 3] | [0 5 3 1 6 4 2] | [0 6 5 4 3 2 1] | spreading code $$w_i(m) = e^{j2\pi\phi(m)/N_{SF,m'}^{PUCCH,1}}$$

for PUCCH format 1.

Next, PUCCH format 3 is a DFT-S-OFDM-based long PUCCH format that can support more than 2 bits of control information, and the number of RBs used may be set through a higher layer. Control information may be composed of a combination or each of HARQ-ACK, SR, and CSI. In PUCCH format 3, the DMRS symbol position is presented in the following Table 17 according to whether frequency hopping within the slot and whether additional DMRS symbols are configured.

TABLE 17

| | DM-RS position l within PUCCH span | | | |
|---|---|---|---|---|
| | No additional DM-RS | | Additional DM-RS | |
| PUCCH length | No hopping | Hopping | No hopping | Hopping |
| 4 | 1 | 0, 2 | 1 | 0, 2 |
| 5 | 0, 3 | | 0, 3 | |
| 6 | 1, 4 | | 1, 4 | |
| 7 | 1, 4 | | 1, 4 | |
| 8 | 1, 5 | | 1, 5 | |
| 9 | 1, 6 | | 1, 6 | |
| 10 | 2, 7 | | 1, 3, 6, 8 | |
| 11 | 2, 7 | | 1, 3, 6, 9 | |
| 12 | 2, 8 | | 1, 4, 7, 10 | |
| 13 | 2, 9 | | 1, 4, 7, 11 | |
| 14 | 3, 10 | | 1, 5, 8, 12 | |

For example, when the number of transmission symbols of PUCCH format 3 is 8 symbols, the first start symbol of the 8 symbols starts with 0, and the DMRS is transmitted to the first symbol and the fifth symbol. Table 17 is also applied to the DMRS symbol position of PUCCH format 4 in the same way.

Next, PUCCH format 4 is a DFT-S-OFDM-based long PUCCH format capable of supporting more than 2 bits of control information, and uses 1 RB of frequency resources. Control information may be composed of a combination or each of HARQ-ACK, SR, and CSI. The difference between PUCCH format 4 and PUCCH format 3 is that PUCCH format 4 can multiplex PUCCH format 4 of multiple UEs within one RB. It is possible to multiplex PUCCH format 4 of multiple UEs by applying Pre-DFT orthogonal cover code (OCC) to control information in the front end of IFFT. However, the number of transmittable control information symbols of one UE is reduced according to the number of multiplexed UEs. The number of multiplexable UEs, that is, the number of different available OCCs may be 2 or 4, and the number of OCCs and an OCC index to be applied may be configured through a higher layer.

Next, the short PUCCH will be described. The Short PUCCH may be transmitted in both a downlink centric slot and an uplink centric slot, and in general, may be transmitted in the last symbol of the slot or an OFDM symbol in the rear part (e.g., the last OFDM symbol or the second-to-last OFDM symbol, or the last 2 OFDM symbols). Of course, it is also possible to transmit the Short PUCCH at any position within the slot. In addition, the Short PUCCH may be transmitted using one OFDM symbol or two OFDM symbols. The Short PUCCH may be used to reduce delay time compared to long PUCCH in a situation in which uplink cell coverage is good, and may be transmitted in a CP-OFDM scheme.

The Short PUCCH may support transport formats such as PUCCH format 0 and PUCCH format 2 according to the number of supportable control information bits. First, PUCCH format 0 is a short PUCCH format capable of supporting up to 2 bits of control information, and uses 1 RB of frequency resources. Control information may be composed of a combination or each of HARQ-ACK and SR. PUCCH format 0 has a structure in which only a sequence mapped to 12 subcarriers is transmitted on the frequency axis within one OFDM symbol without transmitting DMRS. The UE may generate a sequence based on the group hopping or sequence hopping configuration and the configured ID set as the upper signal from the base station, and may cyclic shift a sequence generated as a final CS value obtained by adding a different CS value depending on whether the indicated initial cyclic shift (CS) value is ACK or NACK, and may be mapped to 12 subcarriers and transmitted.

For example, if HARQ-ACK is 1 bit, as illustrated in Table 18 below, the UE may generate a final CS by adding 6 to the initial CS value in case of ACK, and may generate a final CS by adding 0 to the initial CS in case of NACK. A CS value of 0 for NACK and a CS value of 6 for ACK are defined in the standard, and the UE may transmit 1-bit HARQ-ACK by generating PUCCH format 0 according to the value defined in the standard.

TABLE 18

| 1 bit HARQ-ACK | NACK | ACK |
|---|---|---|
| Final CS | (Initial CS + 0) mod 12 = initial CS | (Initial CS + 6) mod 12 |

For example, when HARQ-ACK is 2 bits, as illustrated in Table 19 below, the UE adds 0 to the initial CS value if it is (NACK, NACK), adds 3 to the initial CS value if it is (NACK, ACK), and adds 6 to the initial CS value if it is (ACK, ACK), and add 9 to the initial CS value if (ACK, NACK). A CS value of 0 for (NACK, NACK), a CS value of 3 for (NACK, ACK), a CS value of 6 for (ACK, ACK), and a CS value of 9 for (ACK, NACK) are defined in the standard, and the UE may generate PUCCH format 0 according to the value defined in the standard and transmit 2-bit HARQ-ACK.

If the final CS value exceeds 12 due to the CS value added according to ACK or NACK to the initial CS value, because the length of the sequence is 12, modulo 12 may be applied to the final CS value.

TABLE 19

| 2 bit HARQ-ACK | NACK, NACK | NACK, ACK | ACK, ACK | ACK, NACK |
|---|---|---|---|---|
| Final CS | (Initial CS + 0) mod 12 = Initial CS | (Initial CS + 3) mod 12 | (Initial CS + 6) mod 12 | (Initial CS + 9) mod 12 |

Next, PUCCH format 2 is a short PUCCH format supporting more than 2 bits of control information, and the number of RBs used may be configured through a higher layer. Control information may be composed of a combination or each of HARQ-ACK, SR, and CSI. When the index of the first subcarrier is #0, PUCCH format 2 may be fixed to a subcarrier having indexes of #1, #4, #7, and #10 in which a position of a subcarrier on which DMRS is transmitted within one OFDM symbol. The control information may be mapped to the remaining subcarriers except for the subcarrier in which the DMRS is located through a modulation process after channel encoding.

In summary, the configurable values and ranges for each of the above-described PUCCH formats may be summarized as illustrated in Table 20 below. If the value does not need to be configured in Table 20 below, it is indicated as N.A.

TABLE 20

| | | PUCCH Format 0 | PUCCH Format 1 | PUCCH Format 2 | PUCCH Format 3 | PUCCH Format 4 |
|---|---|---|---|---|---|---|
| Starting symbol | Configurability | ✓ | ✓ | ✓ | ✓ | ✓ |
| | Value range | 0-13 | 0-10 | 0-13 | 0-10 | 0-10 |
| Number of symbols in a slot | Configurability | ✓ | ✓ | ✓ | ✓ | ✓ |
| | Value range | 1, 2 | 4-14 | 1, 2 | 4-14 | 4-14 |
| Index for identifying starting PRB | Configurability | ✓ | ✓ | ✓ | ✓ | ✓ |
| | Value range | 0-274 | 0-274 | 0-274 | 0-274 | 0-274 |
| Number of PRBs | Configurability | N.A. | N.A. | ✓ | ✓ | N.A. |
| | Value range | N.A.(Default is 1) | N.A.(Default is 1) | 1-16 | 1-6, 8-10, 12, 15, 16 | N.A. (Default is 1) |
| Enabling frequency hopping (intra-slot) | Configurability | ✓ | ✓ | ✓ | ✓ | ✓ |
| | Value range | On/Off (only for 2 symbol) | On/Off | On/Off (only for 2 symbol) | On/Off | On/Off |
| Freq.cy resource of $2^{nd}$ hop if intra-slot frequency is enabled | Configurability | ✓ | ✓ | ✓ | ✓ | ✓ |
| | Value range | 0-274 | 0-274 | 0-274 | 0-274 | 0-274 |
| Index of initial cyclic shift | Configurability | ✓ | ✓ | N.A. | N.A. | N.A. |
| | Value range | 0-11 | 0-11 | N.A. | N.A. | N.A. |
| Index of time-domain OCC | Configurability | N.A. | ✓ | N.A. | N.A. | N.A. |
| | Value range | N.A. | 0-6 | N.A. | N.A. | N.A. |
| Length of Pre-DFT OCC | Configurability | N.A. | N.A. | N.A. | N.A. | ✓ |
| | Value range | N.A. | N.A. | N.A. | N.A. | 2, 4 |
| Index of Pre-DFT OCC | Configurability | N.A. | N.A. | N.A. | N.A. | ✓ |
| | Value range | N.A. | N.A. | N.A. | N.A. | 0, 1, 2, 3 |

In order to improve uplink coverage, multi-slot repetition may be supported for PUCCH formats 1, 3, and 4, and PUCCH repetition may be configured for each PUCCH format. The UE may perform repeated transmission on PUCCH including UCI as many as the number of slots configured through nrofSlots which is higher layer signaling. For repeated PUCCH transmission, PUCCH transmission of each slot is performed using the same number of consecutive symbols, and the number of corresponding consecutive symbols may be configured through nrofSymbols in PUCCH-format1, PUCCH-format3 or PUCCH-format4, which are higher layer signaling. For repeated PUCCH transmission, PUCCH transmission of each slot is performed using the same start symbol, and the corresponding start symbol may be configured through the startingSymbolIndex in higher layer signaling PUCCH-format 1, PUCCH-format 3 or PUCCH-format 4. For repeated PUCCH transmission, a single PUCCH-spatialRelationInfo may be configured for a single PUCCH resource. For repeated PUCCH transmission, if the UE is configured to perform frequency hopping in PUCCH transmission in different slots, the UE may perform frequency hopping in units of slots. In addition, if the UE is configured to perform frequency hopping in PUCCH transmission in different slots, in the even-numbered slot, the UE may start PUCCH transmission from the first PRB index set through startingPRB, which is higher layer signaling, and in the odd-numbered slot, PUCCH transmission starts from the second PRB index set through secondHopPRB, which is higher layer signaling. In addition, if the UE is configured to perform frequency hopping in PUCCH transmission in different slots, the index of the slot in which the first PUCCH transmission is indicated to the UE is 0, and during the configured total number of repeated PUCCH transmissions, the value of the number of repeated PUCCH transmissions may be increased regardless of PUCCH transmission performed in each slot. If the UE is configured to perform frequency hopping in PUCCH transmission in different slots, the UE does not expect that frequency hopping in the slot is configured during PUCCH transmission. If the UE is not configured to perform frequency hopping in PUCCH transmission in different slots and is configured to perform frequency hopping in a slot, the first and second PRB indexes may be equally applied in the slot. If the number of uplink symbols capable of PUCCH transmission is smaller than nrofSymbols configured for higher layer signaling, the UE may not transmit PUCCH. If the UE fails to transmit PUCCH for any reason in a certain slot during repeated PUCCH transmission, the UE may increase the number of repeated PUCCH transmissions.

Next, the PUCCH resource configuration of the base station or the UE will be described. The base station may be able to configure PUCCH resources for each BWP through a higher layer for a specific UE. PUCCH resource configuration may be as illustrated in Table 21 below.

TABLE 21

```
PUCCH-Config ::=                                   SEQUENCE {
    resourceSetToAddModList                        SEQUENCE (SIZE (1..maxNrofPUCCH-
ResourceSets)) OF PUCCH-ResourceSet                    OPTIONAL, -- Need N
    resourceSetToReleaseList                       SEQUENCE (SIZE (1..maxNrofPUCCH-
ResourceSets)) OF PUCCH-ResourceSetId OPTIONAL, -- Need N
    resourceToAddModList                           SEQUENCE (SIZE (1..maxNrofPUCCH-
Resources)) OF PUCCH-Resource                          OPTIONAL, -- Need N
    resourceToReleaseList                          SEQUENCE (SIZE (1..maxNrofPUCCH-
Resources)) OF PUCCH-ResourceId                        OPTIONAL, -- Need N
    format1                                        SetupRelease { PUCCH-FormatConfig }
OPTIONAL, -- Need M
    format2                                        SetupRelease { PUCCH-FormatConfig }
OPTIONAL, -- Need M
    format3                                        SetupRelease { PUCCH-FormatConfig }
OPTIONAL, -- Need M
    format4                                        SetupRelease { PUCCH-FormatConfig }
OPTIONAL, -- Need M
    schedulingRequestResourceToAddModList                    SEQUENCE    (SIZE
(1..maxNrofSR-Resources)) OF SchedulingRequestResourceConfig
OPTIONAL, -- Need N
    schedulingRequestResourceToReleaseList                   SEQUENCE    (SIZE
(1..maxNrofSR-Resources)) OF SchedulingRequestResourceId
OPTIONAL, -- Need N
    multi-CSI-PUCCH-ResourceList                   SEQUENCE (SIZE (1..2)) OF PUCCH-
ResourceId                                         OPTIONAL, -- Need M
    dl-DataToUL-ACK                                SEQUENCE (SIZE (1..8)) OF INTEGER
(0..15)                                            OPTIONAL, -- Need M
    spatialRelationInfoToAddModList                          SEQUENCE    (SIZE
(1..maxNrofSpatialRelationInfos)) OF PUCCH-SpatialRelationInfo
OPTIONAL, -- Need N
    spatialRelationInfoToReleaseList                         SEQUENCE    (SIZE
(1..maxNrofSpatialRelationInfos)) OF PUCCH-SpatialRelationInfoId
OPTIONAL, -- Need N
    pucch-PowerControl                                            PUCCH-PowerControl
OPTIONAL, -- Need M
    ...
}
```

According to Table 21, one or more PUCCH resource sets in the PUCCH resource configuration for a specific BWP may be configured, and a maximum payload value for UCI transmission may be configured in some of the PUCCH resource sets. One or multiple PUCCH resources may belong to each PUCCH resource set, and each PUCCH resource may belong to one of the above-described PUCCH formats.

For the PUCCH resource set, the first PUCCH resource set may have a maximum payload value of 2 bits fixed. Accordingly, the corresponding value may not be separately configured through a higher layer or the like. When the remaining PUCCH resource set is configured, the index of the corresponding PUCCH resource set may be configured in ascending order according to the maximum payload value, and the maximum payload value may not be configured in the last PUCCH resource set. The higher layer configuration for the PUCCH resource set may be as illustrated in Table 22 below.

TABLE 22

```
-- A set with one or more PUCCH resources
PUCCH-ResourceSet ::=          SEQUENCE {
    pucch-ResourceSetId        PUCCH-ResourceSetId,
    resourceList               SEQUENCE (SIZE (1..maxNrofPUCCH-
```

TABLE 22-continued

```
ResourcesPerSet)) OF PUCCH-ResourceId,
    maxPayloadSize         INTEGER (4..256)
OPTIONAL -- Need R
}
```

The resourceList parameter of Table 22 may include IDs of PUCCH resources belonging to the PUCCH resource set.

When the PUCCH resource set is not configured or at the time of initial access, the PUCCH resource set as illustrated in the following Table 23, which is composed of a plurality of cell-specific PUCCH resources in the initial BWP, may be used. The PUCCH resource to be used for initial access in this PUCCH resource set may be indicated through SIB1.

PUCCH format 0 or 1, and in the case of the remaining formats, it may be determined by the symbol length, the number of PRBs, and the maximum code rate. The symbol length and the number of PRBs may be configured for each PUCCH resource, and the maximum code rate may be configured for each PUCCH format.

Next, PUCCH resource selection for UCI transmission will be described. In the case of SR transmission, the PUCCH resource for the SR corresponding to the schedulingRequestID may be configured through a higher layer as illustrated in Table 24 below. PUCCH resource may be a resource belonging to PUCCH format 0 or PUCCH format 1.

TABLE 24

```
SchedulingRequestResourceConfig ::=        SEQUENCE {
    schedulingRequestResourceId             SchedulingRequestResourceId,
    schedulingRequestID                     SchedulingRequestId,
    periodicityAndOffset                    CHOICE {
        sym2                                NULL,
        sym6or7                             NULL,
        sl1                                 NULL,    -- Recurs in every slot
        sl2                                 INTEGER (0..1),
        sl4                                 INTEGER (0..3),
        sl5                                 INTEGER (0..4),
        sl8                                 INTEGER (0..7),
        sl10                                INTEGER (0..9),
        sl16                                INTEGER (0..15),
        sl20                                INTEGER (0..19),
        sl40                                INTEGER (0..39),
        sl80                                INTEGER (0..79),
        sl160                               INTEGER (0..159),
        sl320                               INTEGER (0..319),
        sl640                               INTEGER (0..639),
    }                                                OPTIONAL,
    -- Need M
    resource                                PUCCH-ResourceId
OPTIONAL -- Need M
}
```

TABLE 23

| Index | PUCCH format | First symbol | Number of symbols | PRB offset $RB_{BWP}^{offset}$ | Set of initial CS indexes |
|---|---|---|---|---|---|
| 0 | 0 | 12 | 2 | 0 | {0, 3} |
| 1 | 0 | 12 | 2 | 0 | {0, 4, 8} |
| 2 | 0 | 12 | 2 | 3 | {0, 4, 8} |
| 3 | 1 | 10 | 4 | 0 | {0, 6} |
| 4 | 1 | 10 | 4 | 0 | {0, 3, 6, 9} |
| 5 | 1 | 10 | 4 | 2 | {0, 3, 6, 9} |
| 6 | 1 | 10 | 4 | 4 | {0, 3, 6, 9} |
| 7 | 1 | 4 | 10 | 0 | {0, 6} |
| 8 | 1 | 4 | 10 | 0 | {0, 3, 6, 9} |
| 9 | 1 | 4 | 10 | 2 | {0, 3, 6, 9} |
| 10 | 1 | 4 | 10 | 4 | {0, 3, 6, 9} |
| 11 | 1 | 0 | 14 | 0 | {0, 6} |
| 12 | 1 | 0 | 14 | 0 | {0, 3, 6, 9} |
| 13 | 1 | 0 | 14 | 2 | {0, 3, 6, 9} |
| 14 | 1 | 0 | 14 | 4 | {0, 3, 6, 9} |
| 15 | 1 | 0 | 14 | $\lfloor N_{BWP}^{size}/4 \rfloor$ | {0, 3, 6, 9} |

The maximum payload of each PUCCH resource included in the PUCCH resource set may be 2 bits in the case of For the configured PUCCH resource, the transmission period and offset may be configured through the periodicityAndOffset parameter of Table 24. If there is uplink data to be transmitted by the UE at a time point corresponding to the configured period and offset, the corresponding PUCCH resource is transmitted, and otherwise, the corresponding PUCCH resource may not be transmitted.

In the case of CSI transmission, a PUCCH resource for transmitting a periodic or semi-persistent CSI report through PUCCH may be configured in the pucch-CSI-ResourceList parameter as illustrated in Table 25 below. The pucch-CSI-ResourceList parameter may include a list of PUCCH resources for each BWP for a cell or CC to transmit a corresponding CSI report. PUCCH resource may be a resource belonging to PUCCH format 2 or PUCCH format 3 or PUCCH format 4.

TABLE 25

```
CSI-ReportConfig ::=              SEQUENCE {
   reportConfigId                    CSI-ReportConfigId,
   carrier                           ServCellIndex       OPTIONAL, -- Need S
   ...
   reportConfigType                   CHOICE {
     periodic                         SEQUENCE {
        reportSlotConfig                 CSI-ReportPeriodicityAndOffset,
        pucch-CSI-ResourceList           SEQUENCE (SIZE
(1..maxNrofBWPs)) OF PUCCH-CSI-Resource
     },
     semiPersistentOnPUCCH            SEQUENCE {
        reportSlotConfig                 CSI-ReportPeriodicityAndOffset,
        pucch-CSI-ResourceList           SEQUENCE (SIZE
(1..maxNrofBWPs)) OF PUCCH-CSI-Resource
     },
   ...
}
```

For PUCCH resource, the transmission period and offset may be configured through reportSlotConfig of Table 25.

In the case of HARQ-ACK transmission, the resource set of the PUCCH resource to be transmitted may be selected first according to the payload of the UCI including the corresponding HARQ-ACK. That is, a PUCCH resource set having a minimum payload that is not smaller than the UCI payload may be selected. Next, the PUCCH resource in the PUCCH resource set may be selected through the PUCCH resource indicator (PRI) in the DCI scheduling the TB corresponding to the HARQ-ACK, and the PRI may be a PUCCH resource indicator specified in Table 5 or Table 6. The relationship between the PRI and the PUCCH resource selected from the PUCCH resource set may be as illustrated in the following Table 26.

indicates the number of PUCCH resources belonging to the PUCCH resource set, $\Delta_{PRI}$ indicates the PRI value, $N_{CCE,p}$ indicates the total number of CCEs of CORESET p to which the received DCI belongs, and $N_{CCE,p}$ indicates the first CCE index for the received DCI.

The time point at which the corresponding PUCCH resource is transmitted is after the $K_1$ slot from the TB transmission corresponding to the corresponding HARQ-ACK. The candidate $K_1$ value is configured through the higher layer, and more specifically, it may be configured in the dl-DataToUL-ACK parameter in PUCCH-Config specified in Table 21. One $K_1$ value of these candidates may be selected by the PDSCH-to-HARQ feedback timing indicator in DCI for scheduling the TB, and this value may be a value specified in Table 5 or Table 6. The unit of the $K_1$ value may

TABLE 26

| PUCCH resource indicator | PUCCH resource |
| --- | --- |
| '000' | 1st PUCCH resource provided by pucch-ResourceId obtained from the 1st value of resourceList |
| '001' | 2nd PUCCH resource provided by pucch-ResourceId obtained from the 2nd value of resourceList |
| '010' | 3rd PUCCH resource provided by pucch-ResourceId obtained from the 3rd value of resourceList |
| '011' | 4th PUCCH resource provided by pucch-ResourceId obtained from the 4th value of resourceList |
| '100' | 5th PUCCH resource provided by pucch-ResourceId obtained from the 5th value of resourceList |
| '101' | 6th PUCCH resource provided by pucch-ResourceId obtained from the 6th value of resourceList |
| '110' | 7th PUCCH resource provided by pucch-ResourceId obtained from the 7th value of resourceList |
| '111' | 8th PUCCH resource provided by pucch-ResourceId obtained from the 8th value of resourceList |

If the number of PUCCH resources in the selected PUCCH resource set is greater than 8, the PUCCH resource may be selected by the following equation.

be a slot unit or a sub-slot unit. A sub-slot is a unit having a length smaller than that of a slot, and one or a plurality of symbols may constitute one sub-slot.

$$r_{PUCCH} = \begin{cases} \left\lfloor \frac{n_{CCE,p} \cdot \lceil R_{PUCCH}/8 \rceil}{N_{CCE,p}} \right\rfloor + \Delta_{PRI} \cdot \left\lceil \frac{R_{PUCCH}}{8} \right\rceil & \text{if } \Delta_{PRI} < R_{PUCCH} \bmod 8 \\ \left\lfloor \frac{n_{CCE,p} \cdot \lceil R_{PUCCH}/8 \rceil}{N_{CCE,p}} \right\rfloor + \Delta_{PRI} \cdot \left\lfloor \frac{R_{PUCCH}}{8} \right\rfloor + R_{PUCCH} \bmod 8 & \text{if } \Delta_{PRI} \geq R_{PUCCH} \bmod 8 \end{cases}$$

Equation 2

In Equation 2, $r_{PUCCH}$ indicates the index of the PUCCH resource selected in the PUCCH resource set, $R_{PUCCH}$ Next, a case in which two or more PUCCH resources are located in one slot will be described. The UE may transmit UCI through one or two PUCCH resources in one slot or sub-slot, and when UCI is transmitted through two PUCCH resources in one slot/sub-slot, i) each PUCCH resource does not overlap in symbol units, ii) at least one PUCCH resource may be a short PUCCH. The UE may not expect to transmit a plurality of PUCCH resources for HARQ-ACK transmission within one slot.

Next, the PUCCH transmission procedure when two or more PUCCH resources overlap will be described. When two or more PUCCH resources overlap, one of the overlapping PUCCH resources is selected or a new PUCCH resource may be selected according to the above-described conditions, that is, the transmitted PUCCH resource must not overlap in symbol units. In addition, the UCI payload transmitted through the overlapping PUCCH resource is all multiplexed and transmitted, or some may be dropped. First, Case 1, a case in which multi-slot repetition is not configured in the PUCCH resource and Case 2, a case in which multi-slot repetition is configured will be described.

The case of overlapping PUCCH resources with respect to Case 1 is divided into Case 1-1) the case where two or more PUCCH resources for HARQ-ACK transmission overlap and Case 1-2) the remaining cases.

Figure 9:
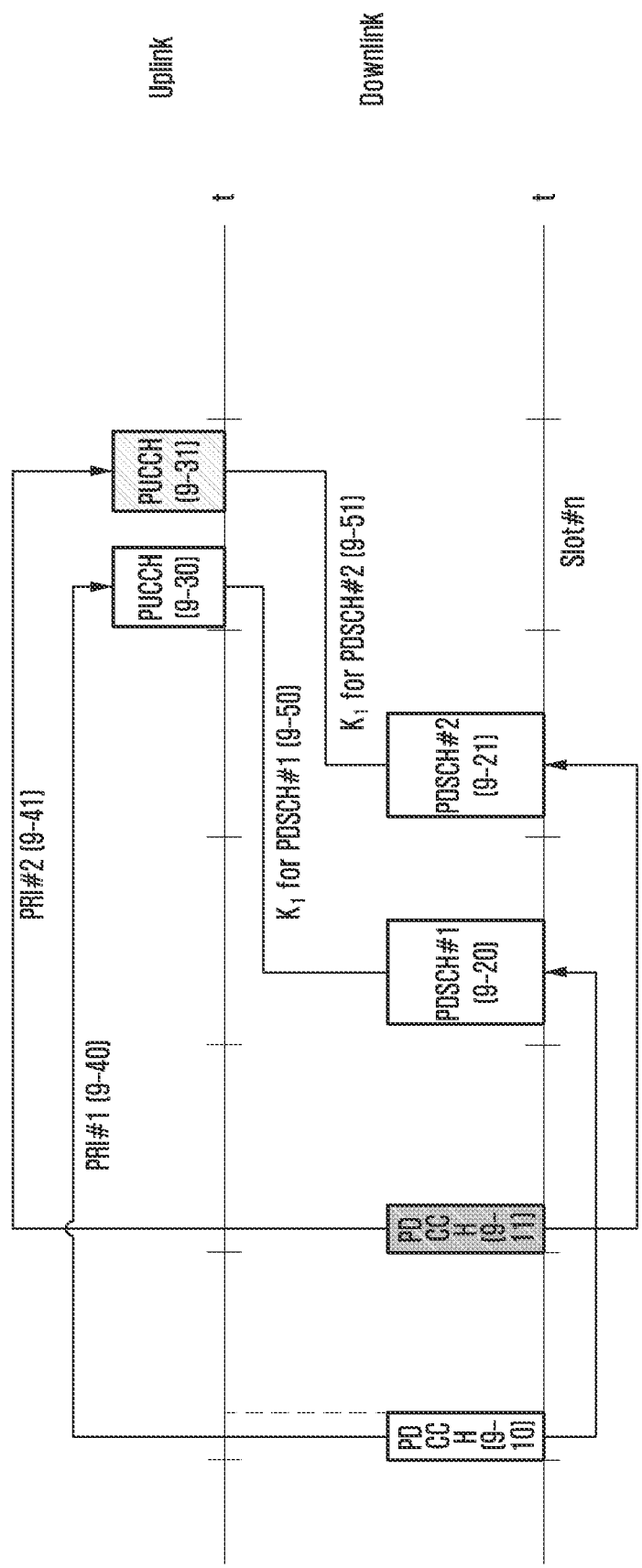
FIG. 9 is a diagram illustrating a case in which a plurality of PUCCH resources for HARQ-ACK transmission for PDSCH overlap when multi-slot repetition is not configured according to an embodiment of the disclosure.

A case corresponding to Case 1-1) is illustrated in FIG. 9.

FIG. 9 is a diagram illustrating a case in which a plurality of PUCCH resources for HARQ-ACK transmission for PDSCH overlap when multi-slot repetition is not configured according to an embodiment of the disclosure.

Referring to FIG. 9, with respect to two or more different PDCCHs (9-10, 9-11) scheduling PDSCH (9-20, 9-21), if the transmission slot of the PUCCH resource corresponding to each PDCCH is the same, the corresponding PUCCH resource may be considered to overlap each other. That is, when the uplink slots corresponding to the values (9-50, 9-51) indicated by a plurality of PDCCHs are the same, the PUCCH resources corresponding to the corresponding PDCCHs may be considered to overlap each other.

Among the PUCCH resources indicated by the PRIs (9-40, 9-41) in the PDCCH, based on the PRI (9-41) corresponding to the PDCCH (9-11) transmitted at the latest time point, only the PUCCH resource (9-31) may be selected and transmitted. Therefore, HARQ-ACK information for PDSCH (9-21) through the selected PUCCH resource (9-31) and HARQ-ACK information for other PUCCH (9-30) overlapping with PUCCH resource (9-31) are all encoded by the predefined HARQ-ACK codebook and then may be transmitted.

Next, corresponding to Case 1-2), a case in which a PUCCH resource for HARQ-ACK transmission and a PUCCH resource for SR and/or CSI transmission overlap or a plurality of PUCCH resources for SR and/or CSI transmission overlap will be described. When a plurality of PUCCH resources transmitted in the same slot overlap more than one symbol on the time axis, it is defined that the corresponding PUCCH resource overlaps, and whether the UCIs in these resources are multiplexed may be organized as follows Table 27.

TABLE 27

| PUCCH 2 | PUCCH 1 | SR | HARQ-ARK | CSI |
|---|---|---|---|---|
| | SR | — | Case 1-2-1 (Multiplex or not depending on PUCCH format) | Always multiples |

TABLE 27-continued

| PUCCH 2 | PUCCH 1 | SR | HARQ-ARK | CSI |
|---|---|---|---|---|
| | HARQ-ACK | | Always multiplex (HARQ-ACK codebook) | Case 1-2-2 (Multiplex or not by higher layer) |
| | CSI | Always multiplex | Case 1-2-2 | Case 1-2-2 |

According to Table 27, when the PUCCH resource in which the HARQ-ACK is transmitted overlaps each other or when the PUCCH in which the SR and CSI are transmitted overlap each other, these UCIs may always be multiplexed.

When each PUCCH resource in which the SR and HARQ-ACK are transmitted overlaps, that is, in Case 1-2-1), whether UCI multiplexing is divided according to the format of the PUCCH resource is divided as follows.

SR on PUCCH format 0+HARQ-ACK on PUCCH format 1: SR is dropped and only HARQ-ACK is transmitted.

For the rest: Both SR and HARQ-ACK are multiplexed.

In addition, in the remaining cases corresponding to Case 1-2-2, that is, when the HARQ-ACK is transmitted PUCCH resource and the CSI is transmitted overlap between the PUCCH resource is transmitted, or in case of overlap between a plurality of PUCCH resources through which CSI is transmitted, the multiplexing of these UCIs may follow the higher layer configuration. In addition, the configuration of whether multiplexing between HARQ-ACK and CSI and the configuration of whether multiplexing between a plurality of CSIs may be independently made.

For example, whether HARQ-ACK and CSI are multiplexed may be configured through simultaneousHARQ-ACK-CSI parameters for each PUCCH format 2, 3, and 4, and all corresponding parameters may be configured to the same value for the PUCCH format. If it is configured so that multiplexing is not performed through the corresponding parameter, only HARQ-ACK is transmitted and overlapping CSI may be dropped. In addition, whether multiple CSIs are multiplexed may be configured through a multi-CSI-PUCCH-ResourceList parameter in PUCCH-Config. That is, when the multi-CSI-PUCCH-ResourceList parameter is configured, inter-CSI multiplexing may be performed. Otherwise, only the PUCCH corresponding to the CSI having a high priority according to the inter-CSI priority may be transmitted.

When UCI multiplexing is performed as described above, the selection method and multiplexing method of the PUCCH resource to transmit the corresponding UCI resource may differ depending on the overlapped UCI information and the format of the PUCCH resource, which can be summarized as follows Table 28.

TABLE 28

| PUCCH 2 | PUCCH 1 | SR (format 0/1) | HHARQ-ACK Format 1 | HHARQ-ACK Format 0/2/3/4 | CSI (format 2/3/4) |
|---|---|---|---|---|---|
| | SR (format 0/1) | — | Option 1 | Option 2 | Option 3 |
| | HARQ-ACK Format 1 | Option 1 | Option 4 | Option 4 | Option 5 (grant-based) Option 6 (SPS) |

TABLE 28-continued

| PUCCH 2 | PUCCH 1 | SR (format 0/1) | HHARQ-ACK Format 1 | HHARQ-ACK Format 0/2/3/4 | CSI (format 2/3/4) |
|---|---|---|---|---|---|
| | Format 0/2/3/4 | Option 2 | Option 4 | Option 4 | Option 5 (grant-based) Option 6 (SPS) |
| | CSI (format 2/3/4) | Option 3 | Option 5 (grant-based) Option 6 (SPS) | Option 5 (grant-based) Option 6 (SPS) | Option 7 |

Each option in Table 28 is as follows.

Option 1: PUCCH resource selection may vary depending on the SR value of the SR PUCCH resource overlapped with the HARQ-ACK PUCCH resource. That is, if the SR value is positive, the PUCCH resource for SR may be selected, and if the SR value is negative, the PUCCH resource for HARQ-ACK may be selected. HARQ-ACK information may be transmitted to the selected PUCCH resource.

Option 2: HARQ-ACK information and SR information may be multiplexed and transmitted in the PUCCH resource for HARQ-ACK transmission.

Option 3: SR information and HARQ-ACK information may be multiplexed and transmitted in the PUCCH resource for CSI transmission.

Option 4: PUCCH resource transmission for overlapping between HARQ-ACK-Detailed operation has been described above in case 1-1).

Option 5: PUCCH resource for HARQ-ACK corresponding to PDSCH scheduled by PDCCH and PUCCH resource for CSI transmission overlap, and when multiplexing between HARQ-ACK and CSI is configured to the higher layer, HARQ-ACK information and CSI information may be multiplexed and transmitted in the PUCCH resource for HARQ-ACK.

Option 6: When the PUCCH resource for HARQ-ACK corresponding to SPS (semi-persistent scheduling) PDSCH and the PUCCH resource for CSI transmission overlap, and multiplexing between HARQ-ACK and CSI is configured to the higher layer, HARQ-ACK information and CSI information may be multiplexed and transmitted to a PUCCH resource for CSI transmission.

If the PUCCH resource list for multiplexing to the higher layer, that is, multi-CSI-PUCCH-ResourceList is configured, all multiplexed UCI payloads among the resources in the list may be transmitted, and after one resource having the lowest index is selected, the UCI payload may be transmitted. When there is no resource capable of transmitting all of the multiplexed UCI payloads in the list, after the resource with the largest index is selected, HARQ-ACK and CSI reports as many as the transmittable number may be transmitted to the resource.

Option 7: When multiple CSI PUCCH resources for transmission overlap and multiplexing between multiple CSIs is configured to a higher layer, all of the UCI payloads multiplexed in the PUCCH resource list for CSI multiplexing configured to the higher layer, that is, multi-CSI-PUCCH-ResourceList may be transmitted, and after one resource with the lowest index is selected, the UCI payload may be transmitted. When there is no resource capable of transmitting all of the multiplexed UCI payloads in the list, after the resource with the largest index is selected, as many CSI reports as possible for transmission to the resource may be transmitted.

For convenience of explanation, the case of overlapping two PUCCH resources was focused on, but even when three or more PUCCH resources overlap, the above-described method may be similarly applied. For example, when the SR+HARQ-ACK multiplexed PUCCH resource and the CSI PUCCH resource overlap, the HARQ-ACK and CSI multiplexing method may be followed.

If it is configured not to perform multiplexing between specific UCIs, UCIs with high priorities are transmitted according to the priority in the order of HARQ-ACK>SR>CSI, and UCIs with low priorities may be dropped. When a plurality of CSI PUCCH resources are configured not to perform multiplexing when overlapping, the PUCCH corresponding to the CSI having a higher priority is transmitted, and the PUCCH corresponding to the other CSI may be dropped.

Next, the case when Multi-slot repetition is configured (Case 2) is divided into a case in which two or more PUCCH resources for HARQ-ACK transmission are located in the same start slot (Case 2-1) and the remaining cases (Case 2-2). Each case is illustrated in FIG. 10.

Figure 10:
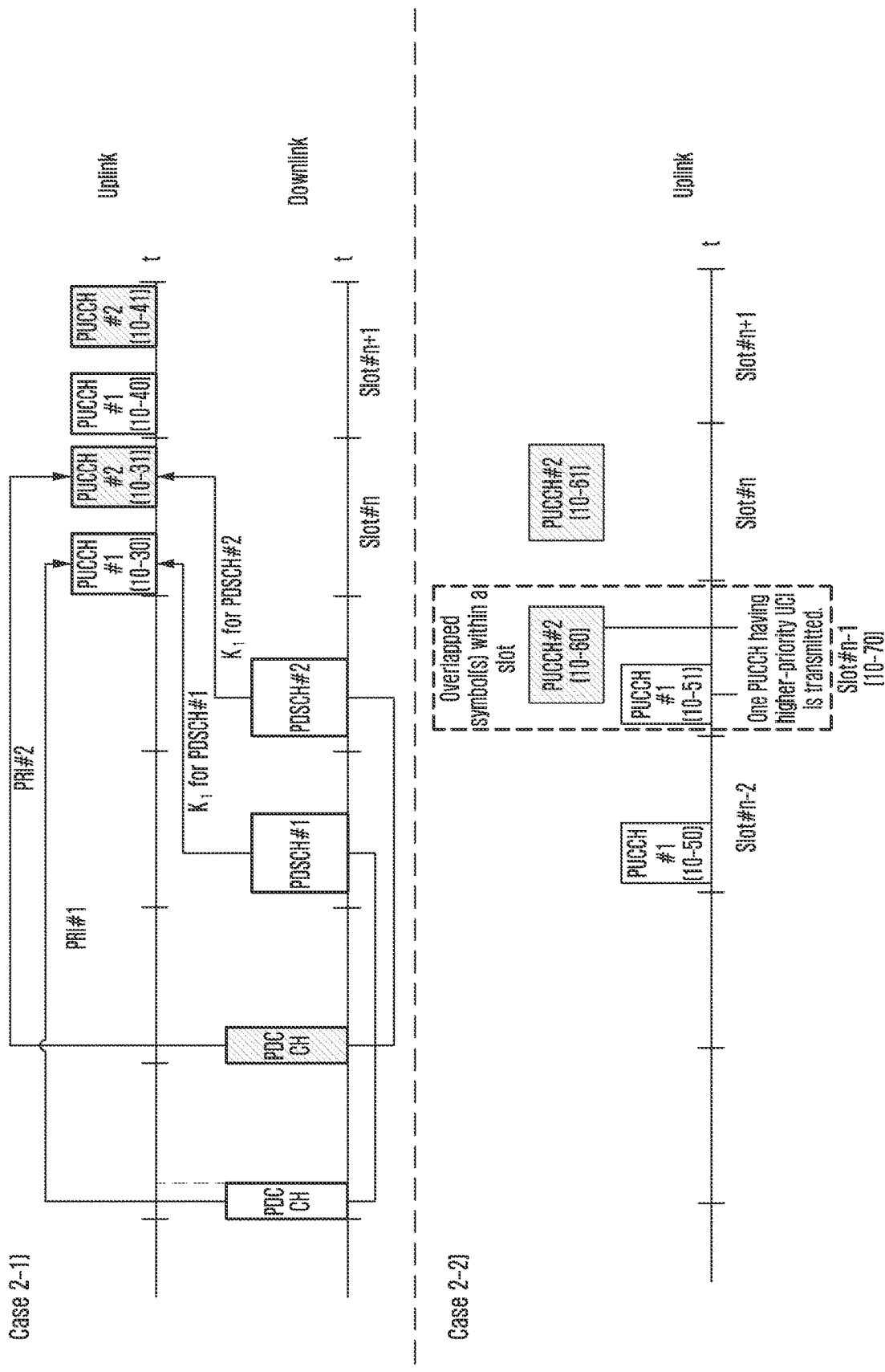
FIG. 10 is a diagram illustrating a case in which PUCCH resources overlap when multi-slot repetition is configured according to an embodiment of the disclosure.

FIG. 10 is a diagram illustrating a case in which PUCCH resources overlap when multi-slot repetition is configured according to an embodiment of the disclosure.

Referring to Case 2-1) of FIG. 10, when multi-slot repetition is configured in the PUCCH resource for HARQ-ACK, that is, when PUCCH #1 is repeatedly transmitted over multiple slots (10-30, 10-40) and PUCCH #2 is also repeatedly transmitted over multiple slots (10-31, 10-41), if the start slots of the two PUCCHs indicated by $K_1$ are the same, same as in Case 1-1), a single PUCCH resource (PUCCH transmitted at the latest time in one slot), that is, PUCCH #2 may be selected. Accordingly, HARQ-ACKs corresponding to PDSCH #1 and PDSCH #2 may be all multiplexed through the HARQ-ACK codebook and transmitted to the corresponding PUCCH.

For convenience of explanation, a case in which a plurality of PUCCHs that are multi-slot repetition overlap is taken as an example, but the same method may also be applied when overlapping between PUCCH that is multi-slot repetition and PUCCH transmitted in a single slot.

Case 2-2) corresponds to a case where a symbol unit overlap occurs between PUCCH for HARQ-ACK transmission and PUCCH for SR or CSI transmission, or between PUCCH for multiple SR or CSI transmission. That is, when PUCCH #1 is repeatedly transmitted over multiple slots (10-50, 10-51) and PUCCH #2 is also repeatedly transmitted over multiple slots (10-60, 10-61), it corresponds to the case where PUCCH #1 and PUCCH #2 overlap one or more symbols in one slot (10-70).

By comparing the priorities between UCIs in the PUCCH between PUCCHs in which one or more symbols overlap in the corresponding slot (10-70), the UCI having a higher priority is transmitted, and other UCIs may be dropped in the corresponding slot. The priority between UCIs may be determined according to HARQ-ACK>SR>CSI in descending order.

In addition, when a plurality of CSI PUCCH resources overlap, the PUCCH corresponding to the CSI having a high priority is transmitted, and the PUCCH corresponding to the other CSI may be dropped in the corresponding slot. PUCCH transmission or drop according to the above-mentioned priority is performed only in the slot in which the symbol unit overlap occurs, and is not performed in other slots. That is, the PUCCH in which multi-slot repetition is configured may be dropped in the slot in which the symbol unit overlap occurs, but may be transmitted as configured in the remaining slots.

When two PUCCHs that are multi-slot repetition overlap, the UE does not expect to have the same priority and the same start slot for the two PUCCH repeated transmissions. If two repeated PUCCH transmissions have the same priority, the UE may transmit the PUCCH that started the repeated PUCCH transmission first and drop the remaining PUCCHs. If two repeated PUCCH transmissions have different priorities, the UE may perform PUCCH repeated transmissions having a high priority.

For convenience of explanation, a case in which a plurality of PUCCHs of multi-slot repetition overlap is exemplified, but the same method may also be applied when overlapping between the PUCCH that is multi-slot repetition and PUCCH transmitted in a single slot.

In addition, the overlap between PUCCH and PUSCH transmission will be described. If the UE transmits PUCCH in the first slot among repeated transmissions repeat $N_{PUCCH}^{repeat}>1$, transmits PUSCH in the second slot, and PUCCH transmission overlaps with PUSCH transmission in one or a plurality of slots, an also, when UCIs are multiplexed in PUSCH in overlapping slots, PUCCH is transmitted and PUSCH is not transmitted in slots where PUCCH and PUSCH overlap. Next, an uplink transmission beam configuration to be used for PUCCH transmission will be described. If the UE does not have a UE-specific configuration (dedicated PUCCH resource configuration) for the PUCCH resource configuration, the PUCCH resource set is provided through higher layer signaling, pucch-Resource-Common, and in this case, the beam configuration for PUCCH transmission follows the beam configuration used in PUSCH transmission scheduled through a random access response (RAR) UL grant. If the UE has a UE-specific configuration (dedicated PUCCH resource configuration) for PUCCH resource configuration, beam configuration for PUCCH transmission may be provided through pucch-spatialRelationInfoId, which is higher signaling illustrated in Table 21. If the UE receives one pucch-spatialRelation-Infold configured, beam configuration for PUCCH transmission of the UE may be provided through one pucch-spatial-RelationInfoId. If the UE receives a plurality of pucch-spatialRelationInfoIDs configured, the UE may be instructed to activate one of the plurality of pucch-spatialRelationIn-foIDs through a MAC control element (CE). The UE may receive up to 8 pucch-spatialRelationInfoIDs configured through higher level signaling, and may be instructed to activate only one pucch-spatialRelationInfoID among them. When the UE is instructed to activate any pucch-spatialRe-lationInfoID through MAC CE, the UE may apply pucch-spatialRelationInfoID activation through the MAC CE from the slot that first appears after $3N_{slot}^{subframe,\mu}$ slot from the slot in which the HARQ-ACK transmission for the PDSCH in which the MAC CE containing the activation information for the pucch-spatialRelationInfoID is transmitted. μ is a numerology applied to PUCCH transmission, and $N_{slot}^{subframe,\mu}$ refers to the number of slots per subframe in a given numerology. The higher layer configuration for pucch-spatialRelationInfo may be as illustrated in Table 29 below.

TABLE 29

| | |
|---|---|
| PUCCH-SpatialRelationInfo ::= | SEQUENCE { |
| pucch-SpatialRelationInfoId | PUCCH-SpatialRelationInfoId, |
| servingCellId         ServCellIndex | OPTIONAL, |
| -- Need S | |
| referenceSignal | CHOICE { |
| ssb-Index | SSB-Index, |
| csi-RS-Index | NZP-CSI-RS-ResourceId, |
| srs | SEQUENCE { |
| | resource         SRS-ResourceId, |
| | uplinkBWP         BWP-Id |
| | } |
| }, | |
| pucch-PathlossReferenceRS-Id | PUCCH-PathlossReferenceRS-Id, |
| p0-PUCCH-Id | P0-PUCCH-Id, |
| closedLoopIndex | ENUMERATED { i0, i1 } |
| } | |
| PUCCH-SpatialRelationInfoId ::= | INTEGER |
| (1..maxNrofSpatialRelationInfos) | |

According to Table 29, one referenceSignal configuration may exist in a specific pucch-spatialRelationInfo configuration, and the referenceSignal may be an ssb-Index indicating a specific SS/PBCH, a csi-RS-Index indicating a specific CSI-RS, or srs indicating a specific SRS. If the referenceSignal is configured to ssb-Index, the UE may configure the beam used when receiving the SS/PBCH corresponding to the ssb-Index among the SS/PBCHs in the same serving cell as the beam for PUCCH transmission, or if the servingCellId is provided, the UE may configure the beam used when receiving the SS/PBCH corresponding to the ssb-Index among the SS/PBCHs in the cell indicated by the servingCellId as the beam for pucch transmission. If the referenceSignal is configured to csi-RS-Index, the UE may configure the beam used when receiving the CSI-RS corresponding to the csi-RS-Index among the CSI-RSs in the same serving cell as the beam for PUCCH transmission, or if the servingCellId is provided, the UE may configure the beam used when receiving the CSI-RS corresponding to the csi-RS-Index among the CSI-RSs in the cell indicated by the servingCellId as the beam for pucch transmission. If the referenceSignal is configured to srs, the UE may configure the transmission beam used when transmitting the SRS corresponding to the resource index provided as a higher signaling resource in the same serving cell and/or in the activated uplink BWP as the beam for PUCCH transmission, or if servingCellID and/or uplinkBWP are provided, the UE may configure the transmission beam used when transmitting the SRS corresponding to the resource index provided through the upper signaling resource in the cell and/or uplink BWP indicated by the servingCellID and/or uplink BWP as the beam for PUCCH transmission. One pucch-PathlossReferenceRS-Id configuration may exist within a specific pucch-spatialRelationInfo configuration. PUCCH-PathlossReferenceRS of Table 30 may be mapped with pucch-PathlossReferenceRS-Id of Table 29, and up to four may be configured through pathlossReferenceRSs in the upper signaling PUCCH-PowerControl of Table 30. PUCCH-PathlossReferenceRS may be configured with ssb-Index if connected to SS/PBCH through upper signaling referenceSignal, and may be configured with csi-RS-Index if connected to CSI-RS.

each logical channel or whether to use the function of the SDAP layer device through an RRC message, and when the SDAP header is configured, with the NAS QOS reflection configuration 1-bit indicator (NAS reflective QoS) and the AS QoS reflection configuration 1-bit indicator (AS reflective QoS) in the SDAP header, it is possible to instruct the UE to update or reconfigure mapping information for uplink and downlink QoS flows and data bearers. The SDAP header may include QoS flow ID information indicating QoS. The QoS information may be used as data processing priority, scheduling information, etc. to support a smooth service.

TABLE 30

```
PUCCH-PowerControl ::=            SEQUENCE {
  deltaF-PUCCH-f0                   INTEGER (-16..15)
OPTIONAL, -- Need R
  deltaF-PUCCH-f1                   INTEGER (-16..15)
OPTIONAL, -- Need R
  deltaF-PUCCH-f2                   INTEGER (-16..15)
OPTIONAL, -- Need R
  deltaF-PUCCH-f3                   INTEGER (-16..15)
OPTIONAL, -- Need R
  deltaF-PUCCH-f4                   INTEGER (-16..15)
OPTIONAL, -- Need R
  p0-Set                            SEQUENCE (SIZE (1..maxNrofPUCCH-P0-PerSet))
OF P0-PUCCH                       OPTIONAL, -- Need M
  pathlossReferenceRSs              SEQUENCE (SIZE (1..maxNrofPUCCH-
PathlossReferenceRSs)) OF PUCCH-PathlossReferenceRS
OPTIONAL, -- Need M
  twoPUCCH-PC-AdjustmentStates      ENUMERATED {twoStates}
OPTIONAL, -- Need S
  ...
}
P0-PUCCH ::=                      SEQUENCE {
  p0-PUCCH-Id                       P0-PUCCH-Id,
  p0-PUCCH-Value                    INTEGER (-16..15)
}
P0-PUCCH-Id ::=                   INTEGER (1..8)
PUCCH-PathlossReferenceRS ::=       SEQUENCE {
  pucch-PathlossReferenceRS-Id        PUCCH-PathlossReferenceRS-Id,
  referenceSignal                     CHOICE {
    ssb-Index                           SSB-Index,
    csi-RS-Index                        NZP-CSI-RS-ResourceId
  }
}
```

Figure 11:
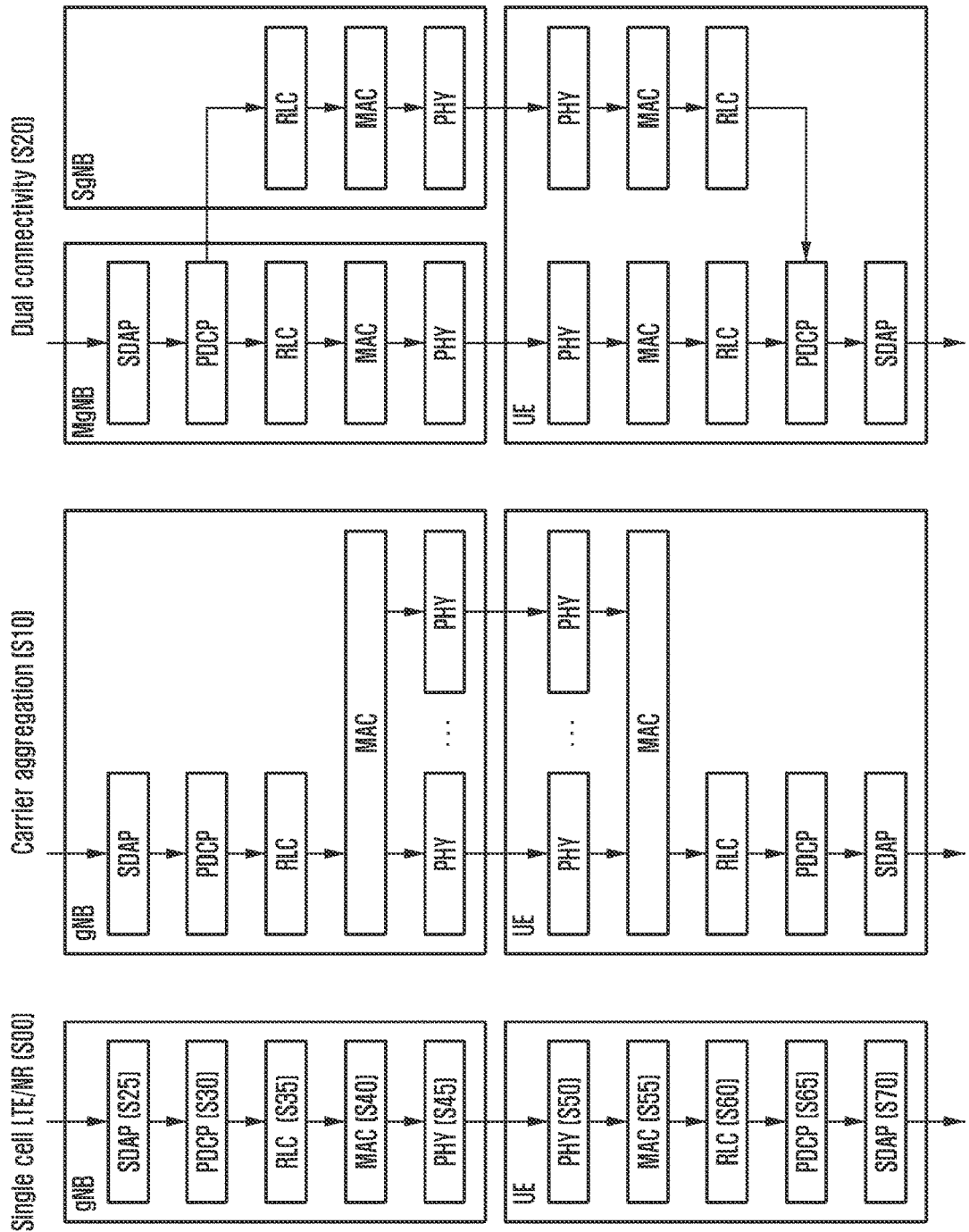
FIG. 11 is a diagram illustrating a radio protocol structure of a base station and a UE when performing single cell, carrier aggregation, and dual connectivity according to an embodiment of the disclosure.

FIG. 11 is a diagram illustrating a radio protocol structure of a base station and a UE when performing single cell, carrier aggregation, and dual connectivity according to an embodiment of the disclosure.

Referring to FIG. 11, a radio protocol of a next-generation wireless communication system consists of NR SDAP (service data adaptation protocol S25, S70), NR PDCP (packet data convergence protocol S30, S65), NR RLC (radio link control S35, S60), and NR MAC (medium access control S40, S55) in a UE and an NR base station, respectively.

The main function of the NR SDAP (S25, S70) may include some of the following functions.
  Transfer of user plane data.
  Mapping between a QoS flow and a data bearer for uplink and downlink (mapping between a QoS flow and a DRB for both DL and UL).
  Marking QoS flow ID in both DL and UL packets for uplink and downlink.
  Mapping a reflective QoS flow to a data bearer for uplink SDAP PDUs (reflective QoS flow to DRB mapping for the UL SDAP PDUs).

With respect to the SDAP layer device, the UE may be configured whether to use the header of the SDAP layer device for each PDCP layer device, for each bearer, or for The main function of the NR PDCP (S30, S65) may include some of the following functions.
  Header compression and decompression (ROHC only)
  Transfer of user data
  In-sequence delivery of higher layer PDUs
  Out-of-sequence delivery of higher layer PDUs
  Order reordering function (PDCP PDU reordering for reception)
  Duplicate detection of lower layer SDUs
  Retransmission of PDCP SDUs
  Ciphering and deciphering
  Timer-based SDU discard in uplink.

The reordering function of the NR PDCP device refers to a function of reordering PDCP PDUs received from a lower layer in order based on a PDCP sequence number (SN), and may include a function of delivering data to the higher layer in the rearranged order, may include a function of delivering data directly without considering the order, may include a function of reordering the order to record the lost PDCP PDUS, may include a function to report the status of the lost PDCP PDUs to the transmitting side, and may include a function of requesting retransmission for lost PDCP PDUs.

The main function of the NR RLC (S35, S60) may include some of the following functions.

Data transfer (Transfer of higher layer PDUs)
In-sequence delivery of higher layer PDUs
Out-of-sequence delivery of higher layer PDUs
ARQ (Error Correction through ARQ)
Concatenation, segmentation and reassembly of RLC SDUs
Re-segmentation of RLC data PDUs
Reordering of RLC data PDUs
Duplicate detection
Protocol error detection
RLC SDU discard function (RLC SDU discard)
RLC re-establishment function (RLC re-establishment)

In-sequence delivery of the NR RLC device refers to a function of sequentially delivering RLC SDUs received from a lower layer to an higher layer, and when originally one RLC SDU is divided into several RLC SDUs and received, the In-sequence delivery may include a function to reassemble and deliver the divided RLC SDUs, may include a function of rearranging received RLC PDUs based on RLC sequence number (SN) or PDCP SN (sequence number), may include a function to rearrange the order to record the lost RLC PDUs, a function of reporting the status of lost RLC PDUs to the transmitting side, may include a function to request retransmission for lost RLC PDUs, may include a function of sequentially delivering only the RLC SDUs before the lost RLC SDU to the higher layer when there is a lost RLC SDU, or if a predetermined timer has expired even if there is a lost RLC SDU, may include a function of sequentially delivering all RLC SDUs received before the timer starts to a higher layer, or if a predetermined timer has expired even if there is a lost RLC SDU, may include a function of sequentially delivering all RLC SDUs received so far to the higher layer. In addition, the NR RLC device may process RLC PDUs in the order (in the order of arrival, regardless of the order of the serial number and sequence number) in which they are received and deliver them to the PDCP device regardless of sequence (out-of-sequence delivery), and in the case of segments, may receive segments stored in the buffer or to be received later, reconstruct them into one complete RLC PDU, process and deliver the segments to the PDCP device. The NR RLC layer may not include a concatenation function, and the function may be performed by the NR MAC layer or replaced with a multiplexing function of the NR MAC layer.

The out-of-sequence delivery function of the NR RLC device refers to a function of directly delivering RLC SDUs received from a lower layer to an higher layer regardless of order, and may include a function of reassembling and transmitting the divided RLC SDUs when originally one RLC SDU is divided into several RLC SDUs and received, and may include a function of storing the RLC SN or PDCP SN of the received RLC PDUs, arranging the order, and recording the lost RLC PDUs.

The NR MAC (S40, S55) may be connected to several NR RLC layer devices configured in one UE, and the main function of the NR MAC may include some of the following functions.
Mapping between logical channels and transport channels)
Multiplexing/demultiplexing of MAC SDUs
Scheduling information reporting
HARQ (Error correction through HARQ)
Priority handling between logical channels of one UE
Priority handling between UEs by means of dynamic scheduling
MBMS service identification
Transport format selection
Padding The NR PHY layer (S45, S50) may channel-code and modulate higher layer data to make OFDM symbols and transmits through radio channels, or may perform an operation of demodulating an OFDM symbol received through radio channels, performing channel decoding, and transmitting the OFDM symbol to a higher layer.

The detailed structure of the wireless protocol structure may be variously changed according to a carrier (or cell) operation method. For example, when the base station transmits data to the UE based on a single carrier (or cell), the base station and the UE use a protocol structure having a single structure for each layer, such as S00. On the other hand, when the base station transmits data to the UE based on carrier aggregation (CA) using multiple carriers in a single TRP, the base station and the UE have a single structure up to RLC like S10, but use a protocol structure that multiplexes the PHY layer through the MAC layer. As another example, when the base station transmits data to the UE based on DC (dual connectivity) using multiple carriers in multi-transmission/reception point (TRP) (or multi-TRP), the base station and the UE have a single structure up to RLC like S20, but use a protocol structure that multiplexes the PHY layer through the MAC layer.

Next, a method of generating a HARQ-ACK codebook for transmitting HARQ-ACK in the selected PUCCH resource as described above will be described. When the PDSCH, which is downlink data, is scheduled based on DCI information of the PDCCH, slot information to which the PDSCH is transmitted and the corresponding HARQ-ACK feedback is mapped, and the mapping information of the uplink control channel PUCCH delivering the HARQ-ACK feedback information are transmitted. Specifically, the slot interval between the downlink data PDSCH and the corresponding HARQ-ACK feedback is indicated through the PDSCH-to-HARQ_feedback timing indicator, and one of eight feedback timing offsets configured through the higher layer (e.g., RRC signaling) may be indicated. In addition, in order to deliver PUCCH resources including the type of uplink control channel PUCCH to which the HARQ-ACK feedback information is mapped, the position of the start symbol, and the number of mapping symbols, one of eight resources configured through the higher layer is indicated through the PUCCH resource indicator. The UE collects and transmits HARQ-ACK feedback bits in order to transmit HARQ-ACK information to the base station. Hereinafter, the collected HARQ-ACK feedback bits may be referred to as being mixed with the HARQ-ACK codebook.

The base station may configure a Type-1 HARQ-ACK codebook to transmit the HARQ-ACK feedback bits corresponding to the PDSCH that can be transmitted in the slot position of the predetermined timing to the UE regardless of whether the PDSCH is actually transmitted. Alternatively, the base station may configure a Type-2 HARQ-ACK codebook that manages and transmits HARQ-ACK feedback bits corresponding to the actually transmitted PDSCH through a counter downlink assignment index (DAI) or total DAI to the UE.

When the UE receives the Type-1 HARQ-ACK codebook configured, a feedback bit to be transmitted may be determined through a table including information on a slot to which the PDSCH is mapped, a start symbol, the number of symbols, or length, and K1 candidate values that are HARQ-ACK feedback timing information for the PDSCH. The table including the start symbol, number of symbols, or length information of the PDSCH may be configured through higher layer signaling or may be determined as a default table. In addition, the K1 candidate values, for example, {1,2,3,4,5,6,7,8} may be determined as default values or may be determined through higher layer signaling. The slot in which the PDSCH is mapped may be identified through the K1 value if the PDSCH is transmitted in a single slot.

If the pdsch-AggregationFactor configured in PDSCH-Config or SPS-Config, which is higher layer signaling, is configured, the UE transmits HARQ-ACK information for the repeatedly transmitted PDSCH in pdsch-AggregationFactor slots, and at this time, the K1 value may be indicated through DCI based on the last slot among repeatedly transmitted slots or may be configured as a higher layer parameter dl-DataToUl-ACK. If the Time domain resource assignment field in the DCI for scheduling the repeatedly transmitted PDSCH indicates an entry including RepNumR16 among the entries of pdsch-TimeDomainAllocationList, which is higher layer signaling, the UE transmits HARQ-ACK information for the repeatedly transmitted PDSCH in RepNumR16 slots, and at this time, the K1 value may be indicated through DCI based on the last slot among repeatedly transmitted slots or may be configured as a higher layer parameter dl-DataToUl-ACK.

Assuming that the set of PDSCH reception candidate cases in the serving cell c is MA,c, the MA,c may be determined by the following [pseudo-code 1] operations.

Start Pseudo-Code 1
  Operation 1: Initialize j to 0, $M_{A,c}$ to the empty set, and k, which is the HARQ-ACK transmission timing index, to 0.
  Operation 2: Configure R as a set of each row in a table including a slot to which the PDSCH is mapped, a start symbol, the number of symbols, or length information. Delete the corresponding row is from R if the symbol to which the PDSCH indicated by each row of R is mapped is configured as the uplink symbol according to the higher layer configuration.
  Operation 3-1: Add k to the set $M_{A,c}$ if the UE can receive one unicast PDSCH in one slot and R is not an empty set.
  Operation 3-2: Count the maximum number of PDSCHs that can be allocated to different symbols in R, and increase j by 1 as much as that number and add to $M_{A,c}$ if the UE can receive more than one PDSCH in one slot.
  Operation 4: Restart from Operation 2 by incrementing k by 1.
end of pseudo-code 1

HARQ-ACK feedback bits may be determined by the following [pseudo-code 2] operations for $M_{A,c}$ determined at [pseudo-code 1] above.

Start Pseudo-Code 2
  Operation 1: Initialize serving cell index c to 0, HARQ-ACK reception occasion index m to 0, and HARQ-ACK feedback bit index j to 0.
  Operation 2-1: Increase j by 1 and configure the HARQ-ACK feedback bit for each codeword when the UE is instructed to receive up to two codewords through one PDSCH without being instructed for HARQ-ACK bundling for codewords through higher layer signaling, without being instructed to transmit CBG of PDSCH.
  Operation 2-2: Configure the HARQ-ACK feedback bit for each codeword into one HARQ-ACK feedback bit through binary AND operation when the UE is instructed to bundle HARQ-ACK for codewords through higher layer signaling and is instructed to receive up to two codewords through one PDSCH.
  Operation 2-3: Increase j by 1 and configure HARQ-ACK feedback bits as many as the number of CBGs for one codeword when the UE is instructed to transmit the CBG of the PDSCH through higher layer signaling and is not instructed to receive up to two codewords through one PDSCH.
  Operation 2-4: Increase j by 1 and configure HARQ-ACK feedback bits as many as the number of CBGs for each codeword when the UE is instructed to transmit the CBG of the PDSCH through higher layer signaling and is instructed to receive up to two codewords through one PDSCH.
  Operation 2-5: Configure HARQ-ACK feedback bit for one codeword when the UE is not instructed to transmit the CBG of the PDSCH through higher layer signaling and is not instructed to receive up to two codewords through one PDSCH.
  Operation 3: Increase m by 1, and if m is smaller than the total number of occasions $M_c$ of PDSCH reception or SPS PDSCH release for serving cell c determined by cardinality of $M_{A,c}$, start again from operation 2-1
  Operation 4: Increase c by 1, and if c is smaller than the number of all serving cells NPL cells configured for higher layer signaling, initialize m to 0 and start again from operation 2-1.
end of pseudo-code 2

If CORESETPoolIndex is not configured or is configured to 0 for all CORESETs in the active BWP of the serving cell and ACKNACFeedbackMode is not configured, Type 1 HARQ-ACK feedback bits are generated for the $N_{cells}^{DL}$ serving cells according to pseudo-code 1 and pseudo-code 2 described above.

If CORESETPoolIndex is configured to 0 for the first CORESETs in the active BWP of the serving cell or CORESETPoolIndex is not configured and CORESETPoolIndex is configured to 1 for the second CORESETs in the active BWP of the serving cell and ACKNACKFeedbackMode is not configured, Type 1 HARQ-ACK feedback bits are generated for the $N_{cells}^{DL}$ serving cells according to pseudo-code 1 and pseudo-code 2 described above.

If CORESETPoolIndex is configured to 0 for the first CORESETs in the active BWP of the serving cell or CORESETPoolIndex is not configured and CORESETPoolIndex is configured to 1 for the second CORESET's in the active BWP of the serving cell and ACKNACKFeedbackMode is configured to JointFeedback, to generate the HARQ-ACK feedback bit, the serving cell including the first CORESETs is configured to the first set S0, and the serving cell including the second CORESETs is configured to the second set S1. In this case, the number of serving cells included in the set S0 may be defined as $N_{cells}^{DL,0}$, and the number of serving cells included in the set S1 may be defined as $N_{cells}^{DL,1}$. When performing pseudo-code 2 to calculate the HARQ-ACK feedback bit, configured as $N_{cells}^{DL}=N_{cells}^{DL,0}$ to calculate the HARQ-ACK feedback bit for the set S0, configured as $N_{cells}^{DL}=N_{cells}^{DL,1}$ to calculate the HARQ-ACK feedback bit for the set S1, and calculate each HARQ-ACK feedback bit according to CORESETPoolIndex. Thereafter, the HARQ-ACK feedback bit for the set S0 is connected to the HARQ-ACK feedback bit for the set S1 to configure the HARQ-ACK feedback bit of the JointFeedback method.

If CORESETPoolIndex is configured to 0 for the first CORESETs in the active BWP of the serving cell or CORESETPoolIndex is not set and CORESETPoolIndex is configured to 1 for the second CORESETs in the active BWP of the serving cell, and ACKNACKFeedbackMode is configured to SeparateFeedback, the UE performs pseudo-code 2 to calculate the HARQ-ACK feedback bit associated with the first CORESETs and the HARQ-ACK feedback bit associated with the second CORESETs, respectively, for the $N_{cells}^{DL}$ serving cell. Thereafter, the UE reports the HARQ-ACK feedback bits for the calculated first CORESETs and HARQ-ACK feedback bit for the second CORESETs to the base station according to the CORESET that has received the PDCCH including the DCI that triggered the HARQ-ACK information report, respectively.

When the UE receives the Type-2 HARQ-ACK codebook, the UE determines the feedback bits to be transmitted through counter DAI (downlink assignment index) or total DAI that manages K1 candidate values that are HARQ-ACK feedback timing information for the PDSCH and HARQ-ACK feedback bits corresponding to the PDSCH. K1 candidate values, which are HARQ-ACK feedback timing information for the PDSCH, are composed of a union of default values and values designated through higher layer signaling. For example, default values may be set to {1,2,3,4,5,6,7,8}.

If $V_{C-DAI,c,m}^{DL}$ is the counter DAI of DCI format 1_0 or DCI format 1_1 in which the PDSCH is allocated in the serving cell c at the PDCCH monitoring timing m, and if $V_{T-DAI,c,m}^{DL}$ is the total DAI of DCI format 1_1 in which the PDSCH is allocated to the downlink control channel PDCCH monitoring timing m, the Type-2 HARQ-ACK codebook may be configured with the following [pseudo-code 3] operations.

Start Pseudo-Code 3

Operation 1: Initialize serving cell index c to 0, PDCCH monitoring timing m to 0, j to 0, index $V_{temp}$ for DAI comparison, $V_{temp2}$ to 0, and initialize the HARQ-ACK feedback bit set $V_S$ to an empty set.

Operation 2: Exclude c from the serving cell set when the PDCCH monitoring timing m is before the downlink BWP change for the serving cell c or before the uplink BWP change for the PCell, and the downlink BWP change is not triggered due to DCI format 1_1 of the PDCCH monitoring timing m.

Operation 3-1: Increase j by 1 and configure $V_{temp}$ to $V_{C-DAI,c,m}^{DL}$ when the PDSCH allocated by the PDCCH corresponding to the PDCCH monitoring timing m exists in the serving cell c, if $V_{C-DAI,c,m}^{DL}$ is less than or equal to $V_{temp}$. In addition, if $V_{T-DAI,c,m}^{DL}$ is an empty set, configure $V_{temp2}$ to $V_{C-DAI,c,m}^{DL}$, and if $V_{T-DAI,c,m}^{DL}$ is not empty set, configure $V_{temp2}$ to $V_{T-DAI,c,m}^{DL}$.

Operation 3-2: Increase j by 1 and configure the HARQ-ACK feedback bit for each codeword when the PDSCH allocated by the PDCCH corresponding to the PDCCH monitoring timing m exists in the serving cell c, the UE is instructed to receive up to two codewords through one PDSCH in at least one downlink BWP of at least one serving cell without being instructed to bundle HARQ-ACK for codewords through higher layer signaling.

Operation 3-3: Configure the HARQ-ACK feedback bit for each codeword into one HARQ-ACK feedback bit through binary AND operation when the PDSCH allocated by the PDCCH corresponding to the PDCCH monitoring timing m exists in the serving cell c, the UE is instructed to receive up to two codewords through one PDSCH in at least one downlink BWP of at least one serving cell being instructed to bundle HARQ-ACK for codewords through higher layer signaling.

Operation 3-4: Configure HARQ-ACK feedback bit for one codeword when the PDSCH allocated by the PDCCH corresponding to the PDCCH monitoring timing m exists in the serving cell c, and it is not instructed to receive up to two codewords through one PDSCH.

Operation 4: Start again from operation 2 by increasing c by 1.

Operation 5: Start again from operation 2 by increasing m by 1.

Operation 6: Increase j by 1 if the $V_{temp2}$ is less than the $V_{temp}$.

Operation 7-1: Configure the total number of HARQ-ACK feedback bits to $2 \cdot (4 \cdot j + V_{temp2})$ when the UE is instructed to receive up to two codewords through one PDSCH in at least one downlink BWP of at least one serving cell without being instructed to bundle HARQ-ACK for codewords through higher layer signaling.

Operation 7-2: Configure the total number of HARQ-ACK feedback bits to 4. $j + V_{temp2}$ when the UE is not instructed to bundle HARQ-ACK for codewords through higher layer signaling or to receive up to two codewords through one PDSCH.

Operation 8: Determine the HARQ-ACK feedback bit as NACK for the HARQ-ACK feedback bit not set in operation 3-1, operation 3-2, operation 3-3, and operation 3-4.

end of pseudo-code 3

Referring to the above-described PUCCH-related descriptions, the current Rel-15 NR system is focused on transmission toward a single cell, a transmission point, a panel, a beam, a transmission direction, etc. for repeated PUCCH transmission. For convenience in the following description of the disclosure, higher layer/L1 parameters such as TCI state or spatial relation information, or cells, transmission point, panel, beam, transmission direction, etc. that can be identified through indicators such as cell ID, TRP ID, and panel ID, are unified and described as TRP (transmission reception point). Therefore, in actual application, it is possible to appropriately replace TRP with one of the above terms. In the current Rel-15 NR system, one PUCCH resource is used for repeated PUCCH transmission, and only one PUCCH-spatialRelationInfo can be activated for one PUCCH resource, so during the PUCCH repeated transmission, the UE must keep the direction of the transmission beam constant. Accordingly, because there is only one configuration information on timing advance in one cell, the same configuration information on timing advance between transmissions to a plurality of TRPs (or multi-TRP) during repeated PUCCH transmission should be used. In addition, when the UE transmits uplink control information to a plurality of TRPs using configuration information for multiple cells, one sequence used for group/sequence/cyclic shift hopping, PUCCH payload, and PUCCH DMRS may be configured in one cell configuration information. In addition, the priority setting method considering the repeated transmission of PUCCH to a plurality of TRPs and the method for processing the overlapping case are not defined. In the disclosure, by providing a processing method for the above-described case, it is possible to minimize the loss of uplink control information and the transmission delay time during repeated PUCCH transmission in consideration of a plurality of TRPs. Therefore, through the disclosure, methods for determining various combinations of information that can be configured during repeated PUCCH transmission that can be supported in future NR Release 17 or later will be described in detail through the following embodiments.

Hereinafter, embodiments of the disclosure will be described in detail with reference to the accompanying drawings. In addition, in describing the disclosure, if it is determined that a detailed description of a related function or configuration may unnecessarily obscure the gist of the disclosure, the detailed description thereof will be omitted. In addition, the terms to be described later are terms defined in consideration of functions in the disclosure, which may vary according to intentions or customs of users and operators. Therefore, the definition should be made based on the content throughout this disclosure.

Hereinafter, the base station is a subject performing resource allocation of the UE, and may be at least one of gNode B, gNB, eNode B, Node B, base station (BS), radio access unit, base station controller, or a node on a network. The terminal may include a user equipment (UE), a mobile station (MS), a cellular phone, a smartphone, a computer, or a multimedia system capable of performing a communication function. In addition, although an embodiment of the disclosure will be described below using an NR or LTE/LTE-A system as an example, the embodiment of the disclosure may be applied to other communication systems having a similar technical background or channel type. In addition, the embodiments of the disclosure may be applied to other communication systems through some modifications within a range that does not significantly depart from the scope of the disclosure as judged by a person having skilled technical knowledge.

The contents of the disclosure are applicable to frequency division duplex (FDD) and time division duplex (TDD) systems.

Hereinafter, in the disclosure, higher signaling is a signal transmission method in which a base station transmits to a UE using a downlink data channel of a physical layer, or from a UE to a base station using an uplink data channel of a physical layer, and may also be referred to as RRC signaling, or PDCP signaling, or medium access control (MAC) control element (MAC CE).

Hereinafter, in the disclosure, in determining whether to apply cooperative communication, the UE may use various methods, such as PDCCH(s) for allocating PDSCH to which cooperative communication is applied has a specific format, or the PDCCH(s) for allocating the PDSCH to which cooperative communication is applied includes a specific indicator indicating whether cooperative communication is applied, or PDCCH(s) for allocating PDSCH to which cooperative communication is applied is scrambled by a specific RNTI, or it is assumed that cooperative communication is applied in a specific section indicated by a higher layer. Hereinafter, for convenience of description, a case in which a UE receives a PDSCH to which cooperative communication is applied based on similar conditions will be referred to as a Non-Coherent Joint Transmission (NC-JT) case.

Hereinafter, in the disclosure, determining the priority between A and B may refer to selecting the one having a higher priority according to a predetermined priority rule and performing the corresponding operation or omit or drop the operation with the lower priority, etc., and may be mentioned in various ways.

Hereinafter, in the disclosure, the above examples will be described through a plurality of embodiments, but these are not independent and it is possible that one or more embodiments may be applied simultaneously or in combination.

First Embodiment: DCI Reception for NC-JT

Unlike the existing system, 5G wireless communication system can support all of a service requiring a high transmission rate, a service having a very short transmission delay, and a service requiring a high connection density. In a wireless communication network including a plurality of cells, transmission and reception points (TRPs), or beams, a coordinated transmission between each cell, TRP, and/or beam is one of element technologies that can satisfy various service requirements by increasing the strength of a signal received by the UE or efficiently performing interference control between each cell, TRP, and/or beam.

Joint transmission (JT) is a representative transmission technology for coordinated transmission, and through the joint transmission technology, one UE is supported through different cells, TRPs, and/or beams to increase the strength of a signal received by the UE. On the other hand, because the characteristics of each cell, TRP or/and the channel between the beam and the UE may be significantly different, different precoding, modulation coding scheme (MCS), resource allocation, etc. need to be applied to the link between each cell, TRP or/and beam and the UE. In particular, in the case of non-coherent joint transmission (NC-JT), which supports non-coherent precoding between each cell, TRP or/and beams, it is important to configure individual down link (DL) transmission information for each cell, TRP, or/and beams. Such individual DL transmission information configuration for each cell, TRP, and/or beam becomes a major factor in increasing the payload required for DL DCI transmission, which may adversely affect reception performance of physical downlink control channel (PDCCH) transmitting DCI. Therefore, it is necessary to carefully design a tradeoff between the amount of DCI information and the PDCCH reception performance for JT support.

Figure 12:
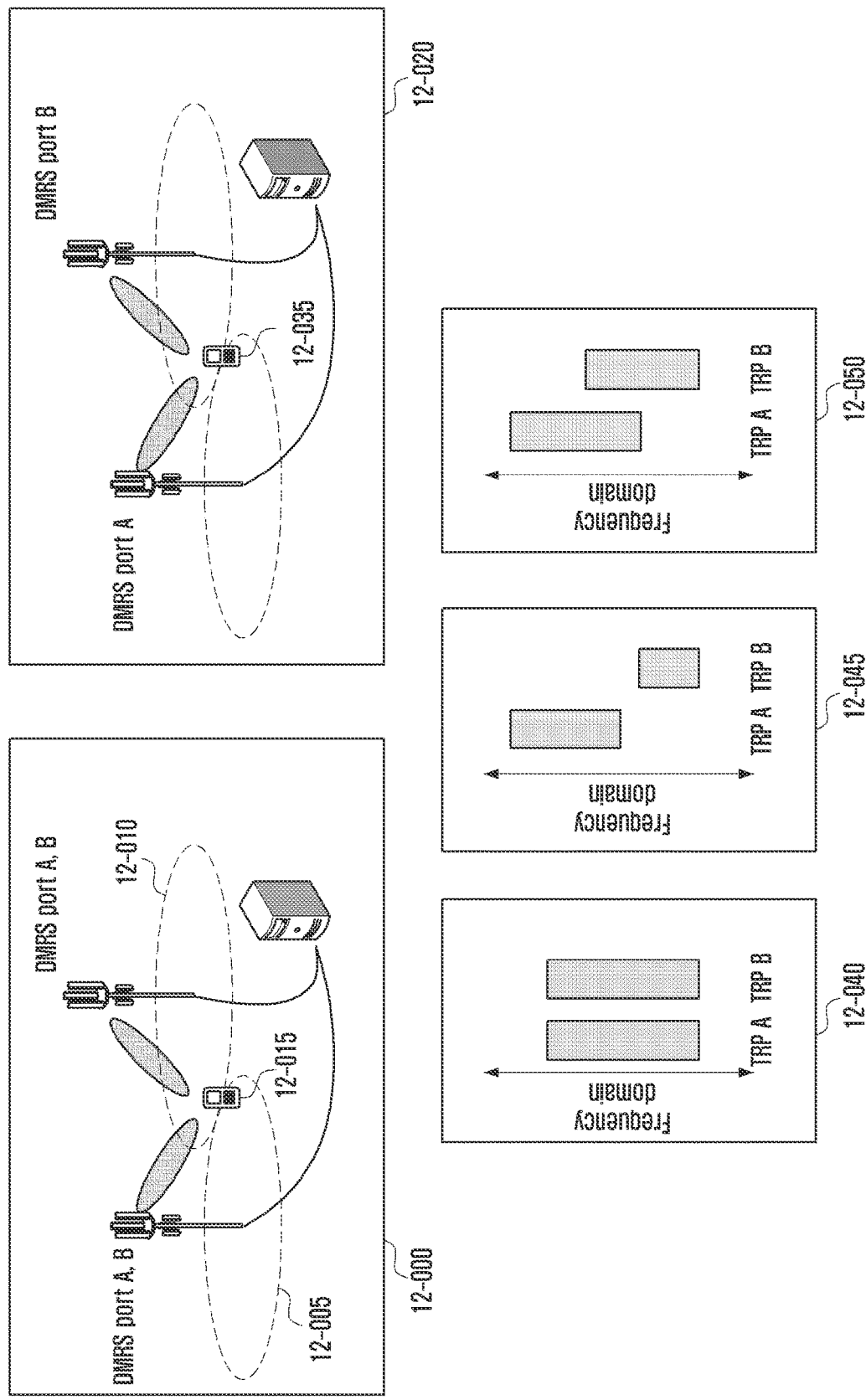
FIG. 12 is a diagram illustrating an example of an antenna port configuration and resource allocation for cooperative communication according to some embodiments in a wireless communication system according to an embodiment of the disclosure.

FIG. 12 is a diagram illustrating an example of an antenna port configuration and resource allocation for cooperative communication according to some embodiments in a wireless communication system according to an embodiment of the disclosure.

Referring to FIG. 12, examples of radio resource allocation for each TRP according to a joint transmission (JT) technique and situation are illustrated. 12-000 in FIG. 12 is an example of coherent joint transmission (C-JT) supporting coherent precoding between each cell, TRP and/or beam. In C-JT, single data (PDSCH) is transmitted from TRP A 12-005 and TRP B 12-010 to the UE 12-015, and joint precoding is performed in multiple TRPs. This may refer to that the DMRS for the PDSCH is transmitted based on the same demodulation reference signal (DMRS) ports (e.g., DMRS ports A and B in both TRPs) in TRP A 12-005 and TRP B 12-010. In this case, the UE 12-015 may receive one DCI for receiving one PDSCH demodulated based on DMRS transmitted through DMRS ports A and B.

12-020 in FIG. 12 is an example of non-coherent joint transmission (NC-JT) supporting non-coherent precoding between each cell, TRP or/and beam. In the case of NC-JT, a PDSCH is transmitted to the UE 12-035 for each cell, TRP, and/or beam, and individual precoding may be applied to each PDSCH. Each cell, TRP or/and beam transmits a different PDSCH to improve throughput compared to single cell, TRP or/and beam transmission, or each cell, TRP or/and beam repeatedly transmits the same PDSCH, and it is possible to improve reliability compared to single cell, TRP or/and beam transmission.

Various radio resource allocation may be considered such as a case when all of the frequency and time resources used by a plurality of TRPs for PDSCH transmission are the same 12-040, a case when the frequency and time resources used by multiple TRPs do not overlap 12-045 at all, and a case when some of the frequency and time resources used by a plurality of TRPs overlap 12-050. In each case of the aforementioned radio resource allocation, when a plurality of TRPs repeatedly transmit the same PDSCH to improve reliability, if the receiving UE does not identify whether or not the corresponding PDSCH is repeatedly transmitted, there may be a limit to reliability improvement because the UE cannot perform combining in the physical layer for the corresponding PDSCH. Therefore, the disclosure provides a repeated transmission indication and configuration method for improving NC-JT transmission reliability.

In order to simultaneously allocate a plurality of PDSCHs to one UE for NC-JT support, DCIs of various types, structures, and relationships may be considered.

Figure 13:
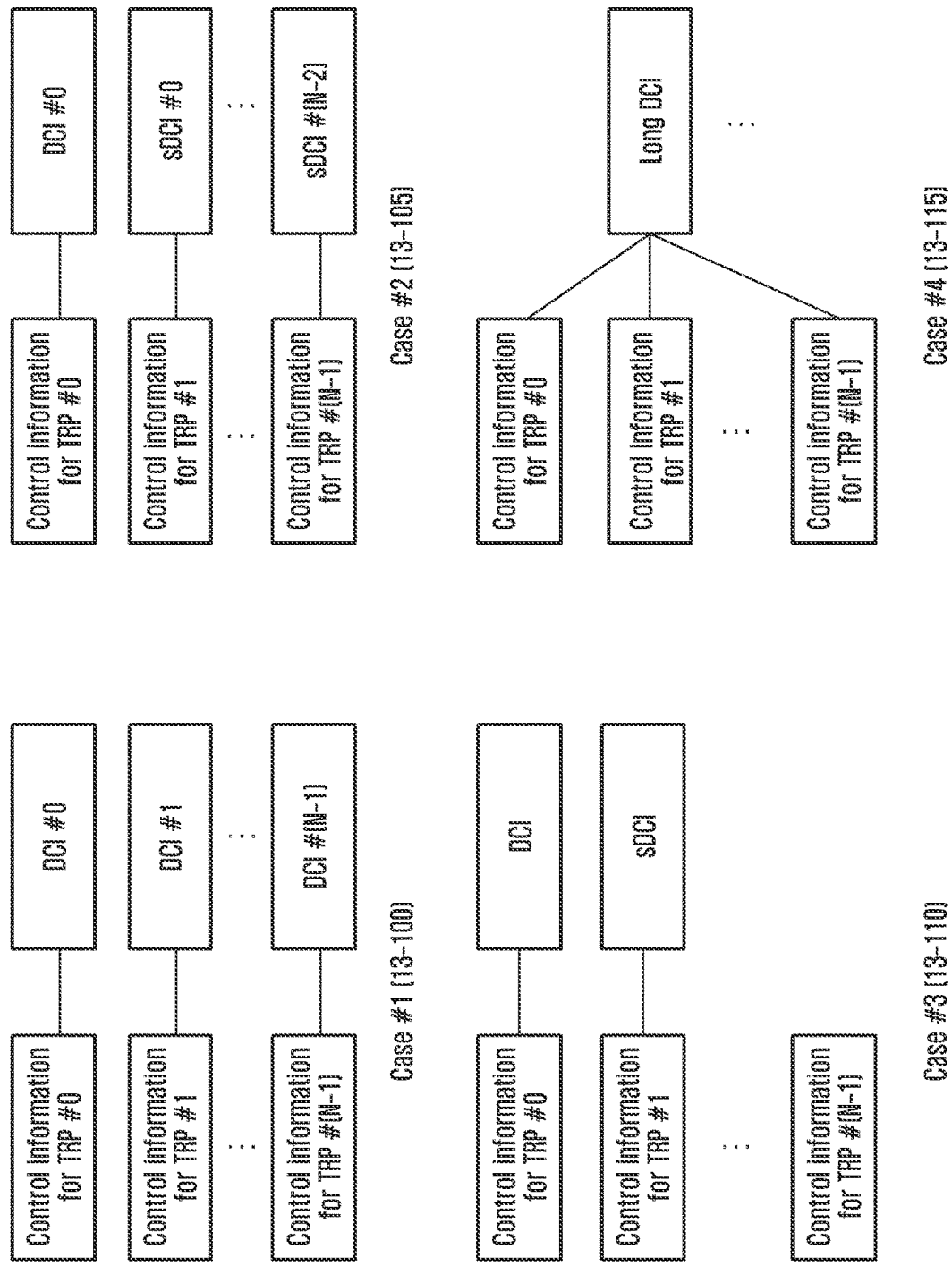
FIG. 13 is a diagram illustrating an example of downlink control information (DCI) configuration for cooperative communication in a wireless communication system according to an embodiment of the disclosure.

FIG. 13 is a diagram illustrating an example of downlink control information (DCI) configuration for cooperative communication in a wireless communication system according to an embodiment of the disclosure.

Referring to FIG. 13, four examples of DCI design for NC-JT support are illustrated.

In an embodiment, in a situation where N−1 different PDSCHs are transmitted in N−1 additional TRPs (TRP #1 to TRP #(N−1)) in addition to the serving TRP (TRP #0) used for single PDSCH transmission, case #1 13-100 is an example in which control information for PDSCH transmitted in N−1 additional TRPs is transmitted in the same form (same DCI format) as control information for PDSCH transmitted in serving TRP. That is, the UE may obtain control information for PDSCHs transmitted in different TRPs (TRP #0 to TRP #(N−1)) through DCIs (DCI #0 to DCI #(N−1)) having the same DCI format and the same payload.

Accordingly, in Case #1, each PDSCH control (allocation) degree of freedom can be completely guaranteed, but when each DCI is transmitted in different TRPs, a coverage difference for each DCI may occur and reception performance may deteriorate.

In an embodiment, in a situation where N−1 different PDSCHs are transmitted in N−1 additional TRPs (TRP #1 to TRP #(N−1)) in addition to the serving TRP (TRP #0) used for single PDSCH transmission, case #2 13-105 is an example in which control information for PDSCH transmitted in N−1 additional TRPs is transmitted in a different form (different DCI format or different DCI payload) from control information for PDSCH transmitted in serving TRP. For example, in the case of DCI #0, which is control information for PDSCH transmitted in the serving TRP (TRP #0), all information elements of DCI format 1_0 or DCI format 1_1 are included, but in the case of shortened DCIs (hereinafter sDCI) (sDCI #0 to sDCI #(N−2)), which are control information for PDSCHs transmitted in the cooperative TRP (TRP #1 to TRP #(N−1)), only some of the information elements of DCI format 1_0 or DCI format 1_1 may be included. Therefore, in the case of sDCI transmitting control information for PDSCHs transmitted in the cooperative TRP, it may be possible to include reserved bits as much as the payload is small compared to normal DCI (nDCI) for transmitting PDSCH-related control information transmitted in the serving TRP, or the number of bits lacking compared to nDCI.

Accordingly, in Case #2, each PDSCH control (allocation) degree of freedom may be limited according to the content of information elements included in sDCI, but because the reception performance of sDCI is superior to that of nDCI, the probability of a difference in coverage for each DCI may be lowered.

In an embodiment, in a situation where N−1 different PDSCHs are transmitted in N−1 additional TRPs (TRP #1 to TRP #(N−1)) in addition to the serving TRP (TRP #0) used for single PDSCH transmission, Case #3 13-110 is an example in which control information for PDSCH transmitted in N−1 additional TRPs is transmitted in a different form (different DCI format or different DCI payload) from control information for PDSCH transmitted in serving TRP. For example, in the case of DCI #0, which is control information for PDSCH transmitted in the serving TRP (TRP #0), all information elements of DCI format 1_0 to DCI format 1_1 are included, and in the case of the control information for PDSCHs transmitted in the cooperative TRP (TRP #1 to TRP #(N−1)), only some of the information elements of DCI format 1_0 to DCI format 1_1 may be collected and transmitted in one 'secondary' DCI (sDCI). For example, the sDCI may include at least one of HARQ-related information such as frequency domain resource assignment of cooperative TRPs, time domain resource assignment, and MCS. In addition, in the case of information not included in the sDCI, such as a bandwidth part (BWP) indicator or a carrier indicator, DCI (DCI #0, normal DCI, nDCI) of the serving TRP may be followed.

Accordingly, in Case #3, each PDSCH control (allocation) degree of freedom may be limited according to the contents of the information element included in sDCI, but sDCI reception performance may be adjusted and the complexity of DCI blind decoding of the UE may be reduced compared to Case #1 or Case #2.

In an embodiment, in a situation where N−1 different PDSCHs are transmitted in N−1 additional TRPs (TRP #1 to TRP #(N−1)) in addition to the serving TRP (TRP #0) used for single PDSCH transmission, Case #4 13-115 is an example in which control information for PDSCH transmitted in N−1 additional TRPs is transmitted from the same DCI (long DCI, lDCI) as control information for PDSCH transmitted in serving TRP. That is, the UE may obtain control information for PDSCHs transmitted in different TRPs (TRP #0 to TRP #(N−1)) through a single DCI.

Accordingly, in Case #4, the complexity of DCI blind decoding of the UE may not increase, but the PDSCH control (allocation) degree of freedom may be low, such as the number of cooperative TRPs being limited according to long DCI payload restrictions.

In the following description and embodiments, sDCI may refer to various auxiliary DCIs such as shortened DCI, secondary DCI, or normal DCI (the aforementioned DCI format 1_0 to 1_1) including PDSCH control information transmitted in cooperative TRP, and if no special restrictions are specified, the description is similarly applicable to various auxiliary DCIs.

In the following description and embodiments, the above-described Case #1, Case #2, and Case #3 in which one or more DCIs (PDCCH) are used to support NC-JT may be distinguished as multiple PDCCH-based NC-JTs, and the above-described Case #4 in which a single DCI (PDCCH) is used for NC-JT support can be distinguished as a single PDCCH-based NC-JT.

In embodiments of the disclosure, "cooperative TRP" may be replaced with various terms such as "cooperative panel" or "cooperative beam" when actually applied.

In the embodiments of the disclosure, "when NC-JT is applied" may be interpreted variously according to the situation, such as "when a UE receives one or more PDSCHs at the same time in one BWP", "when a UE receives the PDSCH based on two or more transmission configuration indicator (TCI) indications at the same time in one BWP", "when the PDSCH received by the UE is associated with one or more DMRS port groups", etc., but for convenience of explanation, one expression has been used.

In the disclosure, the radio protocol structure for NC-JT may be used in various ways according to TRP deployment scenarios. As an example, if there is no or small backhaul delay between cooperative TRPs, it is possible to use a structure based on MAC layer multiplexing similar to S10 of FIG. 11 (CA-like method). On the other hand, when the backhaul delay between cooperative TRPs is so large that it cannot be ignored (for example, when information exchange of CSI, scheduling, HARQ-ACK, etc. between cooperative TRPs requires more than 2 ms), it is possible to secure a characteristic strong against delay by using an independent structure for each TRP from the RLC layer, similar to S20 of FIG. 11 (DC-like method).

Embodiment 1-1: Method of Configuring Downlink Control Channel for NC-JT Transmission Based on Multi-PDCCH In the Multiple PDCCH-based NC-JT, when transmitting DCI for the PDSCH schedule of each TRP, it may have a CORESET or a search space distinguished for each TRP. The CORESET or search space for each TRP may be configured as at least one of the following cases.

- Higher layer index configuration for each CORESET: The TRP for transmitting the PDCCH in the corresponding CORESET may be distinguished by the configured higher layer index value for each CORESET. That is, in a set of CORESETs having the same higher layer index value, it may be considered that the same TRP transmits a PDCCH or that a PDCCH scheduling a PDSCH of the same TRP is transmitted.
- Multiple PDCCH-Config configurations: Multiple PDCCH-Configs in one BWP are configured, and PDCCH configurations for each TRP may be configured in each PDCCH-Config. A list of CORESETs for each TRP and/or a list of search spaces for each TRP may be configured through a plurality of PDCCH-Configs.
- CORESET beam/beam group configuration: TRP corresponding to the corresponding CORESET may be distinguished through a beam or beam group configured for each CORESET. For example, when the same TCI state is configured in multiple CORESETs, the CORESETs may be considered to be transmitted through the same TRP, or it may be considered that the PDCCH scheduling the PDSCH of the same TRP is transmitted from the corresponding CORESETs.
- Search space beam/beam group configuration: A beam or beam group is configured for each search space, and through this, TRP for each search space may be distinguished. For example, when the same beam/beam group or TCI state is configured in multiple search spaces, in the corresponding search space, it may be considered that the same TRP transmits the PDCCH or that the PDCCH scheduling the PDSCH of the same TRP is transmitted in the corresponding search space.

Accordingly, by distinguishing the CORESET or search space for each TRP, it is possible to classify the PDSCH and HARQ-ACK information for each TRP, and through this, it is possible to generate an independent HARQ-ACK codebook for each TRP and use an independent PUCCH resource.

Second Embodiment: HARQ-ACK Information Delivery Method for NC-JT Transmission

The following embodiment provides a detailed method of delivering HARQ-ACK information for NC-JT transmission.

FIGS. 14A, 14B, 14C, and 14D are diagrams illustrating HARQ-ACK information delivery methods according to various DCI configurations and PUCCH configurations for NC-JT transmission according to various embodiments of the disclosure.

Referring to FIG. 14A, option #1: In the case of single-PDCCH-based NC-JT, HARQ-ACK for single-PDCCH NC-JT 14-00 illustrates a situation in which HARQ-ACK information for one or a plurality of PDSCHs 14-05 scheduled by the TRP is transmitted through one PUCCH resource 14-10. The PUCCH resource may be indicated through the PRI value and $K_1$ value in the DCI described above.

Figure 14B:
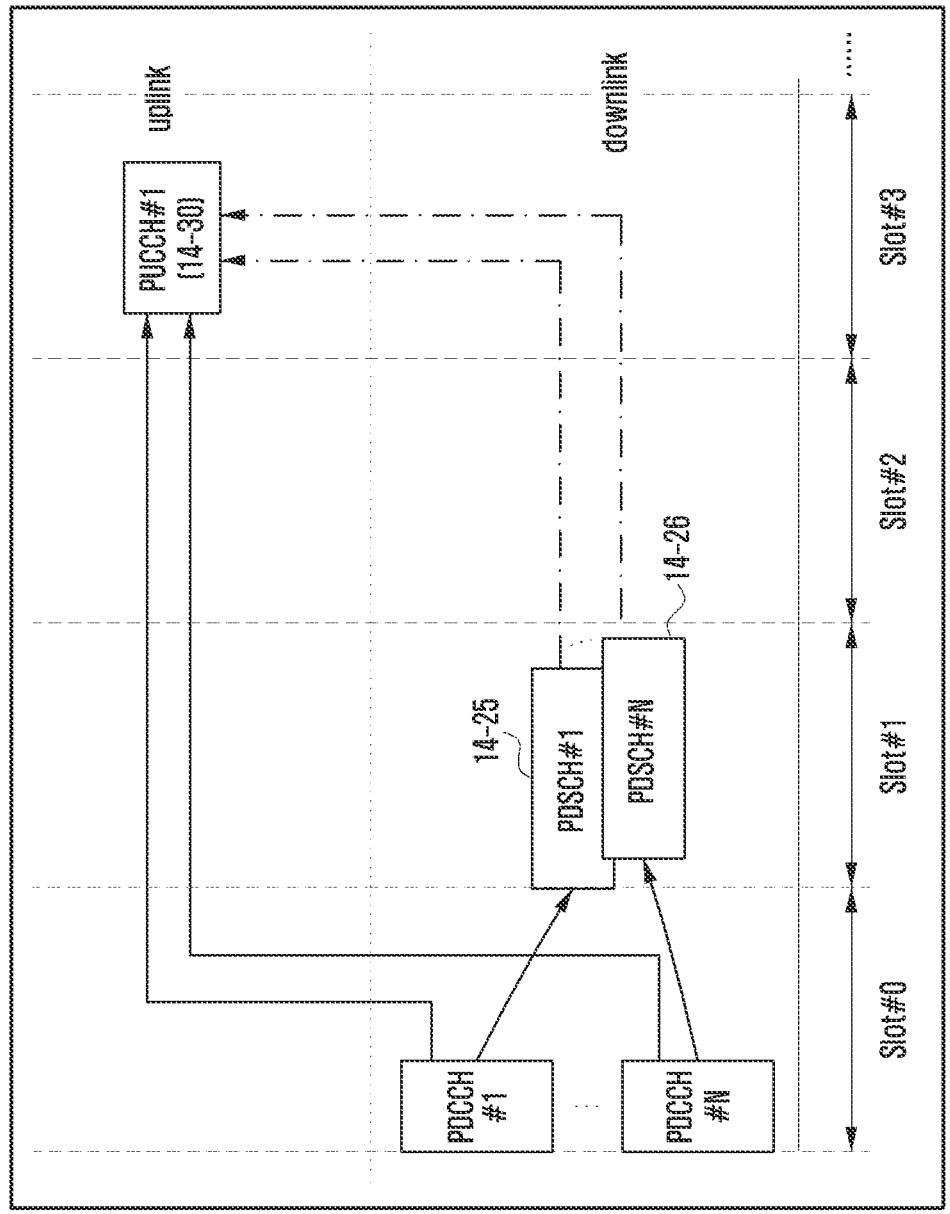
FIG. 14B is a diagram illustrating a HARQ-ACK information delivery method according to various DCI configurations and PUCCH configurations for NC-JT transmission according to an embodiment of the disclosure.

FIG. 14B (option #2) to 14D (option #4), 14-20, 14-40, and 14-60 illustrates the case of multi-PDCCH based NC-JT. At this time, each option may be distinguished according to the number of PUCCH resources to transmit HARQ-ACK information corresponding to the PDSCH of each TRP and the location on the time axis of the PUCCH resource.

Referring to FIG. 14B, Option #2: The joint HARQ-ACK 14-20 illustrates a situation in which HARQ-ACK information corresponding to the PDSCH 14-25 and 14-26 of each TRP is transmitted through one PUCCH resource 14-30. HARQ-ACK information for all TRPs may be generated based on a single HARQ-ACK codebook, or HARQ-ACK information for each TRP may be generated based on an individual HARQ-ACK codebook.

When an individual HARQ-ACK codebook for each TRP is used, as defined in embodiment 1-1, each TRP may be distinguished based on at least one of a set of CORESETs having the same higher layer index, a set of CORESETs belonging to the same TCI state or beam or beam group, and a set of search spaces belonging to the same TCI state or beam or beam group.

Figure 14C:
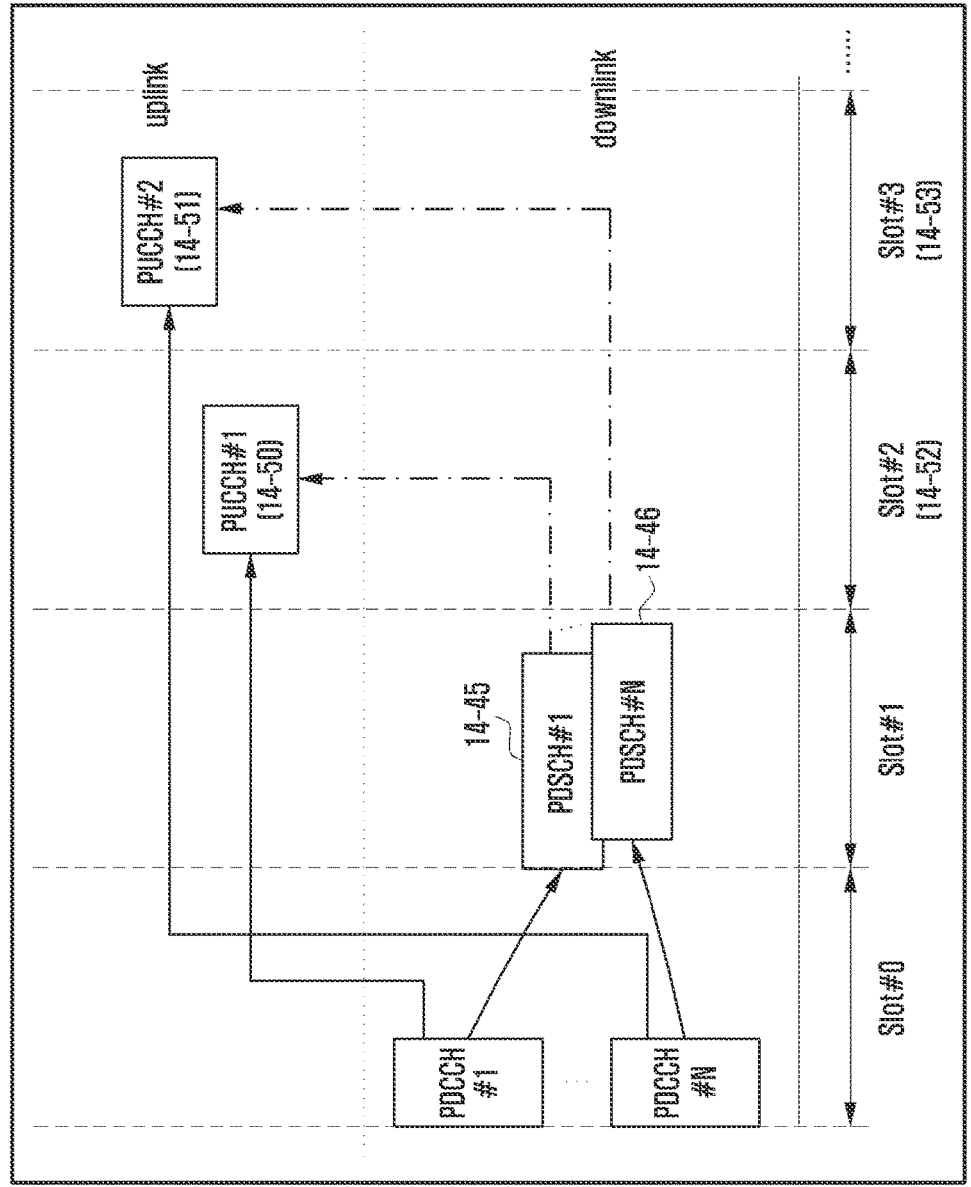
FIG. 14C. is a diagram illustrating a HARQ-ACK information delivery method according to various DCI configurations and PUCCH configurations for NC-JT transmission according to an embodiment of the disclosure.

Referring to FIG. 14C, Option #3: The inter-slot TDMed separate HARQ-ACK 14-40 illustrates a situation in which HARQ-ACK information corresponding to the PDSCH 14-45 and 14-46 of each TRP is transmitted through PUCCH resources 14-50 and 14-51 of different slots 14-52 and 14-53. The slot in which the PUCCH resource for each TRP is transmitted may be determined by the above-described $K_1$ value. If the $K_1$ values indicated by a plurality of PDCCHs indicate the same slot, it is assumed that all of the PDCCHs are scheduled in the same TRP, and all HARQ-ACK information corresponding to the PDCCHs may be transmitted.

Figure 14D:
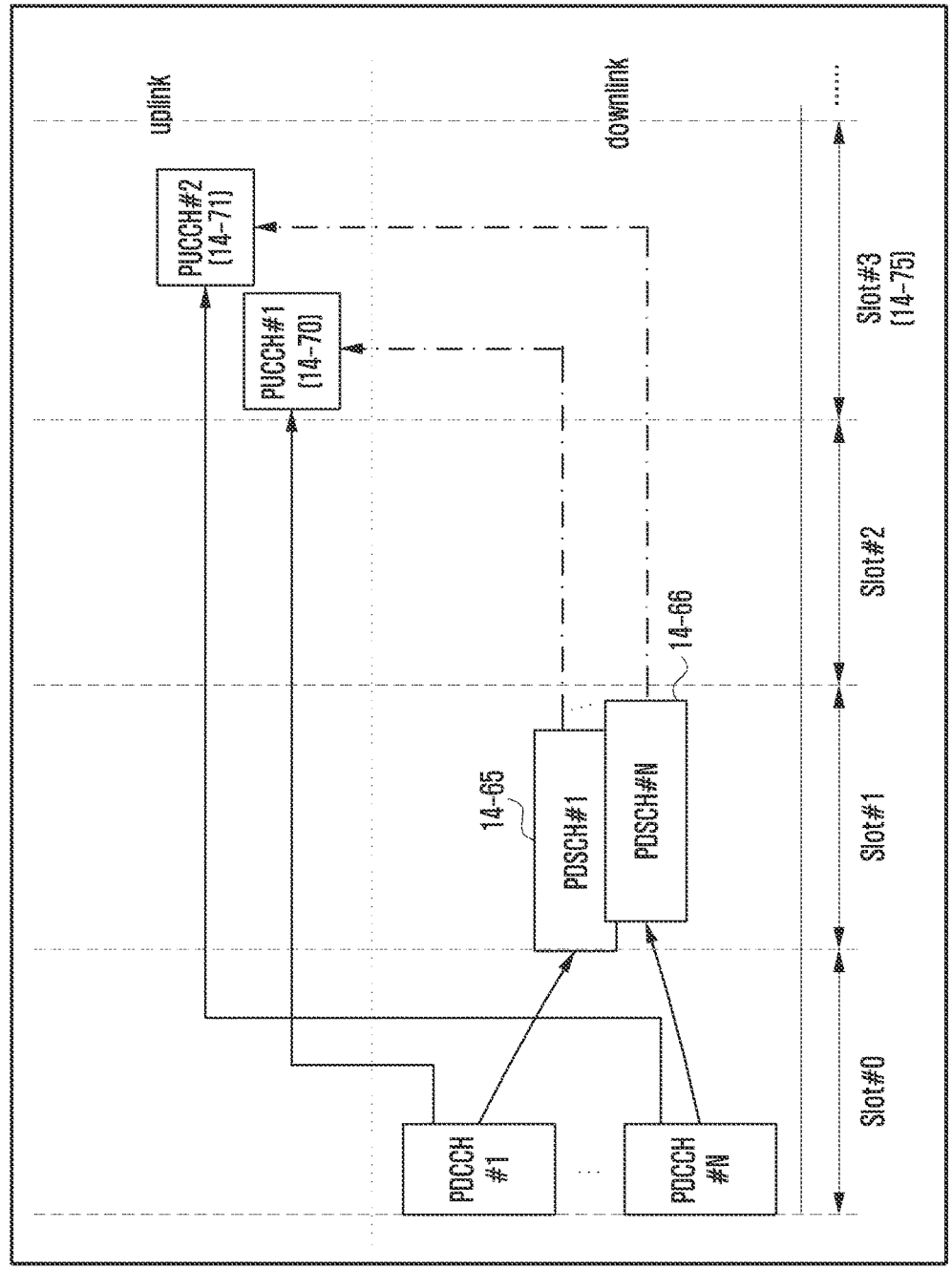
FIG. 14D is a diagram illustrating a HARQ-ACK information delivery method according to various DCI configurations and PUCCH configurations for NC-JT transmission according to an embodiment of the disclosure.

Referring to FIG. 14D, Option #4: The intra-slot TDMed separate HARQ-ACK 14-60 illustrates a situation in which HARQ-ACK information corresponding to the PDSCH 14-65 and 14-66 of each TRP is transmitted through different PUCCH resources 14-70 and 14-71 in different symbols within the same slot 14-75. The slot in which the PUCCH resource for each TRP is transmitted may be determined by the above-described value, and if a value indicated by a plurality of PDCCHs indicates the same slot, the PUCCH resource selection and transmission symbol may be determined through at least one of the following methods.

Configure PUCCH Resource Group for Each TRP

A PUCCH resource group for HARQ-ACK transmission for each TRP may be configured. When the TRP is distinguished based on the CORESET/search space as in the 1-1 embodiment, the PUCCH resource for HARQ-ACK transmission for each TRP may be selected from within the PUCCH resource group for the corresponding TRP. Time division multiplexing (TDM) may be expected between PUCCH resources selected from different PUCCH resource groups. That is, the selected PUCCH resources may not overlap in symbol units. In the PUCCH resource selected for each TRP, an individual HARQ-ACK codebook generated for each TRP may be transmitted.

Indicate Different PRI for Each TRP

When the TRP is distinguished based on the CORESET/search space as in the 1-1 embodiment, PUCCH resource for each TRP may be selected according to the PRI. That is, the PUCCH resource selection process in Rel-15 described above may be independently performed for each TRP. At this time, the PRI used for determining the PUCCH resource for each TRP may be different. For example, the UE may not expect that the PRI used for determining the PUCCH resource for each TRP is indicated with the same value. In addition, TDM may be expected between the PUCCH resources corresponding to the PRI for each TRP. That is, the selected PUCCH resources may not overlap in symbol units. In the PUCCH resource selected for each TRP, an individual HARQ-ACK codebook generated for each TRP may be transmitted.

Define $K_1$ Value in Sub-Slot Unit

The PUCCH resource selection process in Rel-15 described above may be followed, but the $K_1$ value may be defined in units of sub-slots. For example, after the HARQ-ACK codebook for PDSCH/PDCCHs indicated to report HARQ-ACK in the same sub-slot is generated, the HARQ-ACK codebook may be transmitted in the PUCCH resource indicated by PRI. The HARQ-ACK codebook generation and PUCCH resource selection process may be independent of whether the TRP is classified by CORESET/search space.

When the UE supports NC-JT reception, one of the above options may be set through a higher layer or may be implicitly selected according to circumstances. For example, in a UE supporting multi-PDCCH-based NC-JT, one of option 2 and options 3/4 may be selected as a higher layer. For another example, one of option 1 for the former and options 2/3/4 for the latter may be selected according to whether single-PDCCH-based NC-JT or multi-PDCCH-based NC-JT is supported/configured. For another example, the option used according to the selection of the PUCCH resource in the multi-PDCCH based NC-JT may be determined. When the PUCCH resources of the same slot in different TRPs are selected, if the corresponding PUCCH resources are different from each other and do not overlap in units of symbols, HARQ-ACK is transmitted according to option 4, and if PUCCH resources overlap in units of symbols or are identical, HARQ-ACK may be transmitted according to option 2. When PUCCH resources of different slots are selected in different TRPs, HARQ-ACK may be transmitted according to option 3. The configuration for the option may be dependent on the UE capability. For example, the base station may receive the capability of the UE according to the above-described procedure, and may configure an option based on this. For example, only the UE having the capability to support intra-slot TDMed separate HARQ-ACK is allowed to configure option 4, and the UE that does not have the corresponding capability may not expect the configuration according to option 4.

Third Embodiment: Method of Generating Type 1 HARQ-ACK Codebook when Multi-DCI Based Multi-TRP is Supported When multi-DCI-based multi-TRP is supported, that is, when CORESETs in which CORESETPoolIndex, which is higher layer signaling, is configured to 0, and CORESETs in which CORESETPoolIndex is configured to 1 are provided to the UE, as described above, the Type 1 HARQ-ACK codebook may be generated using two methods of separate feedback and joint feedback defined in Release 16 and a method defined in Release 15, total of three methods.

At this time, if the Type 1 HARQ-ACK codebook is generated by the separate feedback method defined in Release 16, for the active BWP of the serving cell, the HARQ-ACK codebook associated with the first CORESETs in which CORESETPoolIndex is set to 0 or CORESETPoolIndex is not configured, and the HARQ-ACK codebook associated with the second CORESETs in which CORESETPoolIndex is 1 are generated, respectively. Unlike the joint feedback method that generates a Type 1 HARQ-ACK codebook by classifying the serving cell into sets S0 and S1 according to CORESETPoolIndex, the separate feedback method generates a Type 1 HARQ-ACK codebook for the entire serving cell without classifying the serving cell as S0 and S1 according to CORESETPoolIndex. For example, when generating the Type 1 HARQ-ACK codebook associated with the first CORESETs using the above [pseudo-code 2], instead of generating the HARQ-ACK codebook only for the serving cell including the first CORESET, the HARQ-ACK codebook for the entire serving cell is generated. Therefore, a problem that the generated Type 1 HARQ-ACK codebook includes HARQ-ACK feedback information for a serving cell that does not include the first CORESET occurs. Similarly, when generating the Type 1 HARQ-ACK codebook associated with the second CORESETs, the same problem occurs because the HARQ-ACK codebook for the entire serving cell is generated instead of the HARQ-ACK codebook for only the serving cell including the second CORESET. To solve this problem, it is possible to classify the set S0 consisting of the serving cell including the first CORESET and the set S1 consisting of a serving cell containing the second CORESET in the active BWP of the serving cell by a separate feedback method, and generate a Type 1 HARQ-ACK codebook for the set S0 and the set S1, respectively. Type 1 HARQ-ACK codebooks generated using sets S0 and S1 are respectively reported to the base station according to the CORESET in which the PDCCH including the DCI that triggered the HARQ-ACK information report is received.

Figure 15A:
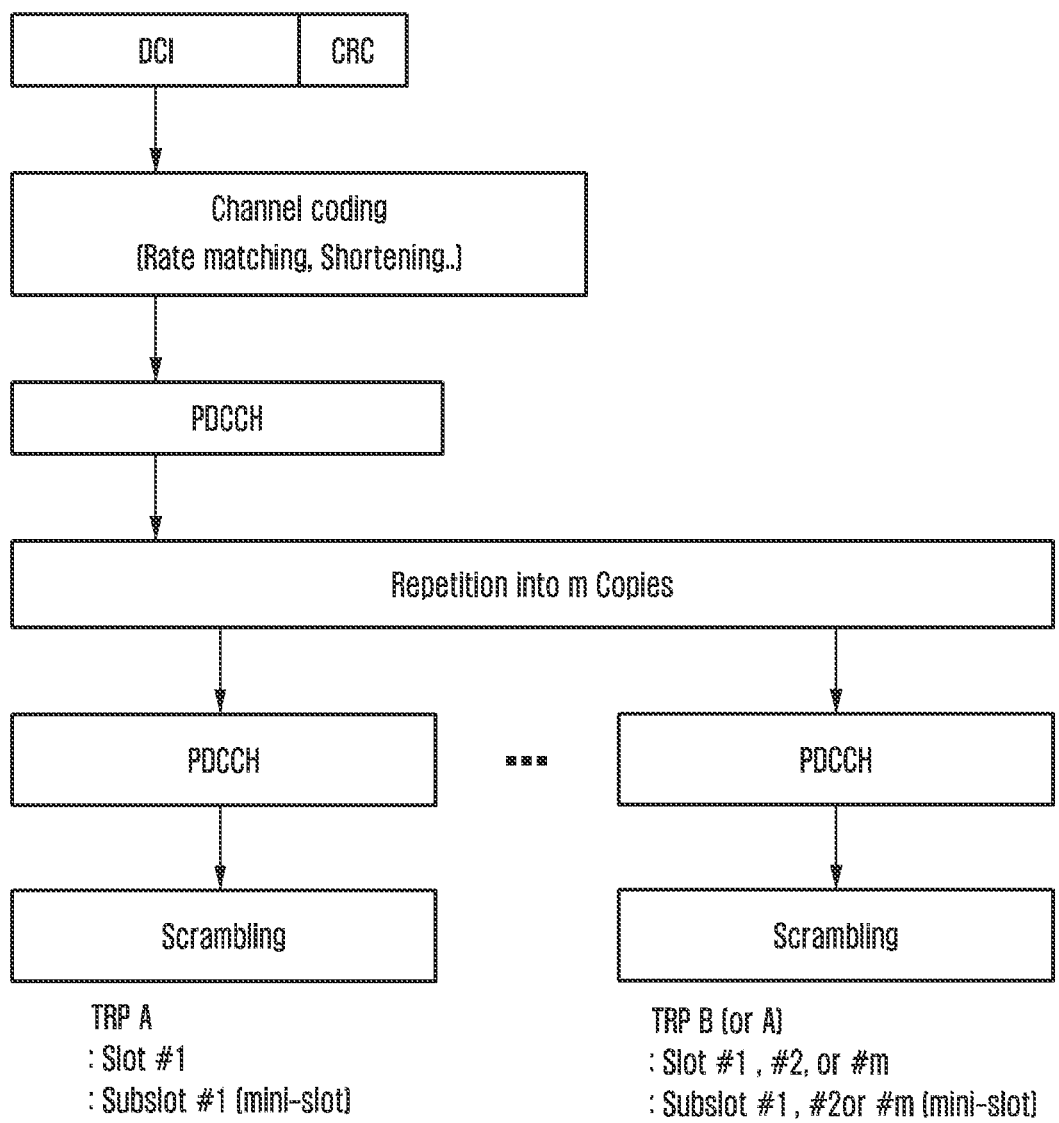
FIG. 15A is a diagram illustrating a method for a base station to repeatedly transmit a PDCCH according to an embodiment of the disclosure.

FIG. 15A is a diagram illustrating a method for a base station to repeatedly transmit a PDCCH according to an embodiment of the disclosure.

In a wireless communication system, DCI including scheduling information for PUSCH or PDSCH may be transmitted from the base station to the UE through the PDCCH. The base station may generate a DCI, attach a CRC to a DCI payload, and generate a PDCCH through channel coding. Thereafter, the base station may copy the generated PDCCH a plurality of times and distribute it to different CORESET or search space resources for transmission.

Referring to FIG. 15A, if the base station repeatedly transmits the PDCCH twice, the base station may repeatedly transmit the PDCCH based on the same or different beams in terms of spatial domain by mapping the PDCCHs to TRP A and TRP B, respectively. If the base station repeatedly transmits the PDCCH four times, the base station maps the PDCCHs twice to correspond to TRP A and TRP B, respectively, and in this case, two PDCCHs of each TRP may be transmitted separately in the time domain. The repeated PDCCH transmission distinguished in the time domain may be repeated in time units of slot based, sub-slot based, or mini-slot based.

However, the above-described method is merely an example and is not limited thereto. In the disclosure, the UE and the base station may consider the following various cases for the above-described PDCCH repetition operation.

In the following embodiments, at least one of the following various cases will be described as an example, but may not be limited thereto.

1-1) Within the same CORESET, PDCCH repetition in terms of time domain within the same slot.

1-2) Within the same CORESET, PDCCH repetition in terms of frequency domain within the same slot.

1-3) Within the same CORESET, PDCCH repetition in terms of spatial domain within the same slot.

2-1) Within the same CORESET, PDCCH repetition in terms of time domain between different slots.

2-2) Within the same CORESET, PDCCH repetition in terms of frequency domain between different slots.

2-3) Within the same CORESET, PDCCH repetition in terms of spatial domain between different slots.

3-1) Between different CORESETs, PDCCH repetition in terms of time domain within the same slot.

3-2) Between different CORESETs, PDCCH repetition in terms of frequency domain within the same slot.

3-3) Between different CORESETs, PDCCH repetition in terms of spatial domain within the same slot.

4-1) Between different CORESETs, PDCCH repetition in terms of time domain and between different slots.

4-2) Between different CORESETs, PDCCH repetition in terms of frequency domain and between different slots.

4-3) Between different CORESETs, PDCCH repetition in terms of spatial domain and between different slots.

In addition, the number of repetitions of the PDCCH may increase independently, and accordingly, the above-described methods may be combined and considered simultaneously. The base station may preconfigure information on through which domain the PDCCH is repeatedly transmitted to the UE through an RRC message. For example, in the case of repeated PDCCH transmission in terms of the time domain, the base station may preconfigure information on whether it is repeated according to any one of the above-described slot-based, sub-slot-based, or mini-slot-based time units to the UE. In the case of repeated PDCCH transmission in terms of the frequency domain, the base station may preconfigure information on whether it is repeated based on any one of CORESET, bandwidth part (BWP), or component carrier (CC) to the UE in advance. In the case of repeated PDCCH transmission in terms of the spatial domain, the base station may preconfigure information related to a beam for repeated PDCCH transmission to the UE through configuration for each QCL type. Alternatively, the information listed above may be combined and transmitted to the UE through an RRC message. Accordingly, the base station may repeatedly transmit the PDCCH according to preconfigured information through the RRC message, and the UE may repeatedly receive the PDCCH according to the preconfigured information through the RRC message.

Figure 15B:
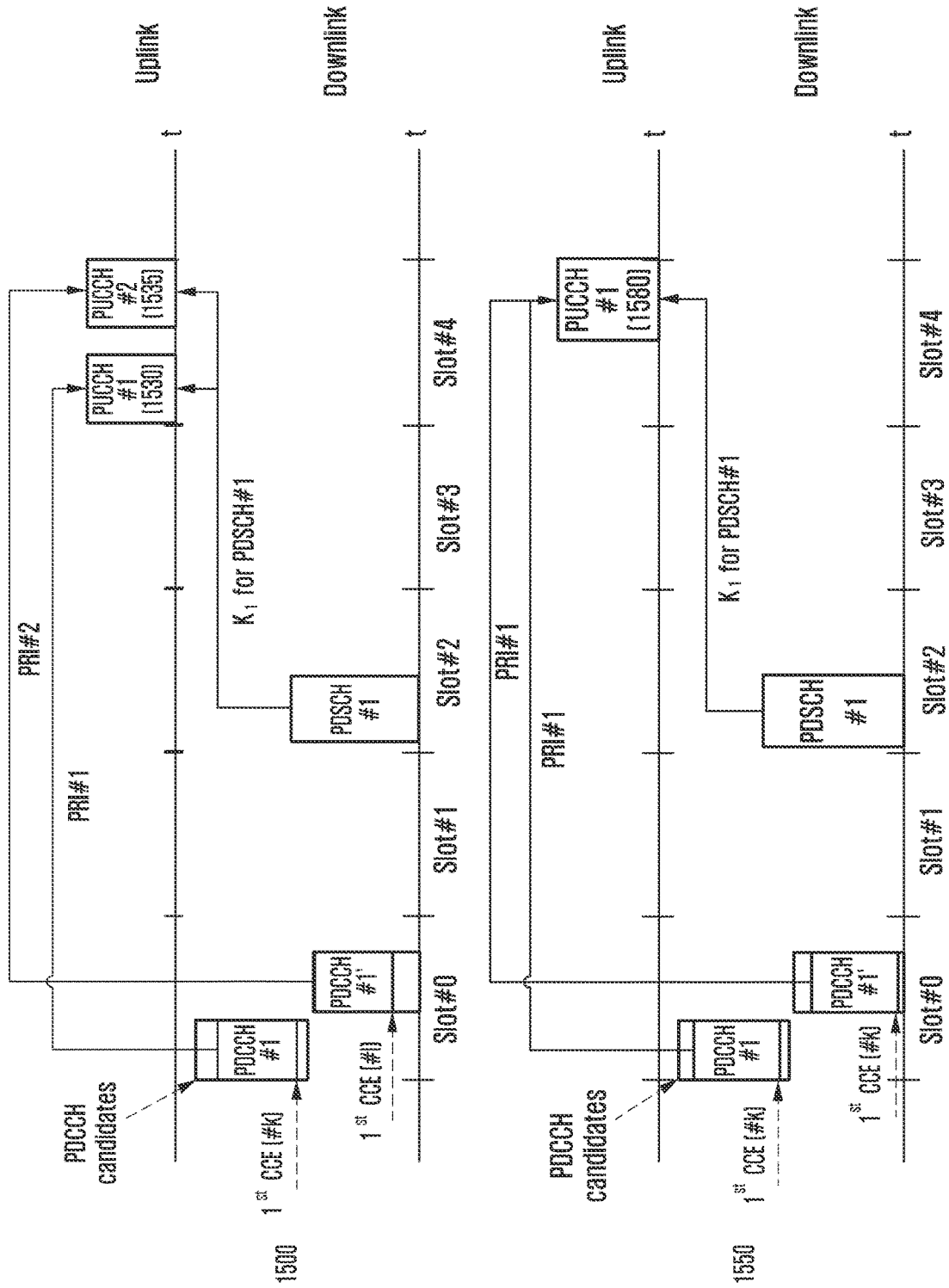
FIG. 15B is a diagram illustrating a method for generating a Type 1 HARQ-ACK codebook according to an embodiment of the disclosure.
Figure 15C:
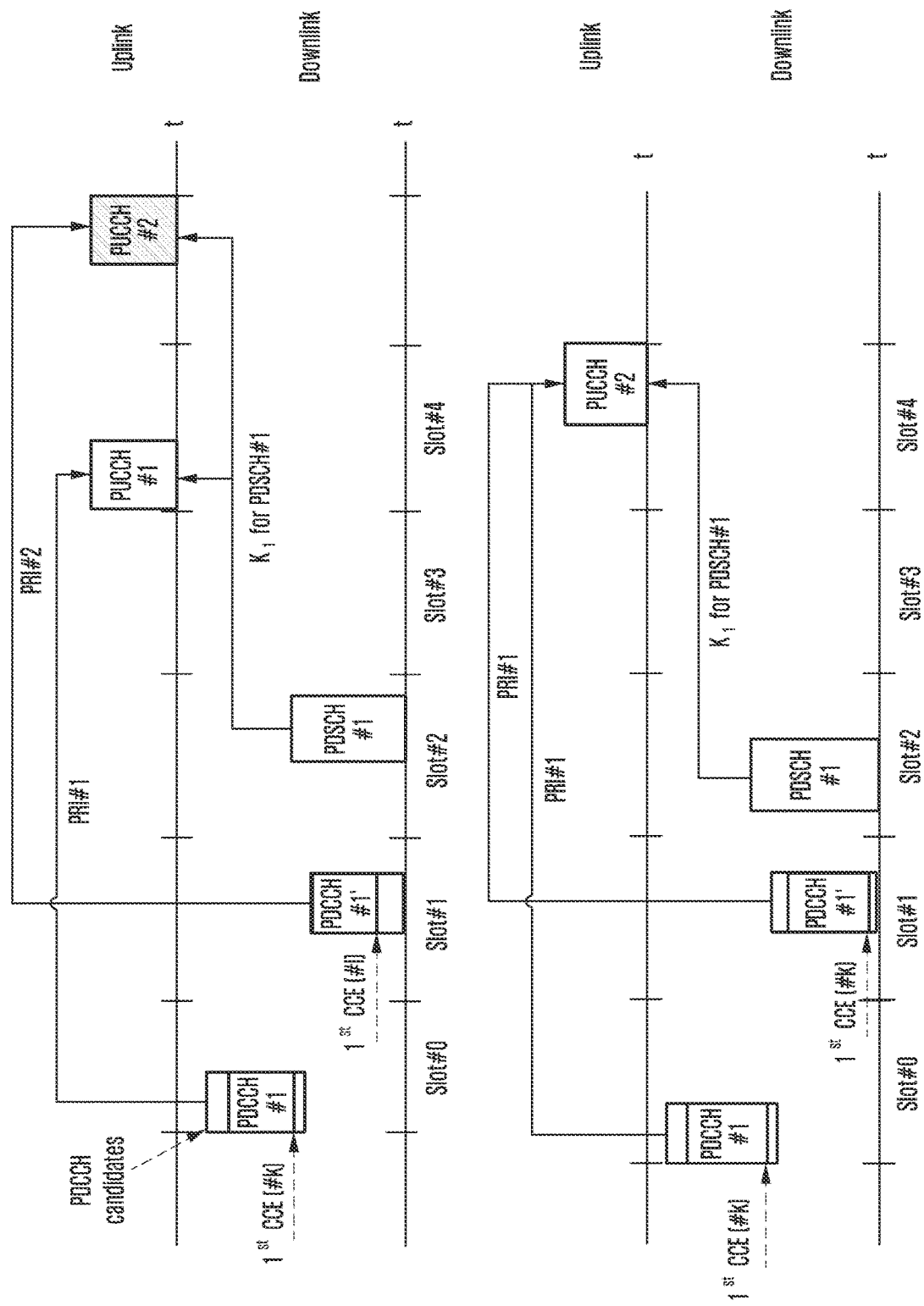
FIG. 15C is a diagram illustrating a method for generating a Type 1 HARQ-ACK codebook according to an embodiment of the disclosure.

FIGS. 15B and 15C illustrate a case of a multi-PDCCH-based NC-JT according to a configuration of a PDCCH and PUCCH transmitted repeatedly for NC-JT transmission according to various embodiments of the disclosure.

Referring to FIGS. 15B and 15C, various methods for selecting a PUCCH resource for transmitting HARQ-ACK information corresponding to a PDSCH scheduled by a PDCCH repeatedly transmitted in each TRP may be considered. In particular, in various ways of selecting a PUCCH resource, each option may be considered and distinguished according to the number of PUCCH resources, the number of PUCCH resource IDs, and the location on the frequency/time axis of the PUCCH resource.

FIGS. 15B and 15C are the case of PDCCH #1, . . . , PDCCH #N (N=2) in the example of FIGS. 14A to 14D, and in particular, DCI of PDCCH #1 and PDCCH #1' are configured with the same information payload and are repeatedly transmitted. In this case, as in 1500 and 1550, the base station may configure the same control information and transmit the control information to the UE through PDCCH #1 and PDCCH #1'. Referring to FIG. 15B, the PUCCH resource index indicated by PDCCH #1 and PDCCH #1' may be different 1500 or the same 1550. In this way, when PUCCH #1 determined by PDCCH #1 and PUCCH #2 determined by PDCCH #1' are determined, the base station and the UE may select at least one PUCCH resource to transmit the HARQ-ACK/NACK information described above. In the embodiment below, two PUCCH resources have been described, but three or more cases are not excluded, and may be fully extended and understood.

Option 1: As illustrated in 1500, the base station configures two PUCCH resources 1530 and 1535, and the UE may select/determine one resource from among the two PUCCH resources according to a configured rule between the base station and the UE. In this case, the base station and the UE may expect that HARQ-ACK/NACK information is transmitted in one PUCCH resource according to a mutually determined rule.

Option 2: As illustrated in 1500, the base station configures two PUCCH resources 1530 and 1535, and the UE may selectively select/determine one resource from among the two PUCCH resources. In this case, the base station may have to perform a decoding operation on both PUCCH resources in order to identify HARQ-ACK/NACK information transmitted from a resource arbitrarily selected by the UE.

Option 3: As illustrated in 1500, the base station configures one PUCCH resource 1580 and, the UE may transmit HARQ-ACK/NACK information on one PUCCH resource assuming that the base station configures one PUCCH resource.

Hereinafter, various embodiments will be described in detail with respect to a rule determined between the base station and the UE in option 1 described above.

As in option 1, when determining a PDCCH candidate for repeatedly transmitting the same DCI to a specific UE, the base station (TRP) may configure the 2 PDCCH candidates to be explicitly connected to each other in the higher layer, and the number of CCEs and the first/starting CCE index of the PDCCH candidates when resource allocation (when determining resource location) of the PDCCH in each PDCCH candidate(s) may be configured, respectively. In this case, the number of CCEs constituting each PDCCH candidate(s) and the first/starting CCE index may be configured differently or may be configured identically. When two PDCCHs are allocated to the same slot (FIG. 15B) or different slots (FIG. 15C) by the base station, in selecting a PUCCH resource, the UE may transmit HARQ-ACK/NACK information related to whether or not PDSCH #1 has been successfully received based on the PUCCH resource index mapped to the value ($\Delta_{PRI}$) of the PUCCH resource indicator field indicated by the base station as illustrated in Table 23 or based on Equation 2. In addition, when the resourceList value ($R_{PUCCH}$: the number of PUCCH resources belonging to the PUCCH resource set) is greater than 8 in the PUCCH-ResourceSet configuration process in the higher layer, the PUCCH resource index may be checked by the operation of Equation 2, and as parameters that can affect the PUCCH resource index, $\Delta_{PRI}$ is a PRI value, $N_{CCE,p}$ is the total number of CCEs of CORESET p to which the received DCI belongs, and $N_{CCE,p}$ is the first CCE index for the received DCI. The UE may identify the final location of the PUCCH resource based on the $N_{CCE,p}$ based on the higher layer configuration, $\Delta_{PRI}$ based on L1 signaling information, and the $N_{CCE,p}$ value of PDCCH #1 or PDCCH #1' that has been successfully decoded.

Among the two confirmed PUCCH #1 and PUCCH #2, the base station and the UE may select one of the two resources by the following method.

Option 1-1: The base station and the UE may transmit HARQ-ACK/NACK information related to whether PDSCH #1 reception succeeds described above in the PUCCH resource scheduled by the lowest/highest/0 CORESET ID among at least one or more CORESETs including each PDCCH scheduling each PUCCH resource. If repeated PDCCH transmission is allowed between CORESETs having different CORESETPoolIndexes, the base station and the UE may transmit HARQ-ACK/NACK information related to whether PDSCH #1 reception succeeds described above in the PUCCH resource scheduled by the CORESET ID scheduled by the lowest/highest CORESETPoolIndex among at least one or more CORESETPoolIndex including each PDCCH scheduling each PUCCH resource.

For example, in 1500, if the CORESET ID of PDCCH #1 is 0 and the CORESET ID of PDCCH #1' is 1, the UE, according to the established rules with the base station, may determine that HARQ-ACK/NACK information is transmitted in the PUCCH resource scheduled by the lowest CORESET ID, and transmit information related to whether the decoding of the PDSCH #1 succeeds to the PUCCH #1. For another example, according to the established rules with the base station, the UE may determine that HARQ-ACK/NACK information is transmitted in the PUCCH resource scheduled by the highest CORESET ID, and transmit information related to whether the decoding of PDSCH #1 succeeds to PUCCH #2. For another example, if repeated PDCCH transmission is allowed between CORESETs having different CORESETPoolIndexes, in 1500, if the CORESETPoolIndex of PDCCH #1 is 0 and the CORESETPoolIndex ID of PDCCH #1' is 1, the UE, according to the established rules with the base station, may determine that HARQ-ACK/NACK information is transmitted in the PUCCH resource scheduled by the lowest CORESETPoolIndex, and may transmit information related to whether the decoding of the PDSCH #1 succeeds to the PUCCH #1. Unlike this, the UE may determine that HARQ-ACK/NACK information is transmitted in the PUCCH resource scheduled by the highest CORESETPoolIndex according to the base station and a set rule, and transmit information related to whether the decoding of PDSCH #1 succeeds to PUCCH #2.

Option 1-2: The base station and the UE may transmit HARQ-ACK/NACK information related to whether PDSCH #1 reception succeeds in the PUCCH resource scheduled by the PDCCH having the lowest CCE index [#k] of the first/starting CORESET ID among two CORESETs including the PDCCH scheduling each PUCCH resource. if repeated PDCCH transmission is allowed between CORESETs having different CORESETPoolIndexes, the base station and the UE may transmit HARQ-ACK/NACK information related to whether PDSCH #1 reception succeeds in the PUCCH resource scheduled by the PDCCH having the lowest CCE index [#k] of the first/starting CORESET ID among two CORESETs including the PDCCH scheduling each PUCCH resource.

For example, in 1500, if the CCE index of PDCCH #1 is #0 and the CCE index of PDCCH #1' is #12, the UE, according to the established rules with the base station, may determine that HARQ-ACK/NACK information is transmitted in the PUCCH resource scheduled by the lowest CCE index, and transmit information related to whether the decoding of the PDSCH #1 succeeds to the PUCCH #1. For another example, the UE, according to the established rules with the base station, may determine that HARQ-ACK/NACK information is transmitted in the PUCCH resource scheduled by the highest CCE index, and transmit information related to whether the decoding of the PDSCH #1 succeeds to the PUCCH #2. If the CCE index checked by the UE is the same, as in 1550, the UE may determine that the PUCCH resources scheduled by PDCCH #1 and PDCCH #1' are the same PUCCH resources, and transmit information related to whether the decoding of the PDSCH #1 succeeds to the PUCCH #1.

Option 1-3: When the base station determines a PDCCH candidate that repeatedly transmits the same DCI to a specific UE, the base station may configure 2 PDCCH candidates to be explicitly connected to each other in the higher layer, and may configure the number of CCEs and the first/starting CCE index of each PDCCH candidate when resource allocation (when determining resource location) for each PDCCH. In this case, the number of CCEs constituting each PDCCH candidate(s) and the first/starting CCE index may be configured differently or may be configured identically. If at least one of the number of CCEs and the first/starting CCE index is configured differently, the base station implicitly/explicitly indicates one of the PDCCH candidates configured to be explicitly connected to configure the PUCCH resource to the UE. Specifically, in the two PDCCH candidates, the base station may instruct the two PDCCH candidates to follow the number of CCEs and the first/starting CCE index of PDCCH #1 in the first PDCCH candidate, or instruct to follow the number of CCEs and the first/starting CCE index of PDCCH #1' in the second PDCCH candidate.

A method of configuring a linkage combination by configuring and indicating at least one of a linked first PDCCH candidate and a second PDCCH candidate in a higher layer will be first described, and then based on this, a method for a base station and a UE to determine a resource of a PDCCH that is repeated in a PDCCH candidate will be described.

Option 1-3a: Configure the Repeating PDCCH Candidate Index

The base station may configure at least two sets of search spaces to have linkage with each other in the operation of configuring a higher layer to a specific UE. For example, an RRC information element (IE) such as repetition-config in PDCCH-config may be configured. The base station may configure related information or parameters to include CORESET indexes having linkage and search space (SS) set indexes as illustrated in Table 31. Specifically, the aggregation level value of the repeated PDCCH candidates is determined at least one of 1, 2, 4, 8, 16, 32, . . . , etc. and the index value of the PDCCH candidate is determined by determining at least one of 0, 12, 24, 36, . . . , etc. to configure the RRC through repetition-config or Search space set. The UE may determine that the PDCCH candidate itself configured as a specific aggregation level or index of the PDCCH candidate in the corresponding PDCCH candidate or search space set is repeated based on the information related to the repetition confirmed in the above-described higher layer configuring operation.

TABLE 31

| PDCCH-Config ::= | SEQUENCE { | |
|---|---|---|
| ... | | |
| repetition-config | repetition-config-r17 | optional |
| ... | | |
| } | | |
| repetition-config-r17 ::= | SEQUENCE { | |
| Search space pair (SS ID1, SS ID2) or | | |
| Aggregation level (1, 2, 4, 8, ... ) or | | |
| PDCCH candidate number (N) or | | |
| PDCCH candidate location (X) | | |
| ... | | |
| } | | |

Option 1-3b: Configure the aggregation level or the number of CCEs of the repeated PDCCH candidates, indicate an explicit location/sequence related information within the aggregation level or CCE.

The base station may configure a specific UE to have linkage with each other based on the aggregation level value of the PDCCH candidate in the higher layer configuring operation. For example, a separate RRC information element (IE) such as repetition-config in PDCCH-config may be configured. In order to configure linkage, a specific aggregation level value (e.g., 1, 2, 4, 8, 12, 32, etc.) or the number of CCEs may be explicitly configured. The search space or PDCCH candidates having the same aggregation level or the number of CCEs may be determined to have linkage to each other. As another example, without a separate RRCinformation element (IE) configuration such as repetition-config in PDCCH-config, PDCCH candidates having the same specific aggregation level value (e.g., 1, 2, 4, 8, 12, 32, etc.) or the number of CCEs may be determined to have linkage to each other.

Specifically, the number of PDCCH candidates for each AL configured by the base station in SS set #1 is AL1: 2/AL2: 4/AL4: 4/AL8: 2, the number of PDCCH candidates for each AL configure by the base station in SS set #2 is AL1: 4/AL2: 4/AL4: 2/AL8: 2, and if the base station explicitly configures or determines the AL value at which repetition occurs as 4, the base station and the UE may determine that the PDCCH candidate or search space having an AL of 4 is linked.

In addition, it may be assumed that PDCCH candidates in a specific order (e.g., X-th) are repeated according to a standard or configuration by the base station among PDCCH candidates based on the determined AL value. In this case, a specific order (e.g., X-th) may follow at least one of the first (lowest PDCCH candidate), the last (largest PDCCH candidate), and the X-th PDCCH candidate. In the specific example described above, when X is determined as the first candidate (lowest PDCCH candidate), it can be determined that PDCCH candidate #0 of AL4 in SS Set #1 and PDCCH candidate #0 of AL4 in SS Set #2 have explicit linkage and are repeatedly transmitted. As another example, when X is determined as the last candidate (largest PDCCH candidate), it can be determined that PDCCH candidate #3 of AL4 in SS Set #1 and PDCCH candidate #2 of AL4 in SS set #2 have explicit linkage and are repeatedly transmitted. As another example, when X is configured or determined as the next index of the first candidate index (candidate index 1) or the previous index of the last candidate index, it can be determined that PDCCH candidate #1 or PDCCH candidate #2 of AL4 in SS Set #1 and PDCCH candidate #1 or PDCCH candidate #0 of AL4 in SS set #2 are repeatedly transmitted while having explicit linkage with each other.

Option 1-3c: Repeated CORESET and/or search space (set) (search space (set)) combination default setting.

The base station and the UE may determine that all CORESETs or all search space sets included in the CORESET-related information configuration or the search space set-related information configuration in the PDCCH-config are configured to be repeated when at least one of the following conditions is satisfied without configuration information such as a separate explicit parameter indicating the PDCCH candidate for repeated transmission.

Condition 1: The base station may configure repeatedly transmitted PDCCH candidate(s) to have a TDM relationship with each other (e.g., non-SFN: Single Frequency Network).

For example, when a repeatedly transmitted PDCCH candidate is TDM, the base station may configure to the UE so that at least one of the frequency axis position of each CORESET, the total number of CCEs, the start position of CCEs, and the time axis resource length (e.g., number of OFDM symbols) is the same, and the time axis resources of the search space do not overlap. Specifically, the time axis resource may be composed of location information (e.g., configuration value of monitoringSymbols WithinSlot) of the first symbol for monitoring, slot period and slot offset of related information (e.g., configuration value monitoringSlotPeriodicityAndOffset) for monitoring, and duration related information from a slot start time to an end time for monitoring. In addition, as for the time axis resource, values of the above-described information may be configured in various ways according to inter-frequency or intra-frequency TDM.

Condition 2: The base station may configure repeatedly transmitted PDCCH candidate(s) to have an FDM relationship with each other (e.g., non-SFN: Single Frequency Network).

For example, when a repeatedly transmitted PDCCH candidate is FDM, the base station may configure to the UE that at least one of the total number of CCEs of each CORESET, the length of the time axis resource (e.g., number of OFDM symbols), and the time axis resource of the search space is the same, and the frequency axis resources of the CORESET do not overlap. Specifically, the frequency axis resource is configured using a bit string that does not overlap with each other in frequencyDomainResources in the ControlResourceSet of the RRC layer, where the bit string is indexed in a group unit of 6 RBs in the BWP to indicate the position of the frequency axis.

Such an operation may be configured according to the capability of the UE. The UE may assume that soft combining is basically performed in the decoding operation for the two CORESETs. In addition, when the UE reports the UE capability capable of receiving a plurality of different beams to the base station, the base station may perform repeated PDCCH transmission to the corresponding UE through FDM.

Option 1-3d: Configure separately CORESET and/or search space (set) combinations that are repeated.

The base station may configure specific PDCCH candidates that are repeatedly transmitted in the same way as "repetition ENUMERATED {enabled}" when configuring information related to controlResourceSetId and searchspaceID in the SearchSpace in the higher layer. In addition, the base station may change the repetition setting of the search space configuration in a reconfiguration process such as RRC reconfiguration.

Hereinafter, a method for the base station and the UE to determine the resources of the PUCCH repeated in the PDCCH candidates based on the aforementioned options 1-3a to 3d will be described.

For example, the base station and the UE check the above-described explicitly linked configuration, and determine the PUCCH resource described above based on the PDCCH corresponding to the lowest/highest CCE index, lowest/highest CORESET ID, or the lowest/highest CORESETPoolindex. As another example, the base station and the UE determine the aforementioned PUCCH resource based on the PDCCH corresponding to the PDCCH having the largest/smallest aggregation level described above in Equation 1. As another example, the UE determines a PUCCH resource based on a PDCCH having a small number of PDCCH candidates in each search space corresponding to an aggregation level, which is an explicitly connected configuration. As another example, the base station and the UE determine the PUCCH resource based on the PDCCH having the largest/smallest $m_{s,n_{Cl}}$ value (PDCCH candidate index value) described above in Equation 1. As another example, the base station and the UE determine the PUCCH resource based on the PDCCH having a small CCE index corresponding to each of the two CORESETs with respect to the above-described $m_{s,n_{Cl}}$ value (PDCCH candidate index value) in Equation 1.

Option 1-4: Determine based on the time resource of PDCCHs that are repeated.

Among at least one or more CORESETs including each PDCCH scheduling each PUCCH resource, if the corresponding PDCCHs are configured to be repeatedly transmitted in the time axis (in slots or between slots), the base station and the UE may transmit HARQ-ACK/NACK information related to whether PDSCH #1 has been successfully received in the PUCCH resource that is transmitted first in time or is scheduled by CORESET transmitted last in time. For example, in 1500, if the CORESET ID of PDCCH #1 is #0 and the CORESET ID of PDCCH #1' is #1, the UE may determine that HARQ-ACK/NACK information is transmitted in the PUCCH resource scheduled by the CORESET #1 transmitted the latest according to an established rule with the base station, and transmit information related to whether the decoding of the PDSCH #1 succeeds to the PUCCH #2. For another example, the UE, according to the established rules with the base station, may transmit HARQ-ACK/NACK information in the PUCCH resource scheduled by the CORESET transmitted first in time, and transmit information related to whether the decoding of the PDSCH #1 succeeds to the PUCCH #1.

In a similar example, among at least one or more CORESETs including each PDCCH scheduling each PUCCH resource, if the corresponding PDCCHs are configured to be repeatedly transmitted on the frequency axis, the base station and the UE may transmit HARQ-ACK/NACK information related to whether PDSCH #1 reception succeeds in the PUCCH resource scheduled by the CORESET having the lowest or highest RB start position for the PUCCH resource. For example, in 1500, if the CORESET ID of PDCCH #1 is #0, the CORESET ID of PDCCH #1' is #1, and the CORESET ID #1 has the lowest RB start position, the UE, according to the established rules with the base station, may determine that HARQ-ACK/NACK information is transmitted in the PUCCH resource scheduled by CORESET #1 transmitted from the lowest RB start position, and transmit information related to whether the decoding of PDSCH #1 succeeds to PUCCH #2. For another example, the UE, according to the established rules with the base station, may determine that HARQ-ACK/NACK information is transmitted in the PUCCH resource scheduled by the CORESET transmitted from the highest RB start position, and transmit information related to whether the decoding of the PDSCH #1 succeeds to the PUCCH #1.

Option 1-5: The base station and the UE may transmit HARQ-ACK/NACK information related to whether PDSCH #1 reception succeeds in the PUCCH resource scheduled by the lowest/highest search space set ID among at least one or more search space set(s) including each PDCCH scheduling each PUCCH resource.

In this case, when there is no separate CORESETPoolIndex configuration or only one CORESETPoolIndex is configured, the UE may determine the PUCCH resource scheduled in the lowest/highest/0 search space set ID based on the search space set ID. In addition, if repeated PDCCH transmission is allowed between CORESETs having different CORESETPoolIndexes, the base station and the UE may transmit HARQ-ACK/NACK information related to the success or failure of receiving the PDSCH #1 described above in the PUCCH resource scheduled in the lowest/highest CORESETPoolIndex among at least two or more CORESETPoolIndex including each PDCCH scheduling each PUCCH resource.

For example, in 1500, if the search space set ID of PDCCH #1 is 0 and the search space set ID of PDCCH #1' is 1, the UE, according to the established rules with the base station, may transmit HARQ-ACK/NACK information in the PUCCH resource scheduled by the lowest search space set ID, and transmit information related to whether the decoding of the PDSCH #1 succeeds to the PUCCH #1. For another example, the UE, according to the established rules with the base station, may transmit HARQ-ACK/NACK information in the PUCCH resource scheduled by the highest search space set ID, and transmit information related to whether the decoding of PDSCH #1 succeeds to PUCCH #2.

For another example, if repeated PDCCH transmission is allowed between CORESETs having different CORESETPoolIndexes, in 1500, if the CORESETPoolIndex of PDCCH #1 is 0 and the CORESETPoolIndex ID of PDCCH #1' is 1, the UE, according to the established rules with the base station, may determine that HARQ-ACK/NACK information is transmitted in the PUCCH resource scheduled by the lowest CORESETPoolIndex, and transmit information related to whether the decoding of the PDSCH #1 succeeds to the PUCCH #1. Unlike this, the UE may determine that HARQ-ACK/NACK information is transmitted in the PUCCH resource scheduled by the highest CORESETPoolIndex according to the established rules with the base station, and transmit information related to whether the decoding of PDSCH #1 succeeds to PUCCH #2.

For another example, when the base station performs repeated PDCCH transmission between different CORESETs respectively connected to two different search space sets to the UE, if different CORESETs are all transmitted using the same TCI state (for example, if different CORESETs are transmitted using the same transmit beam), the UE, according to the established rules with the base station, may determine that HARQ-ACK/NACK information is transmitted in the PUCCH resources scheduled by the PDCCH transmitted from the CORESET associated with the lowest or highest search space set ID, regardless of the CORESET ID, and transmit information related to whether decoding of PDSCH #1 succeeds to PUCCH #1 or PUCCH #2.

For another example, when the base station performs repeated PDCCH transmission to the UE using two different search space sets connected to one CORESET, if the corresponding CORESET receives two different TCI states and is transmitted using different TCI states in each search space set (for example, if the corresponding CORESET is transmitted using a different transmission beam in each search space set), the UE, according to the established rules with the base station, may determine that HARQ-ACK/NACK information is transmitted in the PUCCH resources scheduled by the PDCCH transmitted from the CORESET associated with the lowest or highest search space set ID, and transmit information related to whether decoding of PDSCH #1 succeeds to PUCCH #1 or PUCCH #2.

In the above-described various embodiments, if the search space set ID is the same, the base station and the UE may determine the PUCCH resource scheduled in the lowest/highest CORESET ID or the lowest/highest CORESETPoolIndex in the next operation. As an example, when CORESETPoolIndex is not configured or only one is configured, the UE may determine that HARQ-ACK/NACK information is transmitted in the PUCCH resource scheduled by the lowest/highest CORESET ID. As another example, when CORESETPoolIndex is configured, the UE may determine to transmit HARQ-ACK/NACK information in the PUCCH resource scheduled by the lowest/highest CORESET ID or lowest/highest CORESETPoolIndex.

The operation of determining the exact resource location of the PUCCH resource is omitted due to the above description.

According to various embodiments of the disclosure, it may be understood that the base station and the UE operate based on one of option 1-1 to 1-5 described above. By extending this, the base station and the UE may consider at least two or more of various options. In this case, when a plurality of independent options are considered together, PUCCH resources may be sequentially determined according to a predetermined priority (PUCCH resource determination). For example, the base station and the UE may consider two conditions (a first condition and a second condition), and if the first condition is the same, the second condition may be considered. As an example, if the CORESET ID or CORESETPoolIndex in which two PDCCHs are transmitted/set in the first condition is the same, the PUCCH resource may be determined based on the PDCCH in which the lowest search space set ID is configured in the second condition (PUCCH resource determination). For another example, the base station and the UE may consider three conditions (1st condition, 2nd condition, and 3rd condition), if the first condition is the same, the next second condition may be considered, and if the second condition is the same, the third condition may be considered. As an example, if the CORESETPoolindex in which two PDCCHs are transmitted/configured in the first condition is the same, and the first/staring CCE index is the same in the second condition, in the third condition, the PUCCH resource may be determined based on the PDCCH configured with the lowest CORESET ID (PUCCH resource determination). When a plurality of conditions are sequentially considered, each condition may correspond to at least one of the options described above.

As an operation of the base station side in option 2, the base station may commonly perform the explicit linking-related configuration described above in Option 1-1 to option 1-5. The rules for selecting the above-described two PDCCH #1 and PDCCH #1' do not necessarily need to be determined in the standard, and the UE may transmit each HARQ-ACK/NACK information in the PUCCH resource indicated by the PDCCH through its own implementation. On the other hand, in this case, because the base station cannot determine which resource the UE has independently selected among the two PUCCH resources, the base station may perform decoding on both PUCCH resources to check whether the UE 's PDSCH #1 decoding succeeds.

For example, the self-implementation method of the UE described above may include a rule for selecting two PDCCH #1 and PDCCH #1' in option 1-1 to option 1-5. For another example, the UE may transmit HARQ-ACK/NACK information related to PDSCH #1 to a PUCCH resource indicated by a PDCCH resource (e.g., PDCCH #1) in which first decoding operation is started/completed. For another example, the UE may transmit HARQ-ACK/NACK information related to PDSCH #1 in the PUCCH resource indicated by the resource (e.g., PDCCH #1') of the PDCCH in which the last decoding operation is started/completed.

As in option 3, when the base station determines a PDCCH candidate that repeatedly transmits the same DCI to a specific UE, the base station may configure 2 PDCCH candidates to be explicitly connected to each other in a higher layer, and may configure PDCCH related information for PUCCH resource determination.

Option 3-1. Configure the same CCE index and total number of CCEs when configuring PDCCH resource allocation: As an example, when resource allocation of PDCCH in PDCCH candidates (when determining resource location), the same number of CCEs and the first CCE index of PDCCH candidates may be configured to be the same. For example, in order to determine a PDCCH candidate that repeatedly transmits the same DCI to a specific UE, PDCCH candidates constituting PDCCH #1 and #2 may be selected based on the explicitly connected CORESET and search space. In addition, in order to determine the position of the DCI repeatedly transmitted from the two PDCCH candidates determined by the combination of the previously selected CORESET and the search space, the number of CCEs may be determined as one of 1, 2, 4, 8, and 16, and the first/starting CCE index may be determined to be one of 0, 12, 24, etc. so that the positions within each PDCCH candidates are the same.

On the other hand, before decoding two PDCCH candidates repeatedly transmitted in a specific slot, the UE checks the configuration in which each candidate is explicitly linked in the higher layer (RRC layer or MAC layer), and when decoding is performed based on this, may perform decoding on the assumption that the starting CCE index or the first CCE index of each PDCCH is the same, and CORESETs including each PDCCH have the same number of CCEs. Finally, the UE may determine the location of the PUCCH resource based on at least one of PRI information received from the PDCCH, the number of the same CCEs, and the same first CCE index.

Option 3-2. Configure a specific CORESET ID for PUCCH resource selection: As another example, the base station may configure the ID of the CORESET to be used for PUCCH resource selection among two CORESETs transmitting the repeated PDCCH through higher layer signaling. For example, PDCCH candidates that repeatedly transmit the same DCI to a specific UE are transmitted through CORESET #1 and CORESET #2, respectively, and the base station configures the CORESET ID to #1 through higher layer signaling, so a configuration to be performed based on CORESET #1 in PUCCH resource selection may be transmitted to the UE. In addition, if the base station does not configure the ID of the CORESET to be used in PUCCH resource selection through higher layer signaling, the UE may select a specific CORESET based on a specific criterion. In this case, the specific criteria may follow the methods of options 1 and 2 above.

Figure 15D:
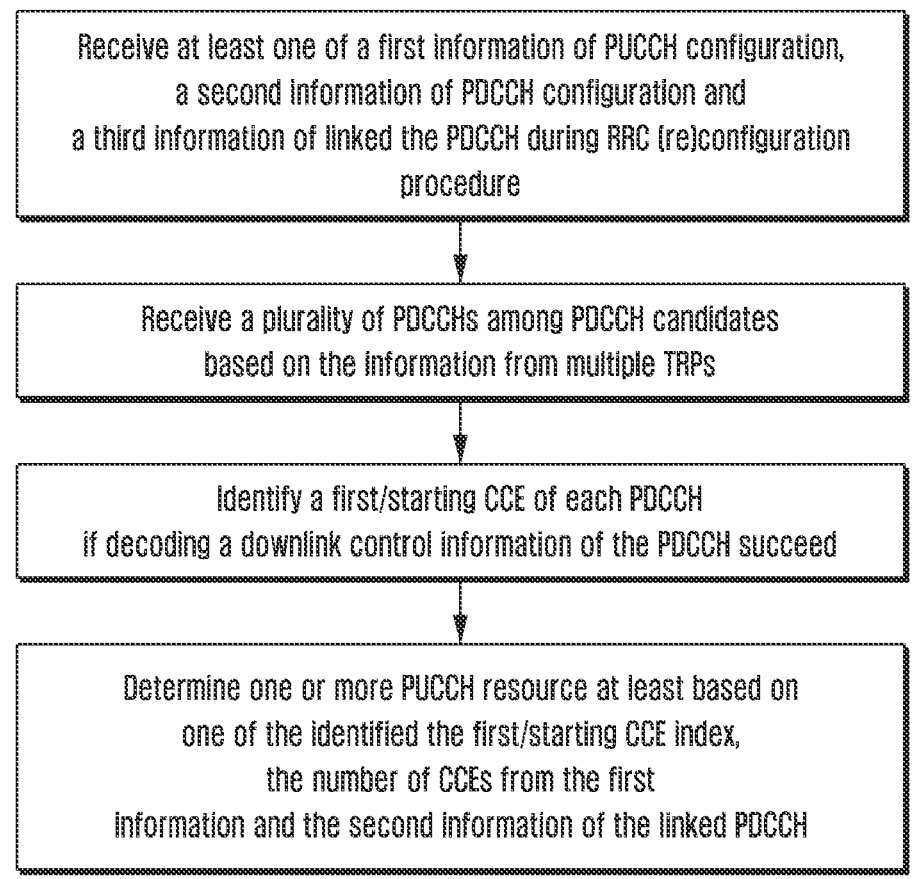
FIG. 15D is a diagram illustrating an operation of a UE according to an embodiment of the disclosure.

FIG. 15D is a diagram illustrating an embodiment of an operation of a UE described above with reference to FIGS. 15B to 15C.

The UE may receive PUCCH-related configuration information (e.g., a first information) during the RRC configuration procedure. The configuration information related to PUCCH may include configuration information such as a PUCCH format type related to a PUCCH resource, a start PUCCH PRB location index, and the number of symbols and slots of the PUCCH resource. In addition, the UE may receive configuration information (e.g., second information) related to the PDCCH in the RRC configuration procedure. The configuration information related to the PDCCH may include configuration information such as CORESET related to the resource of the PDCCH, PDCCH candidates, the total number of CCEs, and a search space (set). In addition, the UE may receive information (third information) about a resource or configuration parameter for explicitly indicating a connection relationship of a plurality of PDCCHs repeated from multiple TRPs in addition to configuration information related to PDCCH in the RRC configuration procedure. The explicit connection may follow various embodiments such as the PDCCH candidates and the CORESET search space described above with reference to FIGS. 15B to 15C.

The UE may receive a plurality of PDCCHs transmitted by the base station by performing blind decoding within a resource (PDCCH Candidates) for receiving a PDCCH based on at least one of the first to third information from the plurality of TRPs (e.g., 2 TRPs) after the RRC setting procedure.

When the reception and decoding of a plurality of PDCCHs from the plurality of TRPs is successful, the UE may identify the CCE corresponding to the resource of each successful PDCCH and the first/starting CCE index. The UE may determine at least one or more PUCCH resources indicated by a plurality of TRPs based on at least one of configuration information (first information) for PUCCH transmission received in RRC configuration and CCE index information identified above. The method of determining the PUCCH resource may include various embodiments of the options 1 to 3 described above with reference to FIGS. 15B to 15C.

Thereafter, the UE may transmit the reception and decoding results (e.g., HARQ-ACK/NACK) of at least one PDSCH allocated by the PDCCH based on the DCI information of the PDCCHs decoded from the plurality of TRPs to at least one identified PUCCH resource, respectively, integrated, mapped according to a separate rule, or repeatedly transmitted. Transmitting each refers to transmitting one PDSCH decoding result (e.g., type 1/2 HARQ-ACK codebook) allocated from one PDCCH resource to one PUCCH resource, integrated transmission refers to that a result of decoding a plurality of PDSCH resources scheduled by a plurality of PDCCHs on one PUCCH resource is sequentially arranged according to a rule (e.g., type 1/2 HARQ-ACK codebook) and transmitted, and repeated transmission refers to repeating at least one of the above-described transmission methods on a plurality of PUCCH resources.

Figure 16:
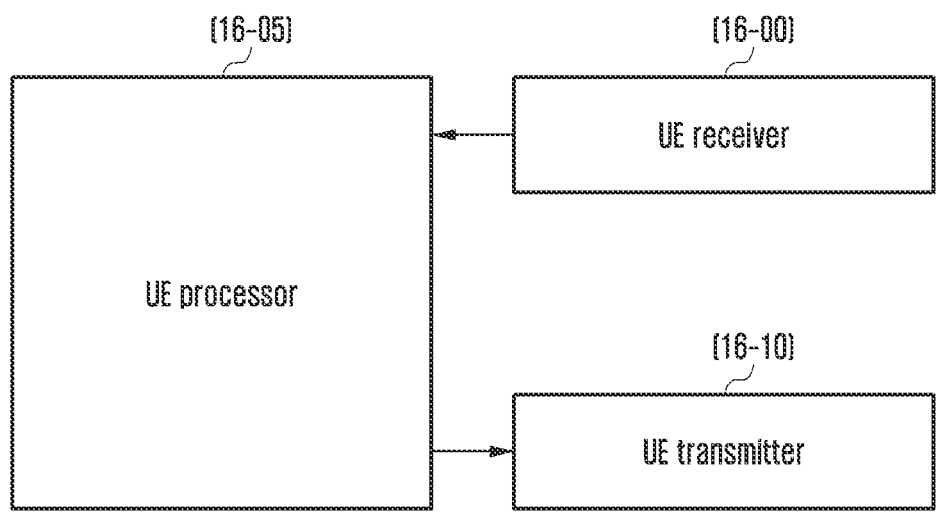
FIG. 16 is a diagram illustrating a structure of a UE in a wireless communication system according to an embodiment of the disclosure.

FIG. 16 is a diagram illustrating a structure of a UE in a wireless communication system according to an embodiment of the disclosure.

Referring to FIG. 16, the UE may include a UE receiver 16-00, a UE processor 16-05, and a UE transmitter 16-10. In addition, the UE may further include a memory (not illustrated in the disclosure). The UE processor 16-05 may include a processor. According to the above-described communication method of the UE, the UE receiver 16-00, the UE processor 16-05, and the UE transmitter 16-10 of the UE may operate. However, the components of the UE are not limited to the above-described example. For example, the UE may include more or fewer components than the aforementioned components. In addition, the UE receiver 16-00, the UE processor 16-05, the UE transmitter 16-10, and the memory may be implemented in the form of a single chip.

In an embodiment, the UE receiver 16-00 and the UE transmitter 16-10 may be referred to as a transceiver. The transceiver may transmit/receive a signal to/from the base station. The signal may include control information and data. To this end, the transceiver may be composed of an RF transmitter for up-converting and amplifying a frequency of a transmitted signal, and an RF receiver for low-noise amplifying and down-converting a received signal. However, this is only an embodiment of the transceiver, and components of the transceiver are not limited to the RF transmitter and the RF receiver.

In addition, the UE receiver 16-00 receives a signal through a wireless channel and outputs the signal to the UE processor 16-05, and the UE transmitter 16-10 may transmit a signal output from the UE processor 16-05 through a wireless channel.

The memory may store programs and data necessary for the operation of the UE. In addition, the memory may store control information or data included in a signal transmitted and received by the UE. The memory may be configured as a storage medium or a combination of storage media, such as read only memory (ROM), random access memory (RAM), hard disk, compact disc-ROM (CD-ROM), and digital versatile disc (DVD). In addition, there may be a plurality of memories.

In addition, the UE processor 16-05 may control a series of processes so that the UE may operate according to the above-described embodiment. For example, the UE processor 16-05 may receive DCI composed of two layers and control components of the UE to simultaneously receive a plurality of PDSCHs.

In an embodiment, the UE processor 16-05 may receive, from the base station, configuration information regarding repeated transmission of a PUCCH (physical uplink control channel) through at least one of a plurality of transmission points, a plurality of panels, or a plurality of beams, receive an indication for repeated transmission of the PUCCH through at least one of a plurality of transmission points, a plurality of panels, or a plurality of beams from the base station, select at least one of a plurality of PUCCH resources based on the received configuration information and the received repeated transmission indication, and repeatedly transmit the PUCCH according to a preconfigured order based on at least one of the selected PUCCH resources.

The UE processor 16-05 may include a plurality of processors, and the UE processor 16-05 may execute a program stored in a memory to perform a component control operation of the UE.

Figure 17:
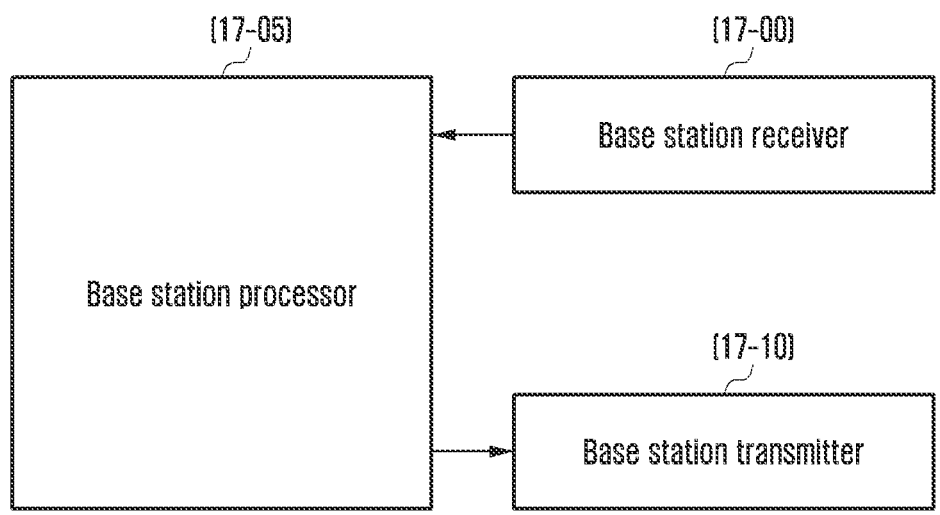
FIG. 17 is a diagram illustrating a structure of a base station in a wireless communication system according to an embodiment of the disclosure.

FIG. 17 is a diagram illustrating a structure of a base station in a wireless communication system according to an embodiment of the disclosure.

Referring to FIG. 17, the base station may include a base station receiver 17-00, a base station processor 17-05, and a base station transmitter 17-10. In addition, the base station may further include a memory (not illustrated in the disclosure). The base station receiver 17-00 and the base station transmitter 17-10 may be referred to as transceivers. According to the above-described communication method of the base station, the base station receiver 17-00, the base station processor 17-05, and the base station transmitter 17-10 of the base station may operate. However, the components of the base station are not limited to the above-described example. For example, the base station may include more or fewer components than the aforementioned components. In addition, the base station receiver 17-00, the base station processor 17-05, and the base station transmitter 17-10 may be implemented in the form of a single chip.

The transceiver may transmit/receive a signal to/from the UE. The signal may include control information and data. To this end, the transceiver may be composed of an RF transmitter for up-converting and amplifying a frequency of a transmitted signal, and an RF receiver for low-noise amplifying and down-converting a received signal. However, this is only an embodiment of the transceiver, and components of the transceiver are not limited to the RF transmitter and the RF receiver.

In addition, the base station receiver 17-00 receives a signal through a wireless channel and outputs the signal to the base station processor 17-05, and the base station transmitter 17-10 may transmit a signal output from the base station processor 17-05 through a wireless channel.

The memory may store programs and data necessary for the operation of the base station. In addition, the memory may store control information or data included in a signal transmitted and received by the base station. The memory may be configured as a storage medium or a combination of storage media, such as ROM, RAM, hard disk, CD-ROM, and DVD. In addition, there may be a plurality of memories.

The base station processor 17-05 may control a series of processes so that the base station may operate according to the above-described embodiment of the disclosure. For example, the base station processor 17-05 may control each component of the base station to configure two-layer DCIs including allocation information for a plurality of PDSCHs and transmit.

In one embodiment, the base station processor 17-05 may transmit configuration information regarding repeated transmission of a PUCCH (physical uplink control channel) through at least one of a plurality of transmission points, a plurality of panels, or a plurality of beams to the UE, transmit an indication for repeated transmission of PUCCH through at least one of a plurality of transmission points, a plurality of panels, or a plurality of beams to the UE, receive repetitive PUCCH from the UE, and decode the received repetitive PUCCH based on configuration information on repeated transmission of the PUCCH.

The base station processor 17-05 may include a plurality of processors, and the base station processor 17-05 may execute a program stored in a memory to perform a component control operation of the base station.

The methods according to embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

The embodiments of the disclosure described and shown in the specification and the drawings are merely specific examples that have been presented to easily explain the technical contents of the disclosure and help understanding of the disclosure, and are not intended to limit the scope of the disclosure. That is, it will be apparent to those skilled in the art that other variants based on the technical idea of the disclosure may be implemented. Further, the above respective embodiments may be employed in combination, as necessary. For example, one embodiment of the disclosure may be partially combined with another embodiment to operate a base station and a terminal. As an example, embodiments 1 and 2 of the disclosure may be partially combined to operate a base station and a terminal. Further, although the above embodiments have been described by way of the FDD LTE system, other variants based on the technical idea of the embodiments may be implemented in other systems such as TDD LTE and 5G or NR systems.

In the drawings in which methods of the disclosure are described, the order of the description does not always correspond to the order in which operations of each method are performed, and the order relationship between the operations may be changed or the operations may be performed in parallel.

Alternatively, in the drawings in which methods of the disclosure are described, some elements may be omitted and only some elements may be included therein without departing from the essential spirit and scope of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a communication system, the method comprising:

receiving, from a base station via higher layer signaling, information on a physical downlink control channel (PDCCH) repetition comprising a first aggregation level;

receiving, from the base station, a PDCCH based on a first PDCCH candidate associated with a first search space set and a second PDCCH candidate associated with a second search space set;

based on the first aggregation level, identifying that the first PDCCH candidate and the second PDCCH candidate are linked with a downlink control information (DCI) format with the same information;

receiving, from the base station a physical downlink shared channel (PDSCH) based on the PDCCH;

identifying a physical uplink control channel (PUCCH) resource from a PUCCH resource set based on a control resource set (CORESET) associated with a search space set having a lowest index between the first search space set and the second search space set; and transmitting, to the base station, hybrid automatic repeat request acknowledgement (HARQ-ACK) information for the PDSCH based on the PUCCH resource, wherein, in case that a second aggregation level of the first PDCCH candidate and a third aggregation level of the second PDCCH candidate are the same as the first aggregation level, the first PDCCH candidate and the second PDCCH candidate are linked with the DCI format with the same information, and wherein the first search space set and the second search space set are linked with the DCI format with the same information, based on the first aggregation level.

2. The method of claim 1, wherein the PUCCH resource is identified based on a number of control channel elements (CCEs) in the CORESET associated with the search space set having the lowest index.

3. The method of claim 1, wherein the PUCCH resource is identified based on a starting control channel element (CCE) index for a PDCCH candidate associated with the search space set having the lowest index.

4. The method of claim 1, wherein the PUCCH resource is identified from a set of PUCCH resources including more than eight PUCCH resources.

5. The method of claim 1, wherein a first CORESET associated with the first search space set and a second CORESET associated with the second search space set are received using two different transmission configuration indicator (TCI) states.

6. A method performed by a base station in a communication system, the method comprising:

transmitting, to a terminal via higher layer signaling, information on a physical downlink control channel (PDCCH) repetition comprising a first aggregation level;

transmitting, to the terminal, a PDCCH based on a first PDCCH candidate associated with a first search space set and a second PDCCH candidate associated with a second search space set;

transmitting, to the terminal, a physical downlink shared channel (PDSCH) based on the PDCCH; and receiving, from the terminal, hybrid automatic repeat request acknowledgement (HARQ-ACK) information for the PDSCH based on a physical uplink control channel (PUCCH) resource identified from a PUCCH resource set based on a control resource set (CORESET) associated with a search space set having a lowest index between the first search space set and the second search space set, wherein the first PDCCH candidate and the second PDCCH candidate are associated with a downlink control information (DCI) format with the same information, based on the first aggregation level, wherein a second aggregation level of the first PDCCH candidate and a third aggregation level of the second PDCCH candidate are the same as the first aggregation level, and wherein the first search space set and the second search space set are linked with the DCI format with the same information, based on the first aggregation level.

7. The method of claim 6, wherein the PUCCH resource is identified based on a number of control channel elements (CCEs) in the CORESET associated with the search space set having the lowest index.

8. The method of claim 6, wherein the PUCCH resource is identified based on a starting control channel element (CCE) index for a PDCCH candidate associated with the search space set having the lowest index.

9. The method of claim 6, wherein the PUCCH resource is identified from a set of PUCCH resources including more than eight PUCCH resources.

10. The method of claim 6, wherein a first CORESET associated with the first search space set and a second CORESET associated with the second search space set are transmitted using two different transmission configuration indicator (TCI) states.

11. A terminal in a communication system, the terminal comprising:

a transceiver; and a processor configured to:
 receive, from a base station via higher layer signaling, information on a physical downlink control channel (PDCCH) repetition comprising a first aggregation level,
 receive, from the base station, a PDCCH based on a first PDCCH candidate associated with a first search space set and a second PDCCH candidate associated with a second search space set,
 based on the first aggregation level, identify that the first PDCCH candidate and the second PDCCH candidate are linked with a downlink control information (DCI) format with the same information,
 receive, from the base station a physical downlink shared channel (PDSCH) based on the PDCCH,
 identify a physical uplink control channel (PUCCH) resource from a PUCCH resource set based on a control resource set (CORESET) associated with a search space set having a lowest index between the first search space set and the second search space set,
 transmit, to the base station, hybrid automatic repeat request acknowledgement (HARQ-ACK) information for the PDSCH based on the PUCCH resource, wherein, in case that a second aggregation level of the first PDCCH candidate and a third aggregation level of the second PDCCH candidate are the same as the first aggregation level, the first PDCCH candidate and the second PDCCH candidate are linked with the DCI format with the same information, and wherein the first search space set and the second search space set are linked with the DCI format with the same information, based on the first aggregation level.

12. The terminal of claim 11, wherein the PUCCH resource is identified based on a number of control channel elements (CCEs) in the CORESET associated with the search space set having the lowest index.

13. The terminal of claim 11, wherein the PUCCH resource is identified based on a starting control channel element (CCE) index for a PDCCH candidate associated with the search space set having the lowest index.

14. The terminal of claim 11, wherein the PUCCH resource is identified from a set of PUCCH resources including more than eight PUCCH resources.

15. The terminal of claim 11, wherein a first CORESET associated with the first search space set and a second CORESET associated with the second search space set are received using two different transmission configuration indicator (TCI) states.

16. A base station in a communication system, the base station comprising:
   a transceiver; and
   a processor configured to:
   transmit, to a terminal via higher layer signaling, information on a physical downlink control channel (PDCCH) repetition comprising a first aggregation level,
   transmit, to the terminal, a PDCCH based on a first PDCCH candidate associated with a first search space set and a second PDCCH candidate associated with a second search space set,
   transmit, to the terminal, a physical downlink shared channel (PDSCH) based on the PDCCH, and
   receive, from the terminal, hybrid automatic repeat request acknowledgement (HARQ-ACK) information for the PDSCH based on a physical uplink control channel (PUCCH) resource identified from a PUCCH resource set based on a control resource set (CORESET) associated with a search space set having a lowest index between the first search space set and the second search space set,
   wherein the first PDCCH candidate and the second PDCCH candidate are associated with a downlink control information (DCI) format with the same information, based on the first aggregation level,
   wherein a second aggregation level of the first PDCCH candidate and a third aggregation level of the second PDCCH candidate are the same as the first aggregation level, and
   wherein the first search space set and the second search space set are linked with the DCI format with the same information, based on the first aggregation level.

17. The base station of claim 16, wherein the PUCCH resource is identified based on a number of control channel elements (CCEs) in the CORESET associated with the search space set having the lowest index.

18. The base station of claim 16, wherein the PUCCH resource is identified based on a starting control channel element (CCE) index for a PDCCH candidate associated with the search space set having the lowest index.

19. The base station of claim 16, wherein the PUCCH resource is identified from a set of PUCCH resources including more than eight PUCCH resources.

20. The base station of claim 16, wherein a first CORESET associated with the first search space set and a second CORESET associated with the second search space set are transmitted using two different transmission configuration indicator (TCI) states.

* * * * *